(12) United States Patent
Smith

(10) Patent No.: US 7,546,383 B2
(45) Date of Patent: Jun. 9, 2009

(54) ENABLING BROADCAST OF MULTIPLE DATA CONFIGURATIONS

(75) Inventor: Geoffrey Smith, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 1289 days.

(21) Appl. No.: 10/339,685

(22) Filed: Jan. 8, 2003

(65) Prior Publication Data

US 2004/0131020 A1    Jul. 8, 2004

(51) Int. Cl.
*G06F 15/16* (2006.01)

(52) U.S. Cl. .................. 709/246; 709/245; 709/231; 725/34

(58) Field of Classification Search ......... 709/217–219, 709/223, 227, 230; 725/32–36
See application file for complete search history.

(56) References Cited

U.S. PATENT DOCUMENTS

| | | | | |
|---|---|---|---|---|
| 5,930,493 | A * | 7/1999 | Ottesen et al. | 725/92 |
| 6,029,176 | A * | 2/2000 | Cannon | 707/104.1 |
| 6,167,358 | A | 12/2000 | Othmer et al. | |
| 6,177,931 | B1 * | 1/2001 | Alexander et al. | 725/52 |
| 6,446,261 | B1 * | 9/2002 | Rosser | 725/34 |
| 6,487,723 | B1 | 11/2002 | MacInnis | |
| 6,601,103 | B1 * | 7/2003 | Goldschmidt Iki et al. | 709/231 |
| 6,681,394 | B1 * | 1/2004 | Fujita et al. | 725/32 |
| 6,698,020 | B1 * | 2/2004 | Zigmond et al. | 725/34 |
| 6,725,460 | B1 * | 4/2004 | Nishiyama et al. | 725/32 |
| 6,760,916 | B2 * | 7/2004 | Holtz et al. | 725/34 |
| 6,792,615 | B1 * | 9/2004 | Rowe et al. | 725/37 |
| 7,100,183 | B2 * | 8/2006 | Kunkel et al. | 725/34 |
| 7,107,063 | B1 * | 9/2006 | Bates et al. | 455/456.1 |
| 2002/0021674 | A1 | 2/2002 | Thorne et al. | |
| 2003/0093530 | A1 | 5/2003 | Syed | |
| 2003/0208763 | A1 | 11/2003 | McElhatten et al. | |
| 2003/0208767 | A1 | 11/2003 | Williamson et al. | |

FOREIGN PATENT DOCUMENTS

EP          1 126 707 A1      8/2001

OTHER PUBLICATIONS

Rudolf Jaeger & Josef Neubauer, "Video and Interactive Internet access in a DVB Network," BetaResearch, Germany, copyright 2000 IEEE, pp. 439-445.
Andreas Braun, et al., "The Software Headend Architecture—A New Approach for Multi-Standard CATV Headends," Institute of Telecommunications, University of Stuttgart, Pfaffenwaldring 47, 70569 Stuttgart, Germany, 2002 IEEE, pp. 156-158.

(Continued)

*Primary Examiner*—Saleh Najjar
*Assistant Examiner*—Faruk Hamza
(74) *Attorney, Agent, or Firm*—Lee & Hayes, PLLC

(57) ABSTRACT

A broadcast data server enables broadcast of multiple data configurations. The broadcast data server maintains configuration definitions that define how broadcast data may be configured for presentation to a viewer. The broadcast data server also maintains region definitions that identify regions that may be associated with client devices for receiving broadcast data. The configuration definitions are mapped to region definitions, enabling a client device in a particular region to selectively receive broadcast data according to any one of multiple data configurations that are associated with the particular region.

20 Claims, 40 Drawing Sheets

OTHER PUBLICATIONS

Kuo-Chi Chu, et al., "A novel mechanism for providing service differentiation over CATV network," Computer Communications 25 (2002) 1214-1229.

Debra A. Hensgen, "A Resource Allocation Framework for Heterogeneous SPMD Interactive Television Environments," Proceedings of SPIE, vol. 4528 (2001) pp. 1-12.

* cited by examiner

ENABLING BROADCAST OF MULTIPLE DATA CONFIGURATIONS

TECHNICAL FIELD

This invention relates to data broadcasting and, in particular, to enabling broadcast of multiple data configurations.

BACKGROUND

Digital television networks generally devote most of their available bandwidth to broadcasting audio and video information. In addition, other information that does not encode video and audio is generally sent in parallel using a small amount of the available bandwidth, typically referred to as an out-of-band network. This other information often includes, but is not limited to, electronic program guide data, conditional access instructions, layout information for a user interface to be displayed, and advertising data. Usually, set-top boxes are designed to gather out-of-band data in parallel with decoding and rendering video and audio data, so that a viewer is free to watch programming while the set-top box accumulates programming data and other information. For example, a cable television broadcast company may broadcast program content over a broadband cable network and broadcast additional related data over a separate smaller band of the same cable network. In this way, a viewer using a client that has at least two tuners can change channels using a first tuner while the client continues receiving the additional data using a second tuner. Alternatively, multiple data streams may be broadcast in parallel over the same channel, allowing a client device with only one tuner to simultaneously receive broadcast program content and broadcast data over the same channel. Because both the quality and number of television channels is a major business point for digital television operators, the amount of bandwidth reserved for the secondary information is usually extremely limited compared to the amount of bandwidth used for broadcasting the video and audio data.

Furthermore, set-top boxes are typically pre-configured to download and display additional data, such as programming data, in a particular language and according to a particular layout. The particular language and layout to be supported is initialized when the set-top box is provisioned, and the user is not given the ability to select another language or layout.

SUMMARY

Enabling broadcast of multiple data configurations is described. A broadcast data server maintains multiple configuration definitions that are mapped to region definitions. Region definitions may represent geographical regions in which client devices may be implemented or other groupings of client devices based on parameters other than geographical location. Configuration definitions define data groupings according to various languages and/or display formats. The region/configuration mappings are broadcast along with broadcast data, allowing each client device within a region to selectively receive portions of the broadcast data according to any of a number of data configurations associated with the region. In this manner, a single data broadcast can be received by a client device according to any one of multiple configurations, each of which results in a different presentation of the data to a viewer.

BRIEF DESCRIPTION OF THE DRAWINGS

The same numbers are used throughout the drawings to reference like features and components.

DETAILED DESCRIPTION

Figure 1:
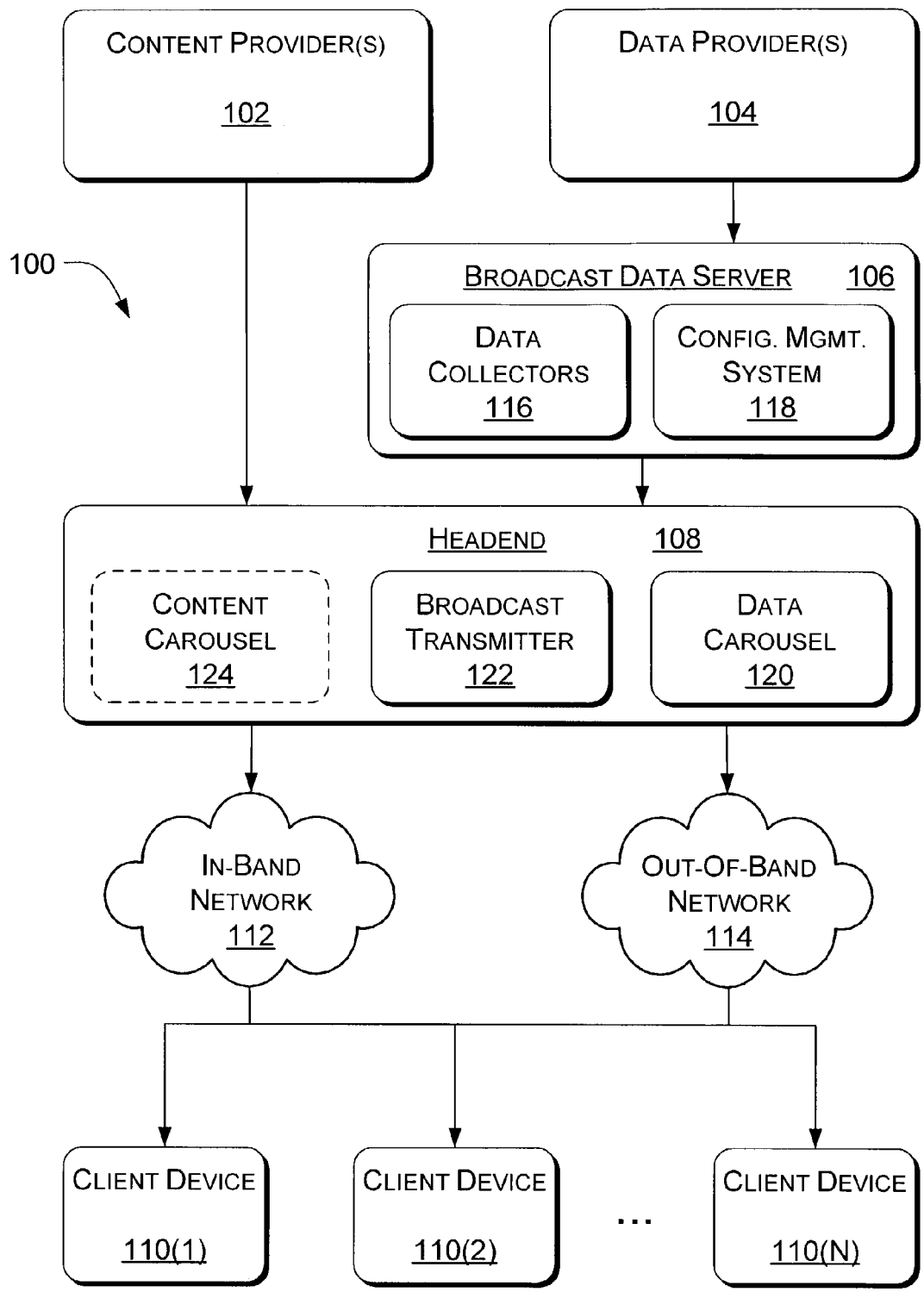
FIG. 1 illustrates an exemplary broadcast television system implemented to broadcast multiple data configurations.

The following discussion is directed to enabling broadcast of multiple data configurations in a broadcast television system. Program content (e.g., broadcast television programs, video-on-demand programs, etc.) and data (e.g., electronic program guide data, video-on-demand data, advertisements, etc.) are broadcast from a headend system, such as a cable television company to multiple client devices, such as cable television set-top boxes. In addition to broadcasting program content and associated data, the headend also broadcasts data that defines data configurations that are available to client devices receiving the broadcast data. A client device presents a viewer with a list of available configurations through a user interface that is associated with the client device. When a viewer selects an available configuration, the client device selectively receives portions of the broadcast data according to the selected configuration definition. A client device can selectively receive data according to any one of multiple configurations based on a region identifier that is associated with the client device. In one implementation, the region identifier may be assigned to the client device by a client device manufacturer. For example, digital video disc (DVD) players typically have a region identifier built into each unit that identifies a particular geographic region (e.g., North America) for which the unit is designed. In an alternate implementation, a client device may be assigned a region identifier during a cable company setup process. For example, the cable company may send a packet of data to the client device identifying the region that is associated with the client device. In another alternate implementation, an algorithm on the client device may be used to determine an appropriate region identifier based, for example, on a list of available channels. A region identifier may be based on a geographic region within which the client device is implemented or may be based on other parameters, for example, a channel lineup that may be available to a group of client devices. The region identifier can then be used by the client device to determine multiple data configurations that are available. For example, a television set-top box that is configured to receive broadcast television programs and data from a cable company in San Francisco may be able to selectively receive broadcast data based on an English configuration or based on a Spanish configuration. Alternatively, a set-top box that is configured to receive broadcast television programs and data from a cable company in New York City may be able to selectively receive broadcast data based on an English configuration, a German configuration, or a French configuration. Additional configurations may also be supported that may or may not be based on a language. For example, a child-friendly configuration may be designed to provide a simplified user interface and to allow access to a limited number of broadcast channels. In another example, alternate configurations may be designed that provide themed user interfaces based, for example, on professional sports teams or other viewer interests. Furthermore, configurations may be defined that are based on a combination of one or more themes and a language, such as an English baseball configuration, a Spanish baseball configuration, and an English/child-friendly/baseball configuration. Advertisements may also be targeted based on a chosen configuration.

Exemplary System Architecture

FIG. 1 illustrates an exemplary broadcast television system 100 implemented to enable broadcast of multiple data configurations. System 100 facilitates distribution of program content and associated data to multiple viewers. Broadcast television system 100 includes one or more content providers 102, one or more data providers 104, broadcast data server 106, headend 108, and multiple client devices 110(1), 110(2), . . . , 110(N) coupled to the headend 108 via in-band network 112 and out-of-band network 114.

Content providers 102 distribute stored program content such as movies, television programs, music, and similar audio and/or video content from content providers 102 to headend 108. Additionally, content providers 102 control distribution of live content (e.g., content that was not previously stored, such as live feeds) and/or content stored at other locations to headend 108.

Data providers 104 provide additional data to be broadcast such as advertisements, electronic program guide (EPG) data, video-on-demand (VOD) data, and so on, to broadcast data server 106.

Broadcast data server 106 receives data from data providers 104, arranges the data according to multiple data configuration definitions, and delivers the data to headend 108. Broadcast data server 106 includes data collectors 116 and configuration management system 118. Data collectors 116 gather and cache data from data providers 104. Configuration management system 118 maintains configuration definitions that are used to determine how the data that is gathered by the data collectors 116 is to be delivered to headend 108, and in turn, broadcast to client devices 110.

Headend 108 includes a data carousel 120, a broadcast transmitter 122, and may also optionally include a content carousel 124. Data carousel 120 is a storage area from which broadcast data (received from data providers 104 via broadcast data server 106) can be broadcast over out-of-band (OOB) network 114 to the multiple client devices 110. Broadcast transmitter 122 controls the transmission of program content over in-band network 112 and data over OOB network 114. Program content may be streamed directly from content providers 102 or may be received and stored in optional content carousel 124 before it is broadcast to client devices 110. Because both the quality and number of television channels is a major business point for digital television operators, the amount of bandwidth reserved for OOB network 114 is typically extremely limited compared to the amount of bandwidth reserved for the in-band network 112.

Client devices 110 are implemented to receive broadcast program content and broadcast data from headend 108 via in-band network 112 and OOB network 114. Furthermore, each client device is configured to receive a region configuration file that contains data configuration definitions that are available to the client device based on a region identifier that is associated with the client device. The client device presents a viewer with a list of available configurations using a user interface component. When a user selects a configuration, the client device then selectively receives broadcast data according to the definition of the selected configuration.

Client devices 110 can be implemented in any number of ways. For example, a client device implemented as a satellite receiver coupled to a television receives broadcast content and data from a satellite-based transmitter, and the received content and data is rendered on the television screen. A client device implemented as a cable television set-top box receives broadcast content and data over a cable network. Other example client devices include digital video recorders, TV-enabled personal computers, and so on, and may include any client device configured to receive broadcast data over a one-way, one-to-many broadcast network. Select components of an exemplary client device are described in more detail below, with reference to FIG. 8.

Exemplary Broadcast Data Server

Figure 2:
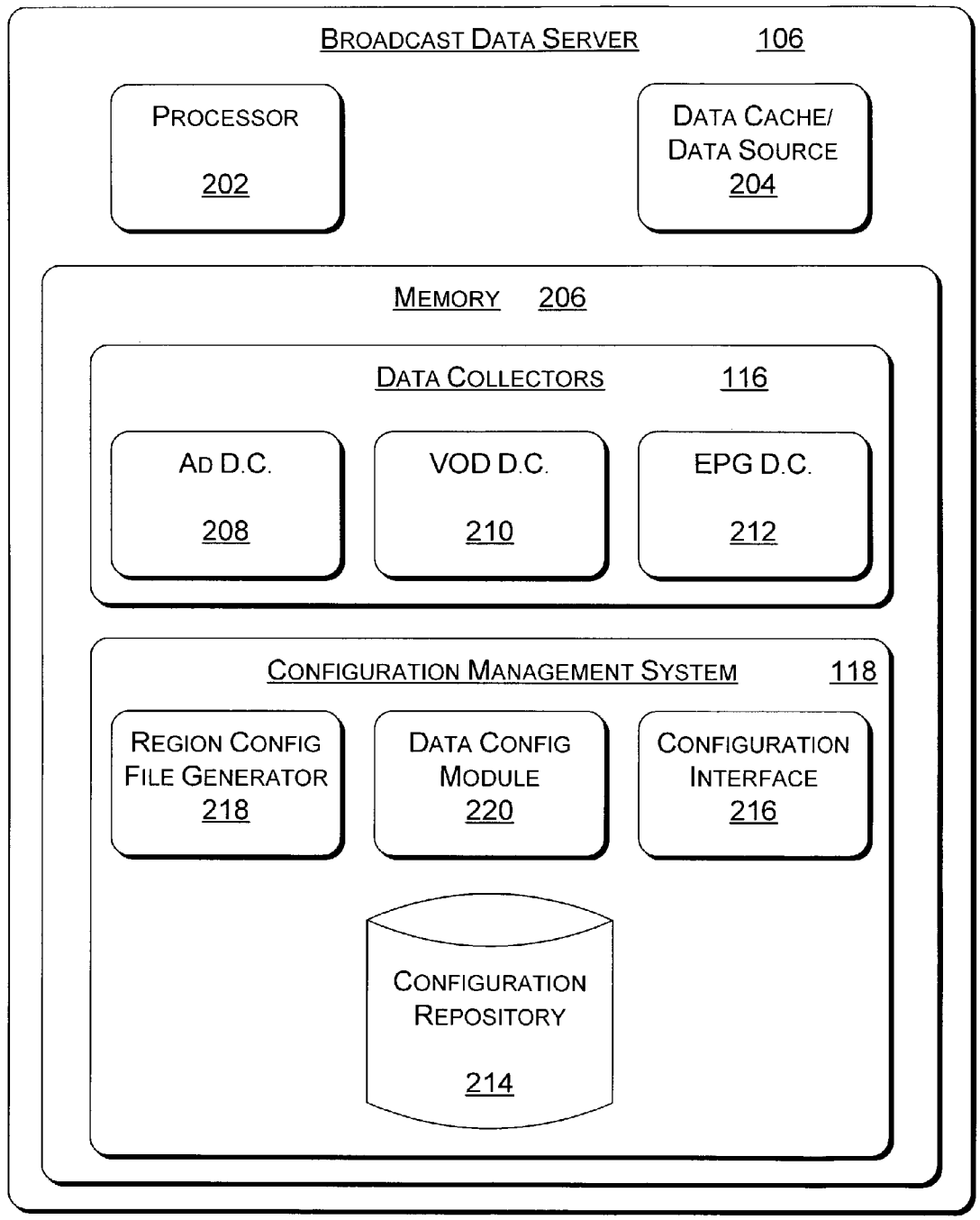
FIG. 2 illustrates select components of an exemplary broadcast data server employed in the broadcast television system of FIG. 1.

FIG. 2 illustrates select components of an exemplary broadcast data server 106. Broadcast data server 106 includes a processor 202, a data cache 204 (which also serves as a data source), and memory 206. Additionally, data collectors 116 and configuration management system 118 are stored in memory 206 and executed on processor 202.

Data collectors 116 receive data from data providers 104 and store the received data in data cache 204. In the illustrated implementation, data collectors 116 include an ad data collector 208 for receiving advertisement data, a video-on-demand (VOD) data collector 210 for receiving data that describes available on-demand video titles, and an electronic program guide (EPG) data collector 212 for receiving EPG data. Each data collector may receive data from one or more data providers 104. Furthermore, data collectors 116 are not limited to ad data collector 208, video-on-demand (VOD) data collector 210, and EPG data collector 212, which are merely representative examples of specific data collectors that may be implemented.

Configuration management system 118 includes a configuration repository 214, a configuration interface 216, a region configuration file generator 218, and a data configuration module 220. Configuration repository 214 stores data that defines regions, configurations, and mappings between the defined regions and configurations. An exemplary configuration repository structure is described in more detail below with reference to FIGS. 3-5. Configuration interface 216 provides access to configuration repository 214, providing a mechanism for system administrators to create and maintain region definitions, configuration definitions, and region/configuration mappings. In one implementation, the region definitions are typically generated by a headend (e.g., a cable company), and entered into the configuration repository 214 using the configuration interface 216.

Region configuration file generator 218 generates, for each region defined in configuration repository 214, a formatted region configuration file that specifies how a client device 110 can selectively receive broadcast data according to each configuration associated with the defined region. In the described implementation, each region configuration file specifies file directory structures associated with each configuration. In one implementation, region configuration file generator 218 is implemented as a data collector 116 that gathers data from configuration repository 214 instead of from data providers 104.

Data configuration module 220 copies data from data source 204 (which is the cache memory location where the data was stored when it was received from data providers 104) to data carousel 120 according to the file directory structures specified in each region configuration file. After the data is copied to data carousel 120, the data is broadcast over OOB network 114 and client devices 110 are able to selectively receive data associated with one of many data configurations based on a region identifier that is associated with each particular client device 110. For example, a particular client device may be associated with a region identifier that is in turn associated with multiple configurations (in configuration repository 214, and thus in a region configuration file). A viewer using the client device can then select one of the multiple available configurations, causing client device 110 to selectively receive portions of broadcast data according to the selected configuration. The amount of data that is broadcast is minimized by the fact that each particular piece of data is broadcast only once, even though a particular piece of data may be applicable to multiple configurations. In such an instance, multiple client devices each having a different configuration selected may all receive the data that is common among the selected configurations. Region configuration files are described in more detail below with reference to FIG. 6.

Exemplary Configuration Repository Structure

Figure 3:
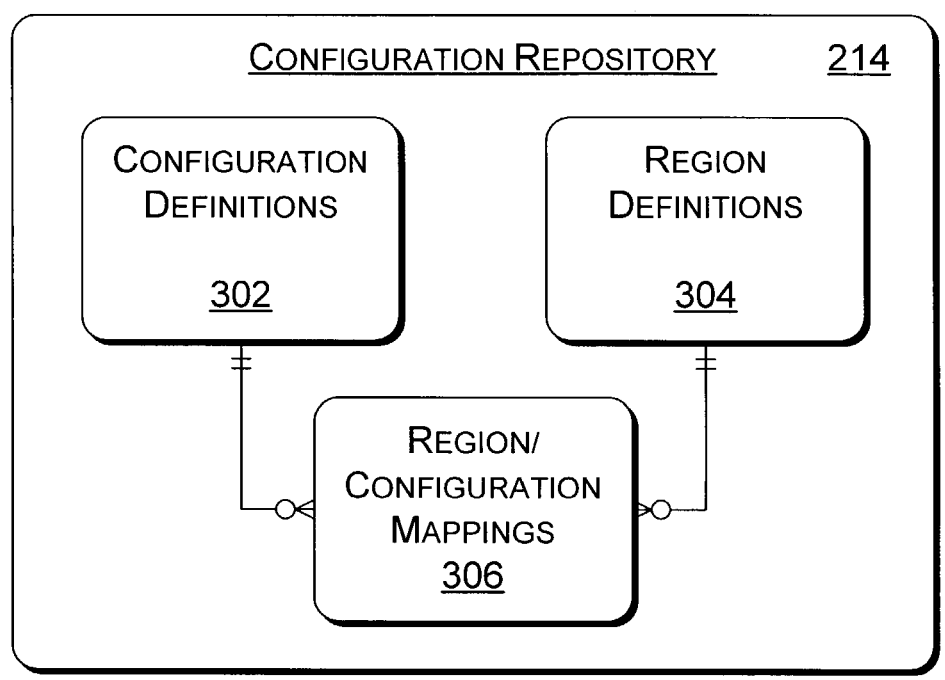
FIG. 3 illustrates an exemplary structure of a configuration repository employed in the broadcast data server of FIG. 2.

FIG. 3 illustrates an exemplary structure of configuration repository 214, implemented at the broadcast data server 106 of FIG. 2. Configuration repository 214 stores multiple data configuration definitions 302 and multiple region definitions 304. Each configuration definition 302 identifies data to be used by a client device 110 to selectively receive broadcast data according to the configuration definition. In the described implementation, each configuration definition 302 identifies a group of data carousel directories from which data can be broadcast.

Each region definition 304 identifies a region that can be associated with a set of client devices. In the described implementation, each client device 110 is assigned a region identifier when the client device is provisioned by a broadcast provider. The client device region identifier corresponds to a region definition 304 maintained by configuration repository 214. A region may be defined based on a geographic region, or may be based on any other parameters. For example, a first cable company may acquire a second cable company that services client devices within the same geographical region, but because the client devices were originally serviced by different cable companies, they may be associated with different region identifiers. In an alternate implementation, a region may be based on a channel lineup that is available to a group of client devices.

Configuration repository 214 also stores region/configuration mappings 306 that define which of the defined configurations 302 are available to client devices associated with each of the defined regions 304. In an exemplary implementation, each defined configuration is identified by a configuration ID and each defined region is identified by a region ID. In such an implementation, region/configuration mappings 306 are defined in terms of region ID/configuration ID pairs.

Exemplary Configuration Definition Structure

Figure 4:
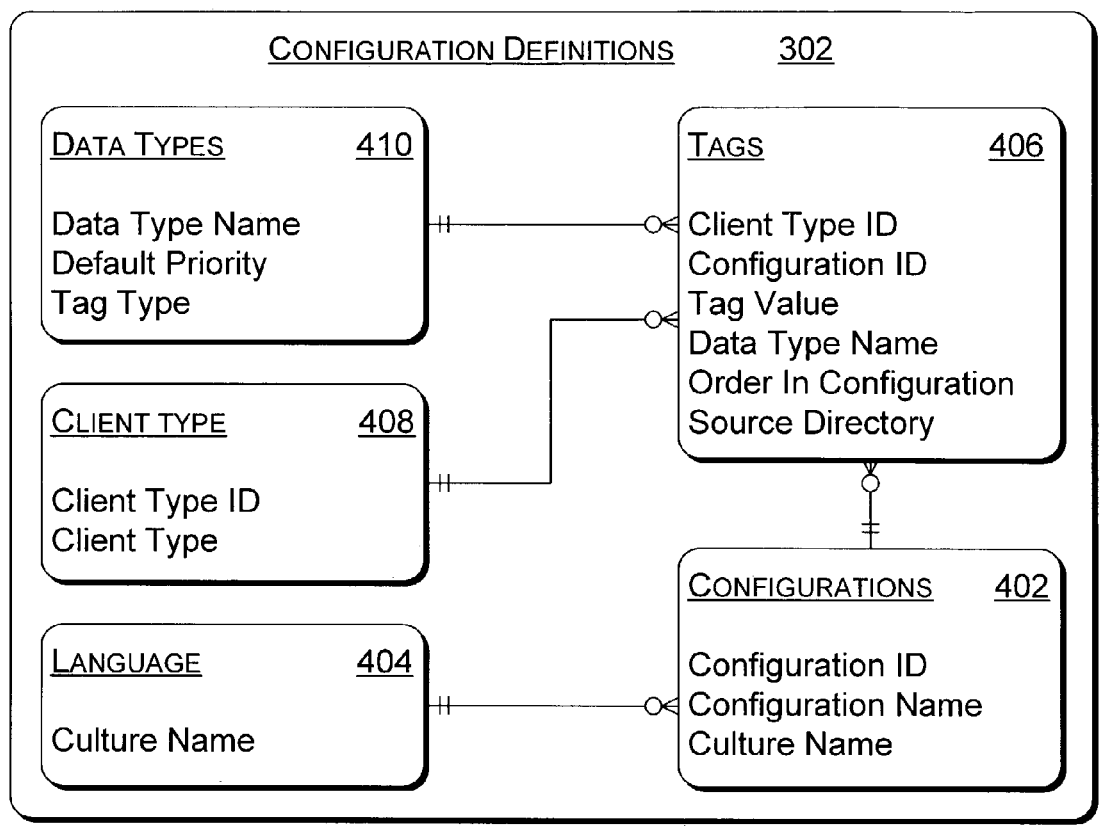
FIG. 4 illustrates an exemplary data structure for a configuration definition that is stored in the configuration repository of FIG. 3.

FIG. 4 illustrates an exemplary configuration definition data structure 302. In the illustrated implementation, configurations table 402 stores one record for each defined configuration. Language table 404 stores a list of valid culture names, and is used as a lookup table of valid values for the culture name field in configurations table 402. Tags table 406 records details associated with each defined configuration, and stores one record for each data type that may be associated with a particular configuration. Client Type table 408 stores data that identifies types of client devices that may be capable of supporting one or more configurations, and is used as a lookup table of valid values for the client type ID field in tags table 406. Data types table 410 stores a list of data types which may be associated with a configuration, and is used as a lookup table of valid values for the data type name field in tags table 406.

Table 1 illustrates the structure of an exemplary configurations table 402.

TABLE 1

| FIELD NAME | DESCRIPTION |
| --- | --- |
| Configuration ID | Unique identifier used to identify each particular configuration. |
| Configuration Name | Descriptive name of the configuration. This name can be displayed to viewers in a menu of available configurations. Examples may include, English, Espanõl, Deutsch, Child Appropriate, Seattle Mariners, Baseball Child, etc. |
| Culture Name | Indicates a language associated with the configuration. In one implementation, International Organization for Standardization (ISO) language codes are used. Examples may include en-US, es-MX, etc. In the described implementation, each culture name value maps to a value in language table 404. |

Tags table 406 records details associated with each defined configuration, and stores one record for each data type that may be associated with a particular configuration. Table 2 illustrates the structure of an exemplary tags table 406.

TABLE 2

| FIELD NAME | DESCRIPTION |
| --- | --- |
| Client Type ID | Indicates a type of client device for which the defined tag is supported. In the described implementation, each client type ID value maps to a value in client type table 408. Example client type IDs are described below with reference to client type table 408. |
| Configuration ID | The unique identifier of a particular configuration, and indicates which configuration definition the tag is associated with. Each configuration ID value maps to a configuration ID in configurations table 402. |

TABLE 2-continued

| FIELD NAME | DESCRIPTION |
| --- | --- |
| Tag Value | Specifies a source location associated with a particular data type. In the described implementation, the tag value specifies a directory name in data carousel 120 where data of the type specified in this particular record is to be stored and broadcast from. |
| Data Type Name | Specifies a data type that is associated with the specified tag. In the described implementation, each data type name value maps to a value in data types table 410. Example data types are described below with reference to data types table 410. |
| Order In Configuration | Stores an integer value that specifies a relative order of tags associated with the specified configuration. |
| Source Directory | Specifies a location in data source 204 where data of the type specified is stored. For some data types, such as targeted advertisements, a source directory may not be specified, and other mechanisms may be implemented to enable the system to locate the corresponding data. |

Client type table 408 stores data that identifies types of client devices that may be capable of supporting one or more configurations. Table 3 illustrates the structure of an exemplary Client type table 408.

TABLE 3

| FIELD NAME | DESCRIPTION |
| --- | --- |
| Client Type ID | Unique identifier used to identify each particular type of client device. |
| Client Type | Stores a descriptive name of each identified client device type. In the described implementation, the client type is based on a name and a version associated with a client software application that is implemented on the client device. In one implementation, the client software application is installed on the client device by a cable operator. Example client types may include, but are not limited to, BASIC1.0 (name = "BASIC", version = "1.0") and IPG1.5 (name = "IPG", version = "1.5"). A wildcard value (e.g., "*") may be used to indicate that a particular data tag is supported by all client types. In one implementation, a client device first looks for configurations in which the client type value matches both a name and a version associated with the client. If none are found, the client then looks for configurations in which the client type value matches the name associated with the client. If none are found, the client then looks for configurations in which the client type value is a wildcard. |

Data types table 410 stores a list of data types that may be associated with one or more configurations. Table 4 illustrates the structure of an exemplary data types table 410.

TABLE 4

| FIELD NAME | DESCRIPTION |
| --- | --- |
| Data Type Name | Stores the name of a data type that may be associated with one or more configurations. Examples may include bootstrap, language, pages, ad, and so on. A data type may be used to define any logical grouping of data. |
| Default Priority | Stores an integer value that indicates a priority to be associated with the designated data type. A tag type field (described below) indicates whether a particular data type is required or optional. The default priority field may be used to define a priority order of data |

TABLE 4-continued

| FIELD NAME | DESCRIPTION |
| --- | --- |
| | types within a particular tag type. A client device 110 may be implemented to selectively receive broadcast data according to the priority order of data types associated with a selected configuration. In one implementation, a data rate allocated on data carousel 120 to a particular data type may be determined based on the default priority value. |
| Tag Type | Stores a value that indicates a category associated with the designated data type. Example values include MET (metadata), REQ (required), and OPT (optional). In the described implementation, metadata tags are used to identify descriptive data types, required tags are used to identify required data types, and option tags are used to identify optional data types. |

Exemplary Region Definition Structure

Figure 5:
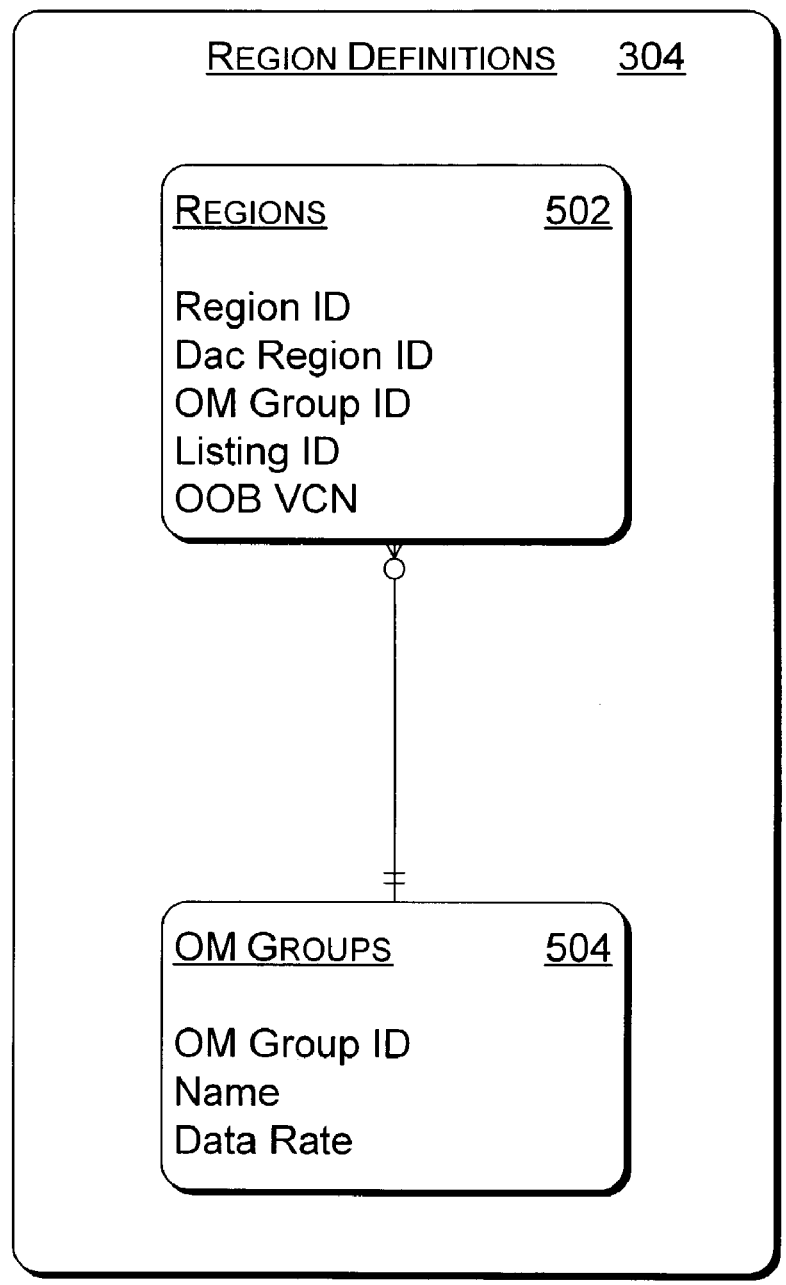
FIG. 5 illustrates an exemplary data structure for a region definition that is stored in the configuration repository of FIG. 3.

FIG. 5 illustrates an exemplary region definition data structure 304. In the illustrated implementation, regions table 502 stores one record for each defined region. OM groups table 504 stores data that identifies groups of out-of-band modulators (OM), each of which is configured to send data on a specified frequency across a network. Different client device types may be configured to receive data on different frequencies. By associating a region with an OM group, the same data can be broadcast over multiple frequencies, enabling each supported client device type to receive the data. The OM groups table 504 is used as a lookup table of valid values for the OM group ID field in the regions table 502.

Table 5 illustrates the structure of an exemplary regions table 502.

TABLE 5

| FIELD NAME | DESCRIPTION |
| --- | --- |
| Region ID | Unique identifier used to identify each particular region. In one implementation, the region ID is an integer number between 0 and 65535. |
| OM Group ID | Identifies a group of out-of-band modulators that are configured to send data associated with the specified region. The values in the OM group ID field map to values in the OM groups table 504. |
| Listing ID | Identifies a channel lineup associated with the defined region and matches a listing ID provided by an EPG data provider. For example, an EPG data provider may provide listing data for multiple regions (particularly geographic regions, such as multiple time-zones). Associating a listing identifier with a region definition ensures that a client device associated with the specified region obtains listing data that is appropriate according to the region associated with the client device. |
| OOB VCN | Defines a virtual channel number that is associated with OOB network 114. |

Table 6 illustrates the structure of an exemplary OM groups table 504. As described above, an OM group is a group of out-of-band modulators that are implemented to broadcast the same data over multiple frequencies.

TABLE 6

| FIELD NAME | DESCRIPTION |
| --- | --- |
| OM Group ID | Unique identifier used to identify particular OM group. |
| Name | A unique name assigned to an OM group. |

TABLE 6-continued

| FIELD NAME | DESCRIPTION |
| --- | --- |
| Data Rate | The total data rate that is available on OOB network 114 for broadcasting data. In one implementation, the total available data rate may be divided among data based on the priorities assigned to each data type. (Default Priority is described above with reference to Table 4.) |

Exemplary Region Configuration File Format

As described above with reference to FIG. 2, region configuration file generator 218 of configuration management system 118 generates a formatted region configuration file for each region defined in configuration repository 214. Each formatted region configuration file specifies a file directory structure to be implemented in data carousel 120 for each configuration associated with the defined region. In one implementation, the region configuration file is formatted as an XML file. Other formats that may be used for a region configuration file may include, but are not limited to, a custom flat file format. In one implementation, each generated region configuration file is named as xxxx.rgncfg where xxxx is a four byte hexadecimal representation of an integer region ID associated with the region, prepended with zeros, as necessary. In the described implementation, each xxxx.rgncfg file is stored in a \regionconfig directory in data carousel 120.

Figure 6:
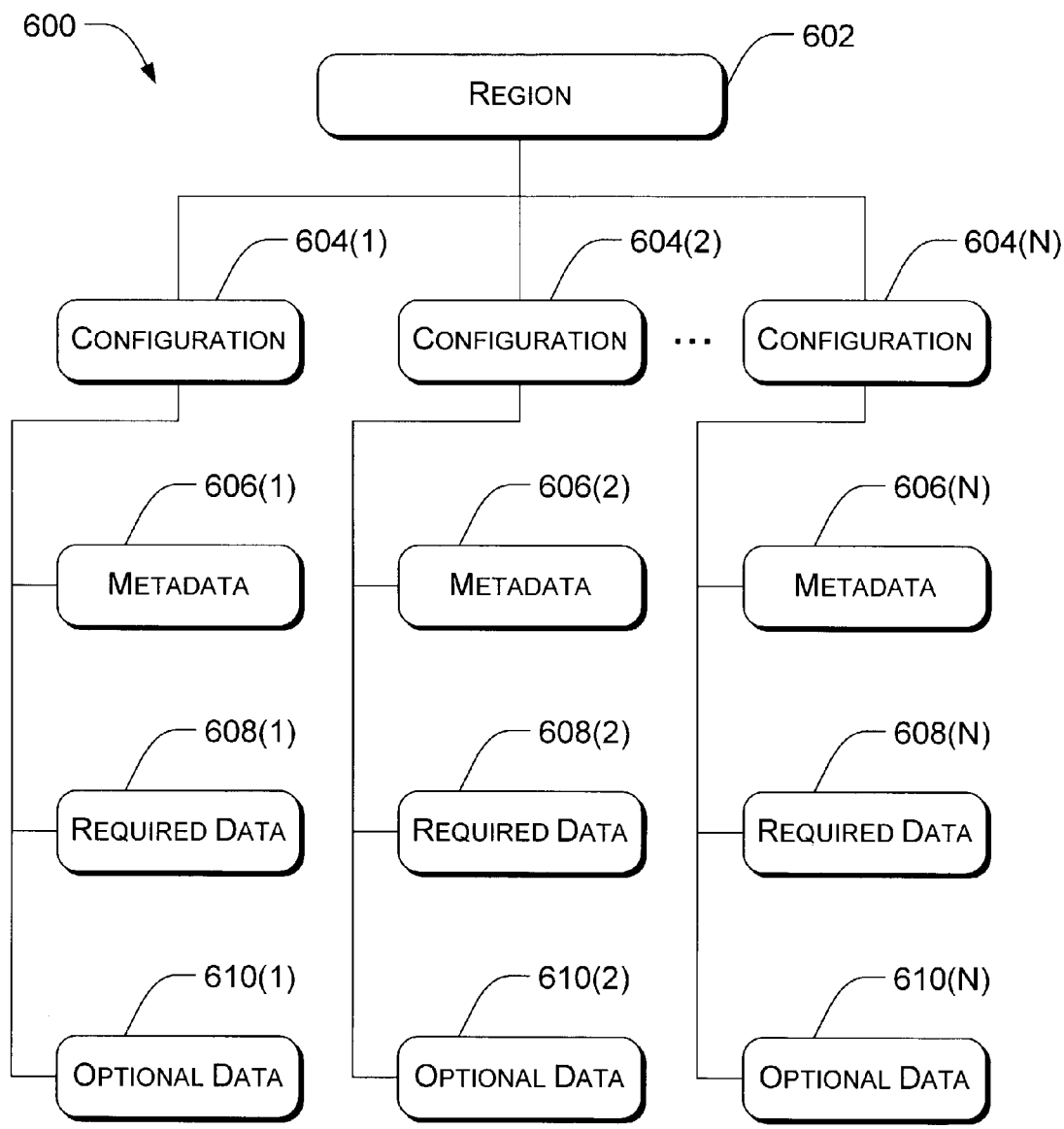
FIG. 6 illustrates an exemplary structure of a region configuration file that is generated based on data stored in the configuration repository of FIG. 3.

FIG. 6 illustrates an exemplary structure of a file generated by region configuration file generator 218. Region configuration file 600 is formatted according to a hierarchical structure in which a region entry 602 is the root. Region entry 602 corresponds to a particular region definition 304.

One or more configuration entries 604(1), 604(2), . . . , 604(N) are associated with each region entry 602. Each configuration entry 604 corresponds to a particular configuration definition 302. Furthermore, in region/configuration mappings 306, each configuration definition 302 that corresponds to a configuration entry 604 is mapped to the region definition 304 that corresponds to region entry 602.

Data tags based on data stored in the tags table 406 are then associated with each configuration entry 604. For example, metadata tags 606(1), required data tags 608(1) and optional data tags 610(1) are associated with configuration entry 604(1); metadata tags 606(2), required data tags 608(2) and optional data tags 610(2) are associated with configuration entry 604(2); and metadata tags 606(N), required data tags 608(N) and optional data tags 610(N) are associated with configuration entry 604(N). The order of the tag entries associated with each configuration entry is determined based on the order in configuration field in tags table 406. The order of the tags may also determine the order in which a client device 110 the data associated with a particular configuration.

Metadata tags 606 are used to specify information about each particular configuration. In the described implementation, metadata includes an ID and a description. The ID metadata value is stored in the tag value field of a record in tags table 406 in which the data type field value is ID. In one implementation, the ID metadata is a decimal unsigned integer between 0 and 65535, and is the same as the configuration ID field value in the configurations table. This implementation allows a client device to conveniently store a default configuration ID so that a viewer does not have to select a configuration every time the client device is powered on. When the client device is powered off and then back on, the last selected configuration is displayed (based on the configuration ID stored in memory) until a viewer selects a different configuration. Storing a configuration identifier on the client device is also an improvement over implementations that may instead store an index that indicates the position of a selected configuration in the region configuration file. For example, a client device may receive a region configuration file that lists English, Spanish, and German, in that order, as the available configurations. If the viewer selects Spanish, the client device may store an index value of "2", indicating that the viewer selected the $2^{nd}$ available configuration. If the region configuration file is later modified to contain English, French, and Spanish, in that order, then the next time the client device is powered on, the French configuration will automatically be selected because it is now the $2^{nd}$ available configuration. Accordingly, storing an identifier, rather than just an index, associated with a selected configuration ensures consistent configuration selection even if the region configuration file structure changes.

In one implementation, if a configuration ID is not stored in memory (e.g., a viewer has never selected a specific configuration), the client device automatically selects the first configuration listed in the region configuration file.

The description metadata represents a string that can be presented to the viewer in a menu of available configurations. The value of the description metadata corresponds to the value of the configuration name field in configurations table 402.

Required tags 608 are used to specify data that is central to the operation of a client device, and may vary according to client device type. In the described implementation, required data types include:
bootstrap
bootstrap_language
pages
language
ad
config
lcl_epg_base
appdisc
lcl_epg_ext.

Bootstrap data is that data which is necessary to support displays associated with basic client device functions such as channel browsing, volume display, unlocking of locked programs, and so on.

Bootstrap_language data contains resource files and language fonts used in conjunction with the bootstrap data described above.

Pages data includes a base set of display files that the client uses, containing such things as fonts, page descriptor files, bitmaps, style descriptor files, and so on. Pages data may also contain script files, which may be executed at load time to set environment variables, customizable strings, and so on. In one implementation, individual files may be concatenated into carousel blobs, which carry the extension ".blb".

Language data contains statically displayed strings, which provide a consistent page display layout across configurations. In one example, different strings may be loaded to display different languages. Language data may also contain layout overrides to be used, for example, when a string's translation into another language is too large to fit into the standard layout, necessitating an override layout.

By dividing data among the bootstrap, bootstrap_language, pages, and language data types, two important data divisions are made. First, taken together, the data of types bootstrap and bootstrap language make up the minimal set of data necessary to provide basic functionality of a client device. Taken together, the pages and language data types, make up the additional data that may be displayed in association with other functionality of the client device. Second, the bootstrap and pages data types both contain layout data, while the bootstrap_language and language data types both contain specific text data that can be displayed using the layouts described by the data in the bootstrap and pages data types. If several different language configurations are made available to a client device, it is likely that the layout data may be the same, and only the actual text differs between the different configurations. Accordingly, only one set of layout data needs to be broadcast while several sets of text data needs to be broadcast. In other words, the same bootstrap and/or pages data may be associated with multiple configurations, each having different bootstrap_language and language data. Furthermore, the layout data is typically more complex than the text data, so being able to send only one set of layout data to support multiple configurations can save a considerable amount of bandwidth.

In some situations, layout data may differ slightly across different configurations, for example in a situation where a particular word or phrase in one language is significantly longer than in other languages, necessitating a larger button or text frame for the one language. To support such a situation while minimizing the amount of data that is broadcast, override layout data may be included in an appropriate text datatype associated with a particular configuration. For example, as the client receives data, the bootstrap data is received first (which includes layout data), followed by the bootstrap_language data (which includes text that applies to the layouts defined by the bootstrap data). Accordingly, any layout data received in the bootstrap_language data overrides any layout data first received in the bootstrap data. Similarly, override layout information can be included in the language or config data type to override layout information specified in the pages data type. As received data that is maintained by the client is re-synchronized with data that is currently being broadcast, the updated broadcast data is acquired in the order specified in the region configuration file. However, when an application (e.g., a user interface) requests a particular broadcast data file, the client searches locations associated with the data types defined in the selected configuration definition in reverse order, so as to encounter an override file before encountering the standard file, in an instance where the requested file exists in both a standard location (e.g., layout data in the bootstrap data type location) and in an override location (e.g., layout data in the bootstrap_languages data type location).

Ad data consists of a collection of advertisements. In addition, it may also contain an ad digest file, depending on the client device type. An ad digest file lists the advertisements that are currently available for broadcast and data that indicates when particular advertisements should be displayed. The ad digest file typically includes a title, bitmap name, and click-through data associated with each available advertisement. The ad digest file may be used, for example, to implement targeted advertisement based on viewer interests. In one implementation, an ad digest for a client device of type IPG1.5 is contained in a file named "metadata.ads". An ad digest for a client device of type BASIC1.0 is contained in a file called "AdDigest.gz", which is a compressed XML file.

Config data potentially contains anything that can be in the pages data type, and indicates small tweaks to the overall pages directory. For example, config data may include an override bitmap to be loaded for display in place of a default bitmap on a menu page. A local helpdesk number is another example of data that may be included using config data.

Lcl_epg_base data includes basic EPG data. In one implementation, lcl_epg_base contains two directories, data00 and data01, while data00 contains detailed EPG data for the current time slice. Data01 contains less detailed EPG data for the next time slice. In one implementation, a time slice is defined as a 12 hour period, but it is recognized that any segment of time may be implemented as a time slice. Files stored in the data00 and data01 directories are in a format that is understood by an EPG application implemented in the client device. The contents of both of these directories are preferably small enough for any client device type assigned to this region to store. In one implementation, the sizes of the data00 and data01 directories are configurable.

The appdisc data type can be used to communicate an application and services catalog. The application and services catalog contains information that describes additional applications and services that may be available for a client device to download. In the described implementation, the appdisc data type can be targeted for specific client types based, for example on name/version, name, or "*" (to indicate applicability to all client types). (Client type is described above with reference to Table 3.)

In one implementation, required data types may also be further grouped according to how the different data types are related. For example, the bootstrap and bootstrap_language data types may be grouped together and the pages and language data types may be grouped together. As a client receives data, no data of a particular data type will be displayed until all of the data in the same group is also successfully received. For example, if a client receives bootstrap data, but does not receive bootstrap language data, then page layouts may be displayed, but they would have no text, and would thus be useless. By grouping related data types, the client is ensured of receiving all necessary data before attempting to display any of the received data. In one implementation, data type groups may be defined in terms of how the data types are named. For example, all data types that begin with "bootstrap" may be considered one group. In an alternate implementation, a group ID field may be added to tags table 406 and to each entry in the region configuration file, identifying which group each data type belongs to.

Optional tags 610 are used to specify data that can be optionally downloaded by a client device as resources allow. In the described implementation, optional data includes extended EPG listing data (data type lcl_epg_ext), which contains some number of subdirectories, numbered data02-dataYY, where YY is the highest numbered directory, formatted as a two-digit decimal number. Client devices with sufficient memory available may selectively receive data from these directories after receiving all other types of data on startup, and/or when a change in guide data is detected. Each higher-numbered directory contains EPG data associated with a later time slice. The client device continues reading data from subsequent directories until the client device reaches a specified memory limit or has read all of the directories.

An example region configuration file may be formatted as follows:

```
<rgn>
    <cfg>
        <met name="id" ver="*" val="1"/>
        <met name="description" ver="*" val="English"/>
        <req name="bootstrap" ver="IPG" val="ipg_en_bootstrap"/>
        <req name="bootstrap" ver="Basic" val="basic_en_bootstrap"/>
        <req name="bootstrap_language" ver="*"
            val="bootstrap_en_US"/>
        <req name="pages" ver="IPG" val="ipg_en_pages"/>
```

-continued

```
        <req name="pages" ver="Basic" val="basic_en_pages/>
        <req name="config" ver="IPG" val="ipg_en_contig"/>
        <req name="config" ver="Basic" val="basic_en_config"/>
        <req name="language" ver="*" val="en_US"/>
        <req name="lcl_epg_base" ver="*" val="english_baseguide"/>
        <req name="ad" ver="IPG" val="ipg_en_ads"/>
        <req name="ad" ver="Basic" val="basic_en_ads"/>
        <req name="appdisc" ver="Basic" val="basic_appdisc"/>
        <opt name="lcl_epg_ext" ver="*" val="english_extguide"/>
    </cfg>
    <cfg>
        <met name="id" ver="*" val="2"/>
        <met name="description" ver="*" val="Español"/>
        <req name="bootstrap" ver="IPG" val="ipg_es_bootstrap"/>
        <req name="bootstrap" ver="Basic" val="basic_es_bootstrap"/>
        <req name="bootstrap_language" ver="*"
            val="bootstrap_sp-MX"/>
        <req name="pages" ver="IPG" val="ipg_es_pages"/>
        <req name="pages" ver="Basic" val="basic_es_pages"/>
        <req name="config" ver="IPG" val="ipg_es_config"/>
        <req name="config" ver="Basic" val="basic_es_config"/>
        <req name="language" ver="*" val="sp-MX"/>
        <req name="lcl_epg_base" ver="*" val="spanish_baseguide"/>
        <req name="ad" ver="IPG" val="ipq_sp_ads"/>
        <req name="ad" ver="Basic" val="basic_sp_ads"/>
        <req name="appdisc" ver="Basic" val="basic_appdisc"/>
        <opt name="lcl_epg_ext" ver="*" val="Spanish_extguide"/>
    </cfg>
</rgn>
```

The <rgn> tag indicates the beginning of a region definition, and the </rgn> tag indicates the end of a region definition. Each <cfg> and </cfg> tag pair indicates the beginning and end of a configuration definition.

Each tag between a <cfg> and </cfg> tag pair corresponds to a record in the tags table 406 and has the following format:

<tag type name="data type name" ver="client type" val="tag value"> where "tag type" is the tag type field value of the corresponding record in data types table 410; "data type name" is the data type name field value of the corresponding record in tags table 406; "client type" is the client type field value of the corresponding record in client type table 408; and "tag value" is the tag value field value of the corresponding record in tags table 406. The order of the tag entries between a <cfg> and </cfg> tag pair may be determined based on the values of the order in configuration fields of each tag record in tags table 406.

In the described implementation, each data type and value specified in the region configuration file corresponds to a directory in the data carousel 120. Accordingly, the example region configuration file shown and described above assumes the following directory structure on data carousel 120:

```
/
    regionconfig
    bootstrap
        ipg_en_bootstrap
        basic_en_bootstrap
        ipg_es_bootstap
    bootstrap_language
        bootstrap_en-US
        bootstrap_sp-MX
    pages
        ipg_en_pages
        basic_en_pages
        ipg_es_pages
    config
        ipg_en_config
        basic_en_config
        ipg_es_config
```

-continued

```
language
   en-US
   sp-MX
appdisc
   basic_appdisc
ad
   ipg_en_ads
   basic_en_ads
   ipg_sp_ads
   basic_sp_ads
lcl_epg_bas
   english_baseguide
   spanish_baseguide
lcl_epg_ext
   english_extguide
   spanish_extguide
```

Method for Enabling Broadcast of Multiple Data Configurations

As described above, broadcast data server 106 maintains multiple data configuration definitions and provides those definitions to headend system 108 for broadcast to multiple client devices 110. Each client device 110 is associated with a region, and broadcast data server 106 maintains mappings of the configuration definitions to the regions, so that client devices associated with different regions may have access to different combinations of data configurations.

Enabling broadcast of multiple data configurations as performed by broadcast data server 106 may be described in the general context of computer-executable instructions, such as application modules, being executed by a computer. Generally, application modules include routines, programs, objects, components, data structures, etc. that perform particular tasks or implement particular abstract data types. A broadcast data server that enables a headend to broadcast multiple data configurations may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 7:
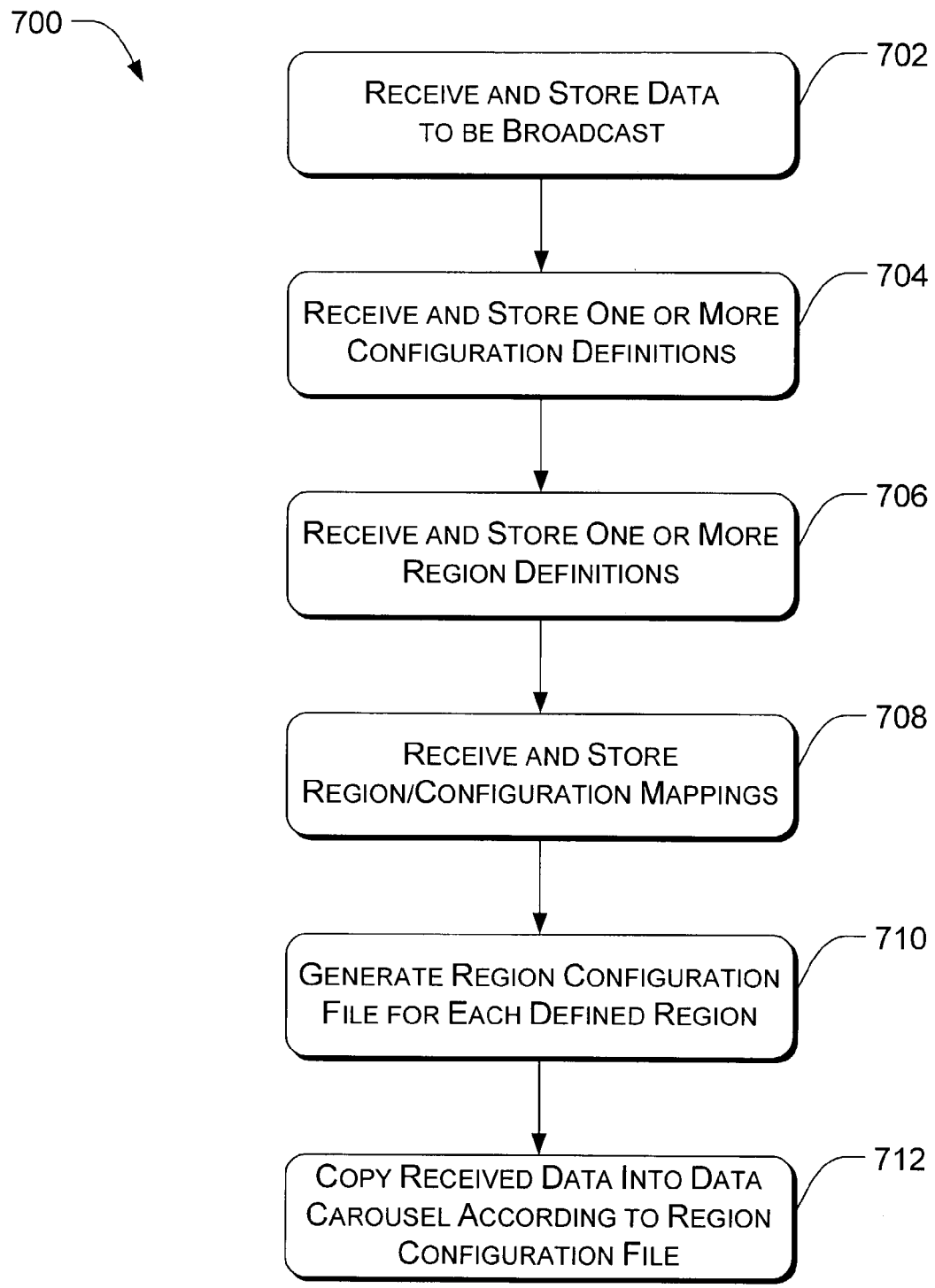
FIG. 7 illustrates an exemplary method for enabling broadcast of multiple data configurations.

FIG. 7 illustrates a method 700 for enabling broadcast of multiple data configurations. For illustrative purposes, FIG. 7 will be described with reference to components illustrated in FIGS. 1 and 2.

At block 702, broadcast data server 106 receives and stores broadcast data. For example, data collectors 116 gather data from data providers 104 and store the data in data cache 204. The gathered data may include, but is not limited to, advertisements, VOD data, and EPG data.

At block 704, broadcast data server 106 receives and stores one or more configuration definitions. In the described implementation, configuration definitions are submitted by a system administrator through configuration interface 216 and stored in configuration repository 214.

At block 706, broadcast data server 106 receives and stores one or more region definitions. In the described implementation, region definitions are submitted by headend 108 through configuration interface 216 or through an initialization process that establishes a relationship between broadcast data server 106 and headend 108. The region definitions are stored in configuration repository 214.

At block 708, broadcast data server 106 receives region/configuration mappings and stores the mappings in configuration repository 214. At block 710, region configuration file generator 216 generates a region configuration file for each region definition stored in configuration repository 214. In the described implementation, each region configuration file identifies one or more configurations associated with a region and includes formatted XML tags that indicate data carousel 120 directories from which data associated with each configuration can be downloaded. The region configuration files are written to a directory location on data carousel 120 where they can be downloaded by client devices 110.

At block 712, data configuration module 220 copies the data that was received from data providers 104 and stored in data cache 204 into directories on data carousel 120, based on the defined data configurations stored in configuration repository 214.

Although illustrated sequentially, the operations shown in FIG. 7 do not necessarily execute in the order shown. For example, configuration definitions, region definitions, and region/configuration mappings may be established first, followed by numerous iterations of gathering data and copying data to the data carousel.

Exemplary Client Device

Figure 8:
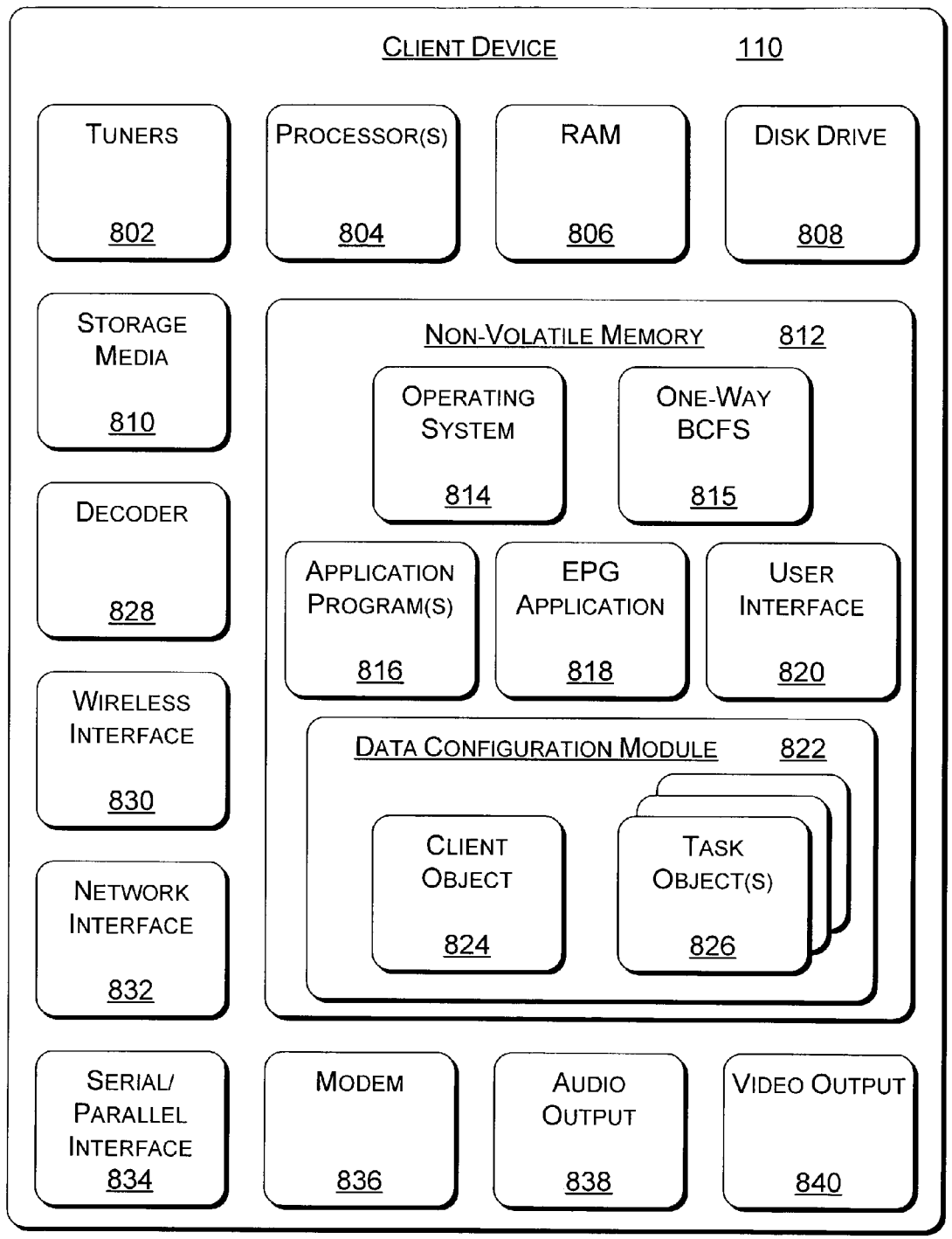
FIG. 8 illustrates select components of an exemplary client device employed in the broadcast television system of FIG. 1, and implemented to selectively receive broadcast data according to any one of multiple data configurations.

FIG. 8 illustrates select components of exemplary client device 110 shown in FIG. 1. Client device 110 includes tuners 802, which are representative of one or more in-band tuners that tune to various frequencies or channels to receive television broadcast signals, as well as another tuner that may be configured to tune to a broadcast channel corresponding to OOB network 114 over which the data stored in data carousel 120 is broadcast. Alternatively, tuners 802 may represent a single tuner that is configured to simultaneously receive multiple data streams (including both program content and broadcast data) over a single channel.

Client device 110 also includes one or more processors 804 that process various instructions to control the operation of client device 110 and to communicate with other electronic and computing devices. Client device 110 can be implemented with one or more computer-readable memory components, examples of which include a random access memory (RAM) 806, a disk drive 808, a mass storage component 810, and a non-volatile memory 812 (e.g., ROM, Flash, EPROM, EEPROM, etc.). The memory components (e.g., RAM 806, disk drive 808, storage media 810, and non-volatile memory 812) store various information and/or data such as received content, EPG data, configuration information for client device 110, and/or graphical user interface information. Non-volatile memory 812 is also configured to maintain an identifier associated with the last selected configuration definition so that the same configuration can be selected if the client device 110 is powered off and back on again.

Alternative implementations of client device 110 can include a range of processing and memory capabilities, and may include more or fewer types of memory components than those illustrated in FIG. 8. For example, full-resource clients can be implemented with substantial memory and processing resources, including the disk drive 808 to store content for replay by the viewer. Low-resource clients, however, may have limited processing and memory capabilities, such as a limited amount of RAM 806, no disk drive 808, and limited processing capabilities of processor 804.

An operating system 814 and one or more application programs 816 may be stored in non-volatile memory 812 and executed on processor 804 to provide a runtime environment. A runtime environment facilitates extensibility of client device 110 by allowing various interfaces to be defined that, in turn, allow application programs 816 to interact with client device 110.

One-way broadcast carousel file system (BCFS) 815 is configured to interact with OOB network 114 to synchronize data maintained by client device 110 with data that is being broadcast over OOB network 114. As illustrated, BCFS 815 is implemented as a software application that is stored in non-volatile memory 812 and executed on processor 804. Alternatively, (BCFS) 815 may also be implemented as one or more hardware components or as part of operating system 814. In each particular implementation, BCFS 815 is associated with (or is at least configured according to) the particular data carousel 120 from which the client device 110 receives broadcast data.

BCFS 815 is typically configured to perform a seek directory operation, a seek file operation, a sync directory operation, and a sync file operation. Alternatively, BCFS 815 may be configured to perform more basic operations, and the operations listed above are available through an interface to BCFS 815 implemented, for example, as part of operating system 814.

The seek directory operation is called (with a directory as a parameter) to determine whether data associated with a particular local directory is synchronized with data being broadcast over OOB network 114 from a directory of the same name on data carousel 120. The seek directory operation returns an indicator of whether or not the specified local directory is synchronized with the directory being broadcast and a size of the data that is being broadcast from the specified directory (e.g., in bytes).

The seek file operation is called (with a file name as a parameter) to determine whether a locally maintained copy of the particular file is synchronized with the same file being broadcast over OOB network 114. The seek file operation returns an indicator of whether or not the specified file is being broadcast, an indicator of whether or not the locally maintained version of the file matches a copy of the file that is currently being broadcast, and a file size associated with the file that is being broadcast (e.g., in bytes).

The sync directory operation is called (with a directory as a parameter) to synchronize data associated with a particular local directory with data being broadcast over OOB network 114 from a directory of the same name on data carousel 120. The sync directory operation deletes any local data in the specified directory, and acquires the data that is being broadcast from the specified directory.

The sync file operation is called (with a file name as a parameter) to acquire a file of the specified name that is currently being broadcast over OOB network 114.

In the illustrated example client device 110, an EPG application 818 is also stored in memory 812 to operate on received EPG data and generate a program guide. The application programs 816 that may be implemented at client device 110 can include a browser to browse the Web (e.g., "World Wide Web"), an email program to facilitate electronic mail, and so on. A user interface component 820 is also stored in memory 812 and executed on processor 804 to provide user interaction with the client device.

Client device 110 also includes data configuration module 822 stored in memory 812 and executed on processor 804. Data configuration module 822 includes a client object 824 and multiple task objects 826. Client object 824 is responsible for obtaining the appropriate region configuration file, scheduling the order in which task objects 826 should be serviced and revisited, making available the details of the selected configuration to task objects 826 and to user interface 820 (and possibly application programs 816 and/or EPG application 818), and verifying over time that the region configuration file has not changed. Each task object 826 is responsible for obtaining data for a particular data type associated with a selected configuration by issuing asynchronous commands to BCFS 815 to obtain the data. In the described implementation, client object 824 and task objects 826 are implemented as state machines, and are each discussed in further detail below. It is also recognized that a data configuration module may be implemented in any number of ways to provide similar functionality, and the described implementation is merely one example of such a data configuration module.

Client device 110 may be implemented to include other components pertaining to a television entertainment system which are not illustrated in this example. For instance, client device 110 can include user interface lights, buttons, controls, and the like to facilitate additional viewer interaction with the device.

Illustrated client device 110 also includes a decoder 828 to decode a broadcast video signal, such as an NTSC, PAL, SECAM or other TV system video signal. Client device 110 may also include any combination of a wireless interface 830, a network interface 832, a serial and/or parallel interface 834, and a modem 836. Wireless interface 830 allows client device 110 to receive input commands and other information from a user-operated input device, such as from a remote control device or from another IR, Bluetooth, or similar RF input device.

Network interface 832 and serial and/or parallel interface 834 allow client device 110 to interact and communicate with other electronic and computing devices via various communication links. Although not shown, client device 110 may also include other types of data communication interfaces to communicate with other devices. Modem 836 facilitates client device 110 communication with other electronic and computing devices via a conventional telephone line.

Client device 110 also includes an audio output 838 and a video output 840 that provide signals to a television or other device that can process, present, or otherwise render audio and video data. Although shown separately, some of the components of client device 110 may be implemented in an application specific integrated circuit (ASIC). Additionally, a system bus (not shown) typically connects the various components within client device 110. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Method for Enabling Viewer Selection of a Data Configuration

As described above, client device 110 receives broadcast programs and associated broadcast data from headend 108. In addition, client device 110 receives a broadcast region configuration file that indicates one or more data configurations that are available to the client device based on a region identifier. Client device 110 is configured to present a list of available data configurations to a viewer through a user interface, and selectively receive the broadcast data according to a viewer-selected data configuration.

Enabling viewer selection of a data configuration as performed by client device 110 may be described in the general context of computer-executable instructions, such as application modules, being executed by a computer. Generally, application modules include routines, programs, objects, components, data structures, etc. that perform particular tasks or implement particular abstract data types. A client device that is configured to selectively receive broadcast data according to any one of multiple data configurations may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 9:
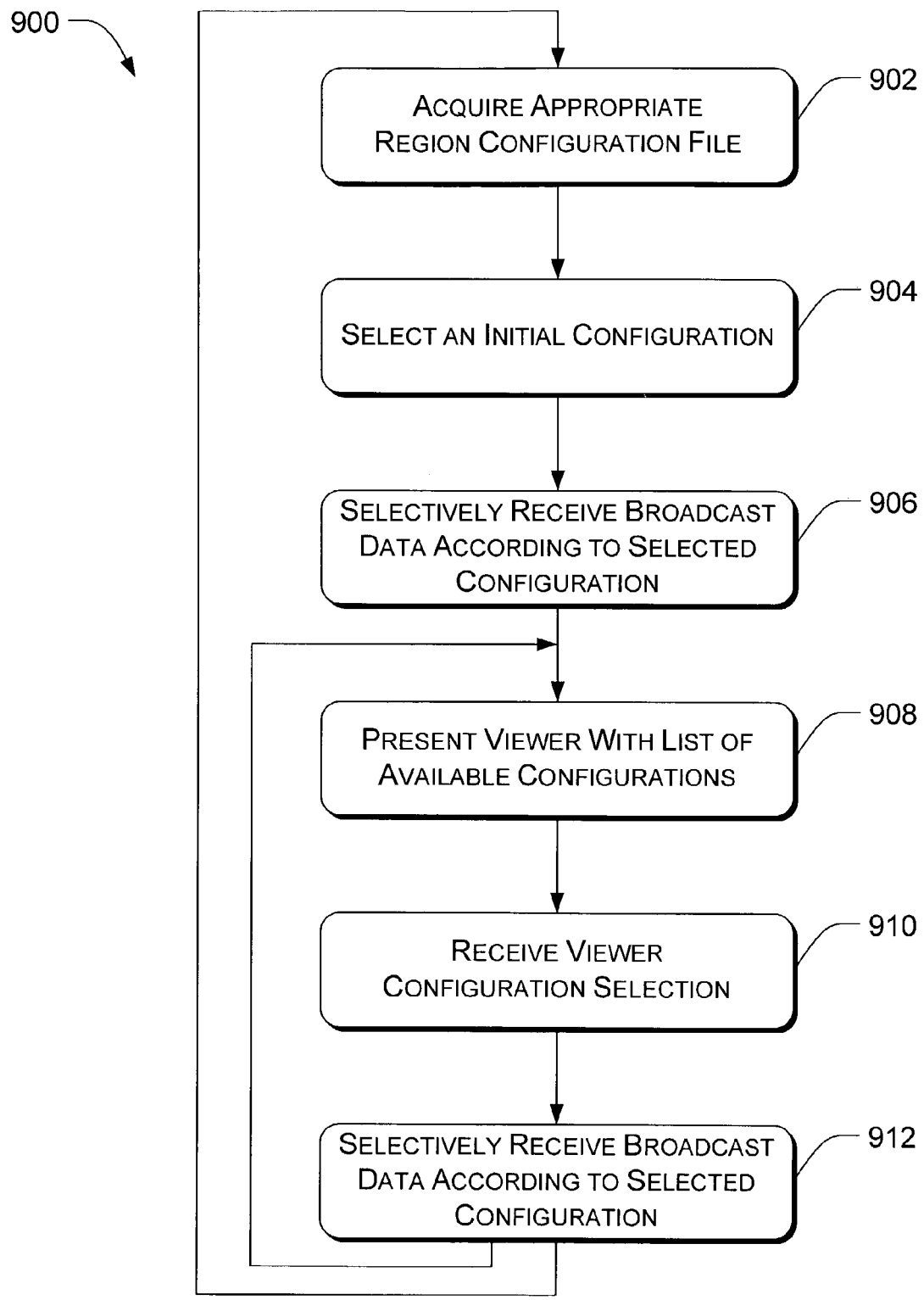
FIG. 9 illustrates an exemplary method for enabling viewer selection of one of multiple data configurations.

FIG. 9 illustrates a method 900 for enabling viewer selection of one of multiple data configurations and selectively receiving broadcast data according to the selected data configurations. For illustrative purposes, FIG. 9 will be described with reference to components illustrated in FIGS. 1, 2, and 8.

At block 902, client device 110 acquires a region configuration file that is appropriate for the particular client device. For example, in one implementation, each region configuration file is named based on a region identifier that is also associated with multiple client devices. When headend 108 broadcasts the region configuration files, each particular client device acquires the region configuration file whose name is based on a region identifier associated with the client device. As described above, the region identifier associated with the client device may be assigned in any number of ways, including when the client device is manufactured, or by a cable provider during a client device setup process.

At block 904, client device 110 selects a configuration from the received region configuration file. The configuration may be selected based on a previously selected configuration or a default configuration (e.g., the first configuration listed in the region configuration file) may be selected. An exemplary method for selecting an initial configuration is described in more detail below with reference to FIG. 15.

At block 906, client device 110 begins selectively receiving data being broadcast from data carousel 120 according to the initially selected configuration definition in the region configuration file. Client device 110 acquires data that is broadcast from file directories on data carousel 120 in the order specified in the region configuration file.

At block 908, client device 110 displays a list of available data configurations that are available, based on the received region configuration file. For example, in response to a viewer request, user interface 820 displays a list of values from the region configuration file that correspond to the configuration name field in the configurations table in configuration repository 214.

At block 910, client device 110 receives (through user interface 820) a viewer selection of a configuration. An exemplary method for switching to a viewer-selected configuration is described below with reference to FIG. 21.

At block 912, client device 110 selectively receives data being broadcast from data carousel 120 according to the viewer-selected configuration definition in the region configuration file. Client device 110 acquires data that is broadcast from file directories on data carousel 120 in the order specified in the region configuration file. The acquired data provides client device 110 with a sufficient data set for displaying data according to the selected configuration.

Client device 110 operation may continue at block 908, as described above, in an event that another viewer request to select a configuration is received.

Client device 110 operation may continue at block 902, as described above, in an event that the region identifier associated with client device 110 changes or in an even that the broadcast region configuration file that is appropriate for client device 110 is modified.

Exemplary Client Object Implementation

Figure 10:
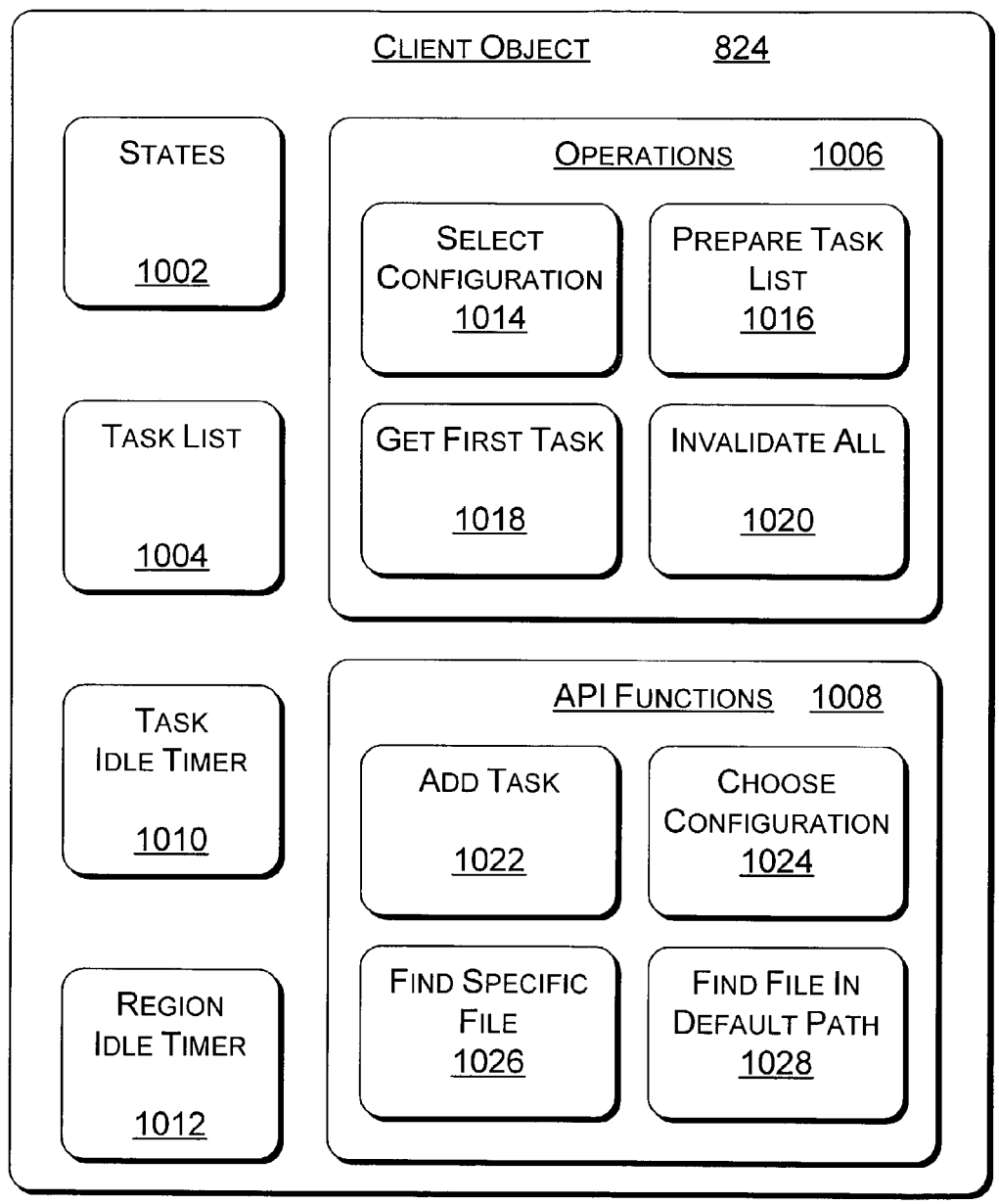
FIG. 10 illustrates select components of an exemplary client object implemented as a state machine within the client device of FIG. 8.

FIG. 10 illustrates select components of client object 824. As described above, client object 824 is responsible for obtaining the appropriate region configuration file, scheduling the order in which task objects 826 are to be serviced and revisited, verifying over time that the region configuration file has not changed and that the region identifier associated with client device 110 has not changed, and making details of the selected configuration available to task objects 826, user interface 820, application programs 816, and/or EPG application 818. In an exemplary implementation, client object 824 is implemented as a state machine.

Client object 824 includes states 1002, task list 1004, operations 1006, application programming interface (API) functions 1008, a task idle timer 1010, and a region idle timer 1012. Client object 824 transitions between states 1002 according to functions that it performs. Client object 824 state transition is described in more detail below, with reference to FIG. 12.

Task list 1004 is an ordered list of task objects 826 maintained by client object 824 to facilitate execution of functions associated with task objects 826 based on the order of the task objects in task list 1004. The order of the task objects in task list 1004 is based on a next activity time property of each task object 826, which is described in more detail below with reference to FIG. 11.

Operations 1006 is a basic set of operations that allow client object 824 to navigate between task objects 826 and perform operations associated therewith. Operations 1006 may include, but are not limited to, select configuration 1014, prepare task list 1016, get first task 1018, and invalidate all 1020. Select configuration 1014 is executed by client object 824 to determine a default or previously selected configuration. An exemplary select configuration operation 1014 is described in more detail below with reference to FIG. 15.

Prepare task list 1016 is executed by client object 824 to initialize task list 1004. An exemplary prepare task list operation 1016 is described in more detail below with reference to FIG. 20.

Get first task 1018 is executed by client object 824 to determine the next task to be executed. An exemplary get first task operation 1018 is described in more detail below with reference to FIG. 22.

Invalidate all 1020 is executed by client object 824 to invalidate each task object in task list 1004 when either the client device region identifier changes (e.g., a new region identifier is received from the headend) or when current region configuration file changes. An exemplary invalidate all operation 1020 is described in more detail below with reference to FIG. 23.

Application programming interface (API) functions 1008 may be called from outside of client object 824. Select API calls 1008 may include, but are not limited to add task 1022, choose configuration 1024, find specific file 1026, and find file in default path 1028.

A call to add task 1022 causes client object 824 to create a new task object invalidate each task object 826. An exemplary add task function 1022 is described in more detail below with reference to FIG. 13.

A call to choose configuration 1024 causes client object 824 to update task list 1004 upon viewer selection of an available configuration. An exemplary choose configuration function 1024 is described in more detail below with reference to FIG. 21.

A call to find specific file 1026 causes client object 824 to locate a specified file associated with a specified data type. An exemplary find specific file function 1026 is described in more detail below with reference to FIG. 37.

A call to find file in default path 1028 causes client object 824 to locate a specified file by searching in reverse order through the data types associated with the currently selected configuration. An exemplary find file in default path function 1028 is described in more detail below with reference to FIG. 38.

Task idle timer 1010 is used by client object 824 to determine when to execute a task object 826. Task idle timer 1010 is reset according to the current state and what tasks are currently being executed. The use of task idle timer 1010 is described in more detail below with reference to task execution.

Region idle timer 1012 is used by client object 825 to determine when to verify that the current region configuration file is still synchronized with the current broadcast region configuration file and when to check the client device region identifier to determine whether or not it has changed.

Exemplary Task Object Implementation

Figure 11:
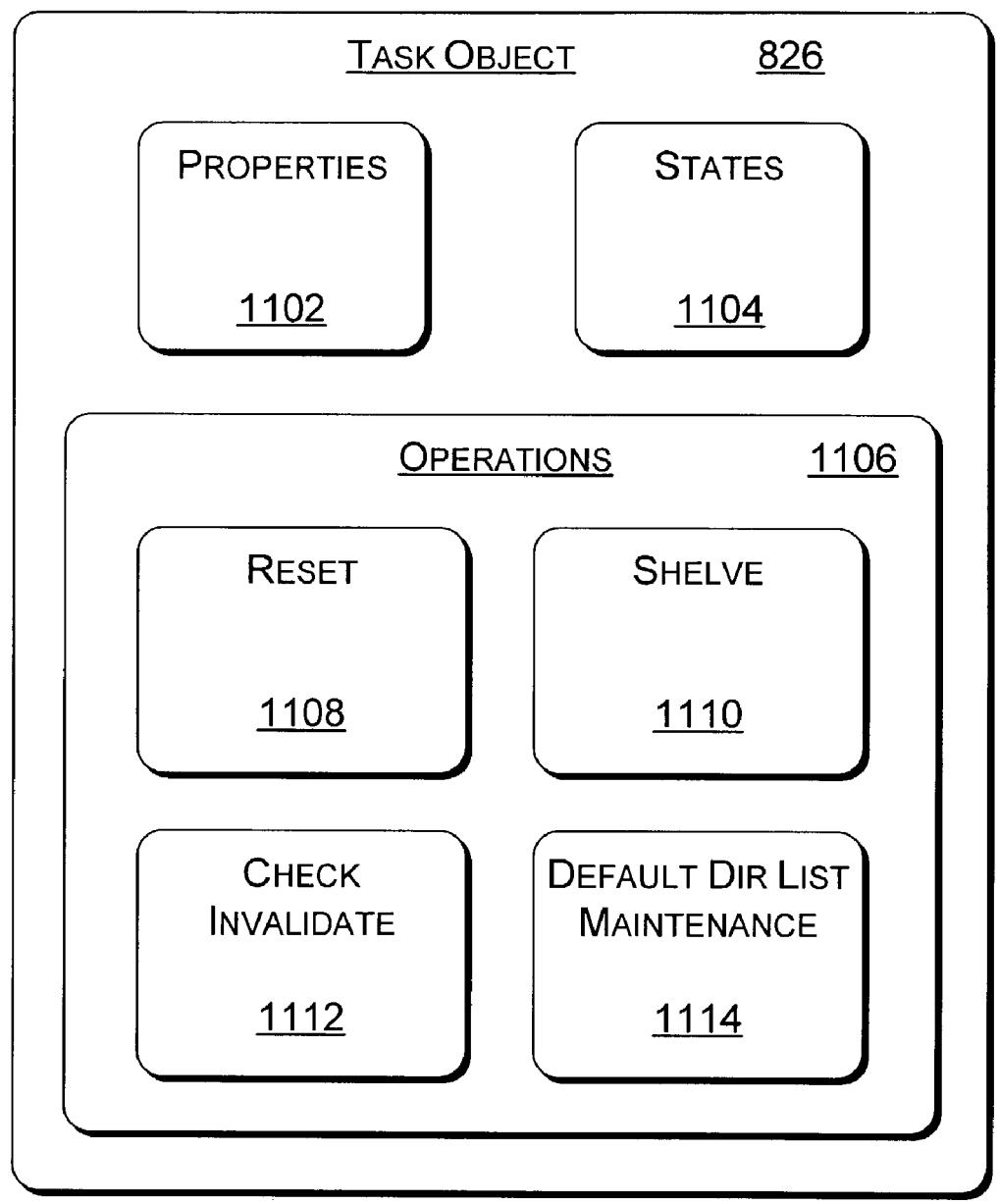
FIG. 11 illustrates select components of an exemplary task object implemented as a state machine within the client device of FIG. 8.

FIG. 11 illustrates select components of an exemplary task object 826. As described above, each task object 826 is responsible for obtaining data for a particular data type associated with the selected configuration by issuing asynchronous commands to BCFS 815 to obtain the data. In an exemplary implementation, task object 826 is implemented as a state machine, and has multiple properties 1102, multiple states 1104, and multiple operations 1106.

Properties 1102 are the components that define a particular task object 826. Properties 1102 may include, but are not limited to:
 user task flag;
 data type;
 files to synchronize;
 re-check interval;
 next activity time;
 handler function;
 handler function argument;
 data size limit;
 in default path flag;
 subdirs flag;
 files flag;
 last synced data type location;
 directory index; and
 directory count.

The user task flag property indicates whether or not the task object is a user task (described below with reference to FIG. 12). The data type property stores the name of the data type with which the task object is associated. The files to synchronize property specifies a set of files associated with the specified data type that are to be selectively received using the defined task object. The re-check interval property specifies a how often the data should be checked for change. The next activity time property is used to indicate intervals at which operations associated with a task object are to be executed. The handler function property stores a pointer to a handler function associated with task object 826. The handler function argument property stores an argument to be passed to the handler function when it is called. The data size limit property specifies the maximum data size to be held for the specified data type. The in default path flag property indicates whether or not data associated with the specified data type is to be included in a search that is initiated by an API call to the find file in default path function 1028. The subdirs flag property is used to indicate that the location from which data of the specified data type is broadcast includes subdirectories. The files flag property is used to indicate that the location from which data of the specified data type is broadcast includes files. (The subdirs flag property and the files flag property are mutually exclusive.) The last synced data type location stores the value from the tag in the region configuration file that specifies the location from which data associated with the task object is broadcast. The last synced data type location value is used to determine whether or not a data type needs to be re-synchronized when a new configuration is selected. The directory index property stores an integer that indicates which subdirectory is currently being operated on. The directory count property stores an integer that indicates the number of directories that have currently been synchronized. Use of the directory index and directory count properties is described in more detail below with reference to FIG. 34.

States 1104 represent multiple states that task object 826 (implemented as a state machine) may be in at a given time. Each task object 826 transitions between states 1104 according to functions that it performs. Task object state transition is described in more detail below, with reference to FIGS. 24 and 28.

Operations 1106 represent operations that may be performed by or in reference to a particular task object 826. Operations 1106 may include, but are not limited to, reset 1108, shelve 1110, check invalidate 1112, and default dir list maintenance 1114.

Reset operation 1108 is performed when the state of a task object changes and data acquisition for the data type associated with the task is to be restarted from the beginning. An exemplary reset operation 1108 is described in more detail below with reference to FIG. 34.

Shelve operation 1110 is performed when a task has been created by a user (i.e., a user task), but is not used by the currently selected configuration. An exemplary shelve operation 110 is described in more detail below with reference to FIG. 35.

Check invalidate operation 1112 is performed to clear from task list 1010, a task object 826 that is not associated with a newly selected configuration. An exemplary check invalidate operation 1112 is described in more detail below with reference to FIG. 36.

Default directory list maintenance operation 1114 is performed when a new directory in the default path is synchronized or has its contents deleted. For example, when a task object is synchronized, task object 826 may check to see if the data type associated with the task belongs to a data type group. If so, a list of which data type groups are available may be updated (based on whether or not all of the data types in the group are synchronized). If all of the data associated with a particular data type group is found to be synchronized, then a set of initialization operations may be performed to prepare the data to be accessed. For example, a script file received in association with a particular data type may be executed during the initialization. Such script files may be used to, for example, enable a set of fonts. Another example initialization that may be performed is the generation of an ordered list of resource files. Resource files that are received may contain specific text strings to be displayed according to a defined layout. In one implementation, the list of resource files is ordered based on the order of data types specified in the region configuration file. When a string value is requested, the resource files can be searched in reverse order to ensure that the last received data is searched first. (This allows data types specified later in the configuration definition to contain data that overrides data associated with a data type listed earlier in the configuration definition.)

Exemplary Client Object State Transition

Figure 12:
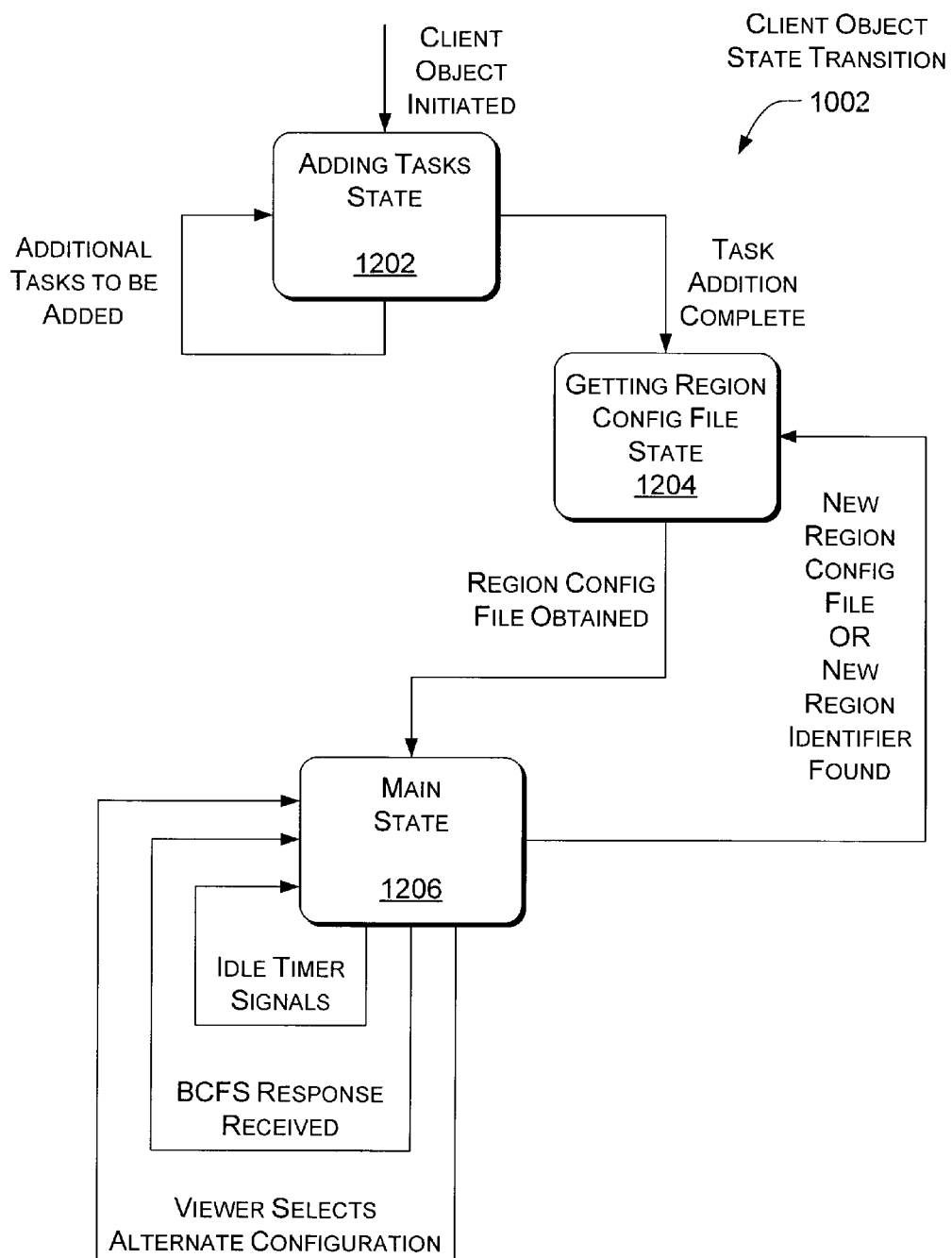
FIG. 12 is an exemplary block diagram illustrating state transition in the client object of FIG. 10.

FIG. 12 illustrates transitions between states 1002 of client object 824. When data configuration module 822 is initiated, client object 824 enters adding tasks state 1202. While client object 824 is in the adding tasks state 1202, other software applications or components may call an add task API (described in more detail below with reference to FIG. 13) to create customized task objects 826. The tasks that are created while client object 824 is in adding tasks state 1202 are known as user tasks. User tasks are typically created by applications such as EPG application 818 to specify how data that is received that applies specifically to the creating application is to be handled. Advertisement data is another example data type that may typically by handled by a user task.

After any user tasks are added, client object 824 enters getting region config file state 1204. During this state, an appropriate broadcast region configuration file is acquired and a configuration is selected, as described in more detail below with reference to FIG. 14.

After acquiring a region configuration file and selecting a configuration, client object 824 then enters and remains in main state 1206 until a new region identifier is assigned to client device 110 or a new region configuration file is detected. While in main state 1206, client object 824 manages task objects 826, as described in more detail below with reference to FIGS. 16-19.

Exemplary Client Object Add Task API Function

Figure 13:
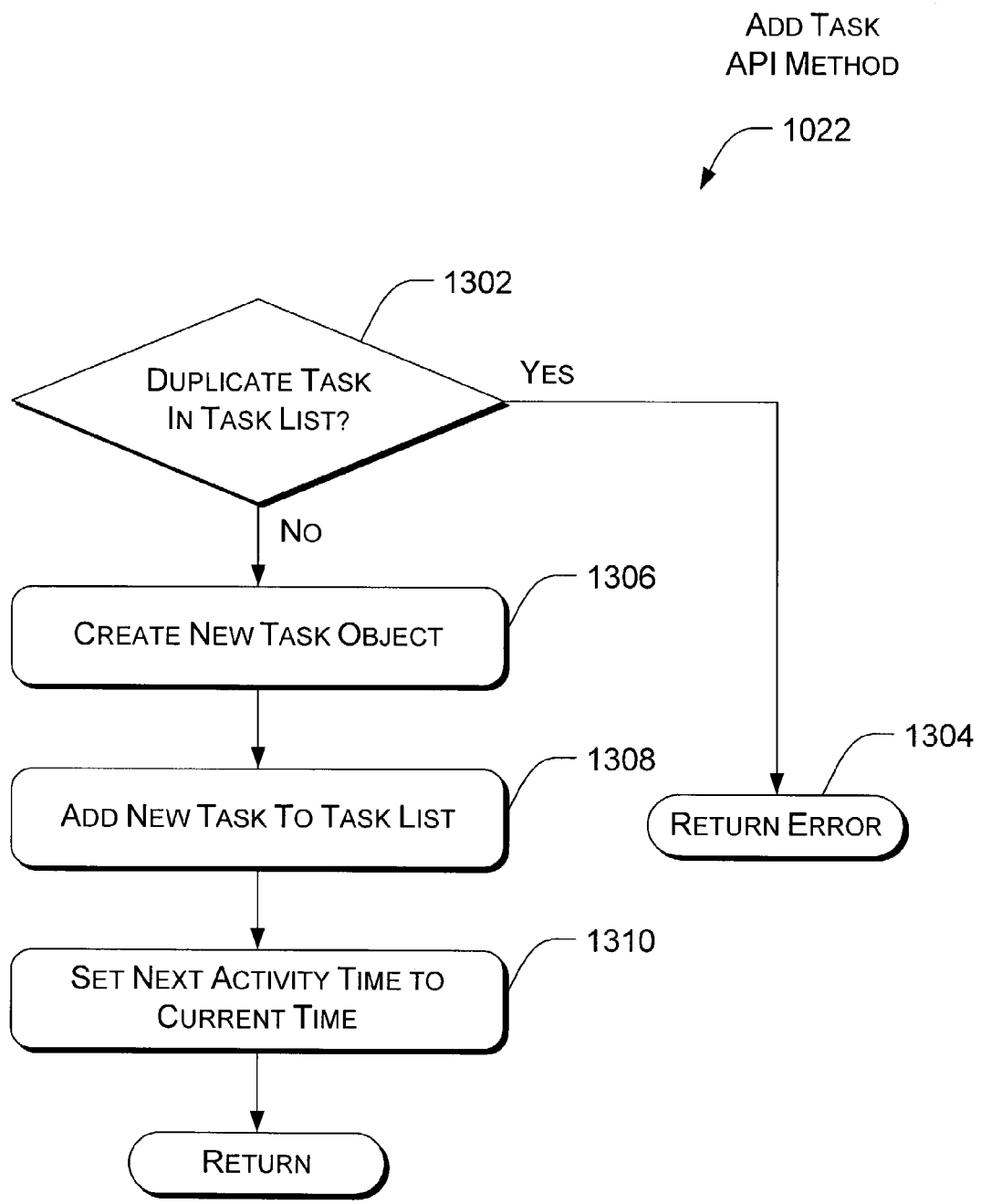
FIG. 13 illustrates an exemplary method that may be performed by the client object of FIG. 10 to create a new task object in response to an API call.

FIG. 13 illustrates an exemplary add task method 1022 that may be performed by client object 824 in response to an API call to create a new task object 826.

In the described implementation, arguments that may be passed to add task method 1022 include:
data type;
files to synchronize;
re-check interval;
handler function;
handler function argument;
data size limit;
in default path flag;
subdirs flag; and
files flag.

The data type value indicates a data type that the task is associated with. This value corresponds to the name entry in a tag that may exist in the region configuration file.

The files to synchronize value specifies a set of files associated with the specified data type that are to be selectively received using the defined task object. In one implementation, a wildcard value (e.g., "*") can be used to indicate that all files associated with the specified data type are to be synchronized.

The re-check interval value specifies a how often the data should be checked for change. In one implementation, the argument is an integer value that specifies a number of seconds between each data check. A negative value may be used to indicate that the data is only to be checked once, and a positive value may be used to indicate the number of seconds to wait after a successful sync operation before re-checking the data.

The handler function value stores a pointer to another function that is to be associated with the created task object. In an exemplary implementation, handler functions are callback functions that are used when special data handling is desired. For example, a handler function may be implemented in association with a task object that is responsible for EPG data. The handler function may be responsible for controlling what actions are taken when it is discovered that the local EPG data is not synchronized with the currently broadcast EPG data. Because out-of-date EPG data is useless to a viewer, the handler function may cause the out-of-date EPG data to be deleted regardless of whether or not updated EPG data has been successfully received. Similarly, a handler function may be implemented in association with a task object that is responsible for advertising data. In this scenario, because out-of-date advertisements may still be relevant to a viewer, the handler function may cause out-of-date advertisement data to be maintained until updated data is successfully received.

The handler function argument stores an argument that is to be passed to the specified handler function.

The data size limit value specifies the maximum data size to be held for the specified data type. This argument can be used to ensure that client device memory resources are not consumed with extraneous data.

The in default path flag property indicates whether or not data associated with the specified data type is to be included in a search that is initiated by an API call to the find file in default path function 1028.

The subdirs flag property is used to indicate that the location from which data of the specified data type is broadcast includes subdirectories.

The files flag property is used to indicate that the location from which data of the specified data type is broadcast includes files. (The subdirs flag property and the files flag property are mutually exclusive.)

At block 1302, client object 824 compares the received data type argument with the task objects 826 currently in task list 1004 to determine if there is already a task object 826 for the specified data type. If an existing task object 826 is found for the specified data type (the "Yes" branch from block 1302), then at block 1304, add task 1022 returns an error. Otherwise (the "No" branch from block 1302), add task 1022 continues at block 1306.

At block 1306, client object 824 creates a new task object 826 based on the received parameters.

At block 1308, client object 824 adds the new task object 826 to task list 1004.

At block 1310, client object 824 sets the new task object's next activity time property to the current time so that the task will be a candidate for processing the next time that task idle timer 1010 signals.

Exemplary Client Object Getting Region Config File State

Figure 14:
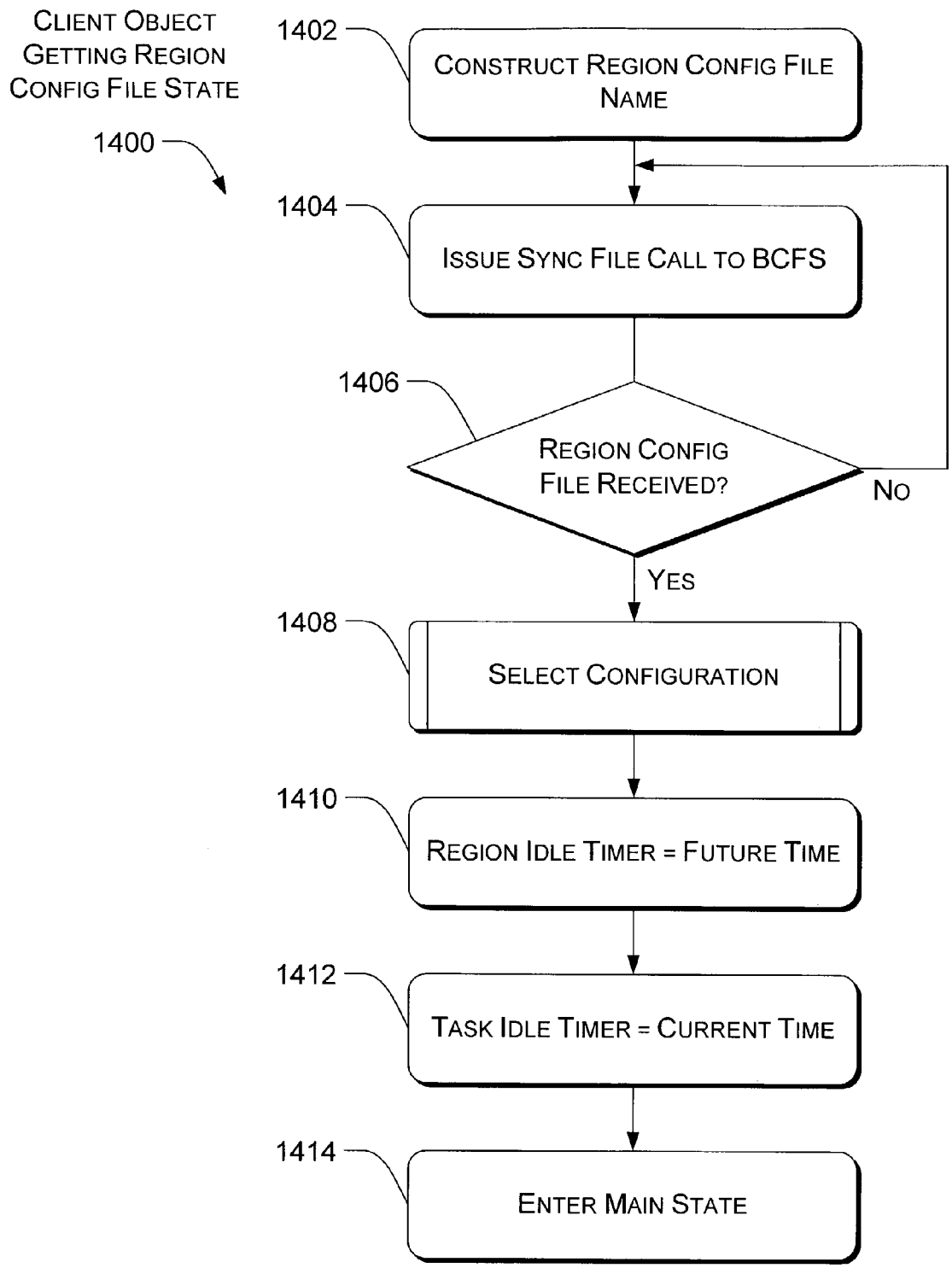
FIG. 14 is an exemplary process flow diagram illustrating operations performed the client object of FIG. 10 while in a getting region config file state.

FIG. 14 illustrates an exemplary method 1400 performed by client object 824 while in getting region config file state 1204.

At block 1402, client object 824 constructs a region configuration file name based on a region identifier associated with client device 110. For example, in one implementation, the region identifier associated with a client device is an integer number between 0 and 65535 and region configuration files are named "xxxx.rgncfg" where "xxxx" is a four byte hexadecimal representation of the region identifier, prepended with zeros as needed. Accordingly, in such an implementation, client object 824 constructs a region configuration file name by converting the region identifier associated with the client device to a four-digit hexadecimal value, appended with the string, ".rgncfg".

At block 1404, client object 824 issues a sync file call to BCFS 815, passing the constructed region configuration file name as a parameter.

At block 1406, client object 824 determines whether or not the requested region configuration file has been received. If the region configuration file has not been received (the "No" branch from block 1406), then client object 824 re-issues the sync file call at block 1404.

At block 1408, when the region configuration file is successfully acquired (the "Yes" branch from block 1406), client object 824 selects a configuration that is specified in the received region configuration file by executing select configuration operation 1014 (described in more detail below with reference to FIG. 15).

At block 1410, client object 824 sets the client object region idle timer 1012 to a future time (e.g., 10 minutes from the current time).

At block 1412, client object 824 sets the task idle timer 1010 to the current time so that the first task in task list 1004 will be executed as soon as possible.

At block 1414, client object 824 enters main state 1206. Operations performed by client object 824 while in main state 1206 are described in more detail below with reference to FIG. 16.

Exemplary Client Object Select Configuration Operation

Figure 15:
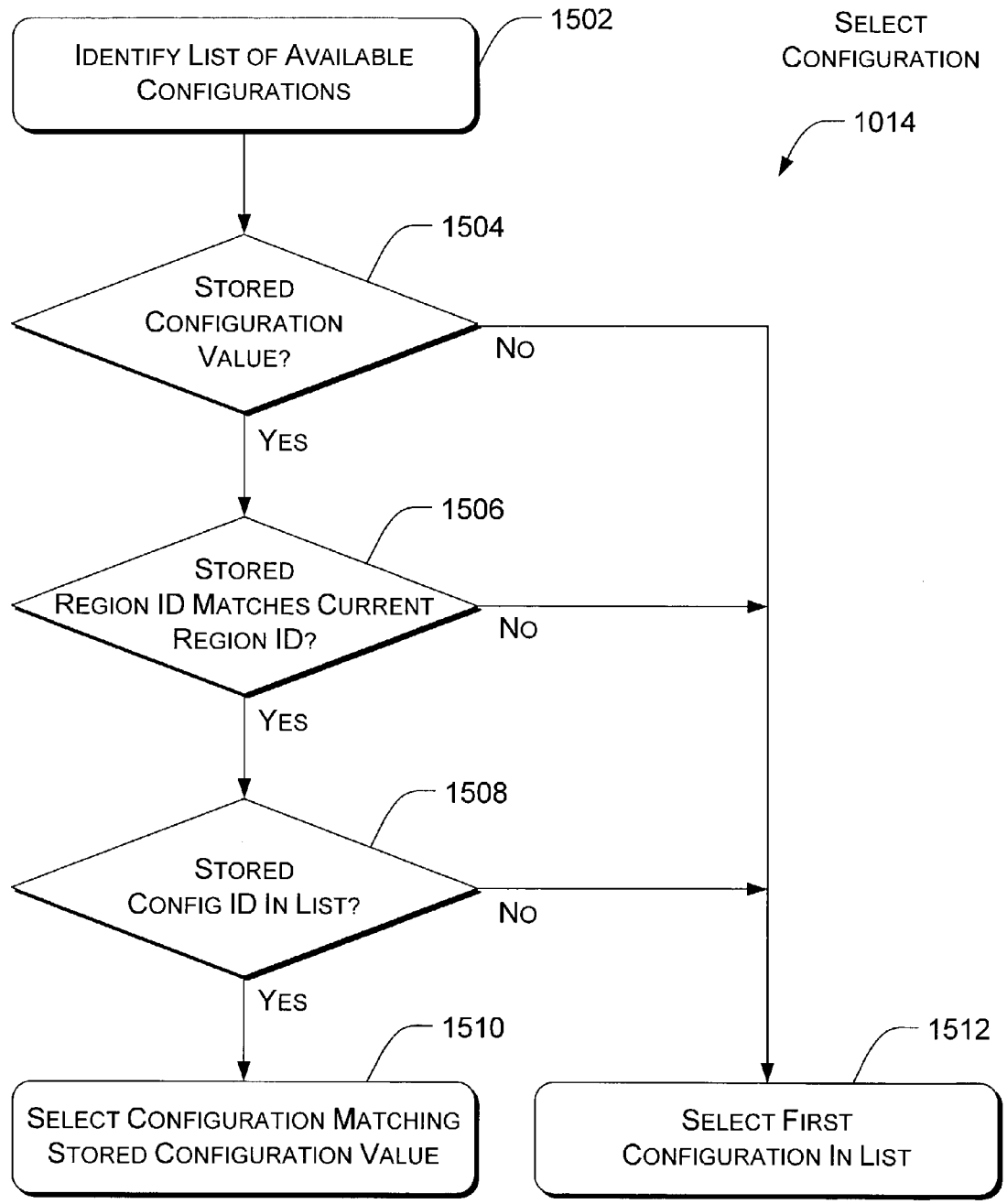
FIG. 15 illustrates an exemplary method that may be performed by the client object of FIG. 10 to select a configuration.
Figure 16:
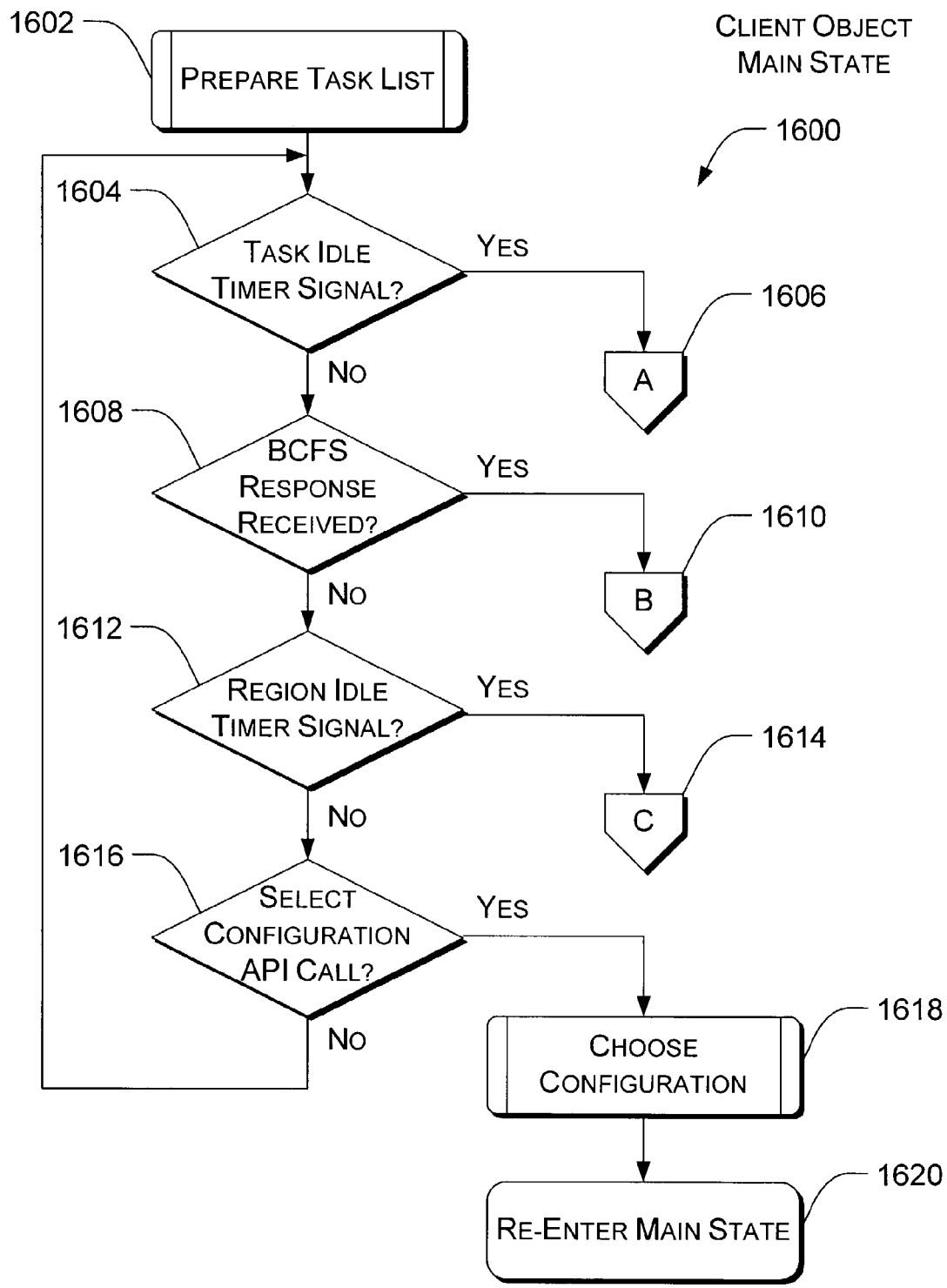
FIG. 16 is an exemplary process flow diagram illustrating operations performed by the client object of FIG. 10 while in a main state.

FIG. 15 illustrates an exemplary select configuration operation 1014 that may be performed by client object 824. Select configuration 1014 is performed by client object 824 while in getting region config file state 1204, after an appropriate region configuration file has been received to make an initial configuration selection.

At block 1502, client object 824 identifies a list of available configurations according to the received region configuration file.

At block 1504, client object 824 determines whether or not a configuration value, which indicates a previous viewer-selected configuration, is stored in memory. In the described implementation, the client device region identifier and a configuration identifier are stored together as a configuration value when a viewer selects a configuration. In this way, client object 824 does not attempt to selectively receive data based on an invalid configuration in an event that the region identifier associated with the client device changes or if a previously selected configuration is no longer available. If it is determined that there is no configuration value stored in memory (the "No" branch from block 1504), then select configuration 1014 continues at block 1512. Otherwise (the "Yes" branch from block 1504), select configuration 1014 continues at block 1506.

At block 1506, client object 824 determines whether or not the region identifier stored as part of the stored configuration value matches the region identifier currently associated with the client device. If it is determined that the stored region identifier does not match the current client device region identifier (the "No" branch from block 1506), then select configuration 1014 continues at block 1512. Otherwise (the "Yes" branch from block 1506), select configuration 1014 continues at block 1508.

At block 1508, client object 824 determines whether the stored configuration identifier matches a configuration identifier in the received region configuration file. If it is determined that the stored configuration identifier does not match an available configuration (the "No" branch from block 1508), then select configuration 1014 continues at block 1512, described below. Otherwise (the "Yes" branch from block 1508), select configuration 1014 continues at block 1510.

At block 1510, client object 824 selects as the current configuration, the configuration definition in the received region configuration file that matches the stored configuration identifier.

At block 1512, if it is determined that a valid configuration value is not stored (the "No" branch from any of blocks 1504, 1506, or 1508), client object 824 selects as the current configuration, the first configuration listed in the received region configuration file.

Exemplary Client Object Main State

FIGS. 16-19 illustrate an exemplary method 1600 performed by client object 824 while in main state 1206.

At block 1602, client object 824 executes prepare task list operation 1016 to initialize task list 1004 according to the currently selected configuration. An exemplary prepare task list operation 1016 is described in more detail below with reference to FIG. 20.

At block 1604, client object 824 determines whether or not task idle timer 1010 has signaled. If task idle timer 1010 has signaled (the "Yes" branch from block 1604), then main state processing continues at step 1606, described below with reference to FIG. 17.

At block 1608, client object 824 determines whether or not it has received a response from BCFS 815. If client object 824 has received a response from BCFS 815 (the "Yes" branch from block 1608), then main state processing continues at step 1610, described below with reference to FIG. 18.

At block 1612, client object 824 determines whether or not region idle timer 1012 has signaled. If region idle timer 1012 has signaled (the "Yes" branch from block 1612), then main state processing continues at step 1614, described below with reference to FIG. 19.

At block 1616, client object 824 determines whether or not an API call to choose configuration 1024 has been received. If an API call to choose configuration 1024 has been received (the "Yes" branch from block 1616), then main state processing continues at step 1618.

Main state processing continues until one of the above-described conditions is met.

At block 1618, client object 824 executes choose configuration 1024, as described below with reference to FIG. 21.

At block 1620, client object 824 re-enters main state 1206.

Figure 17:
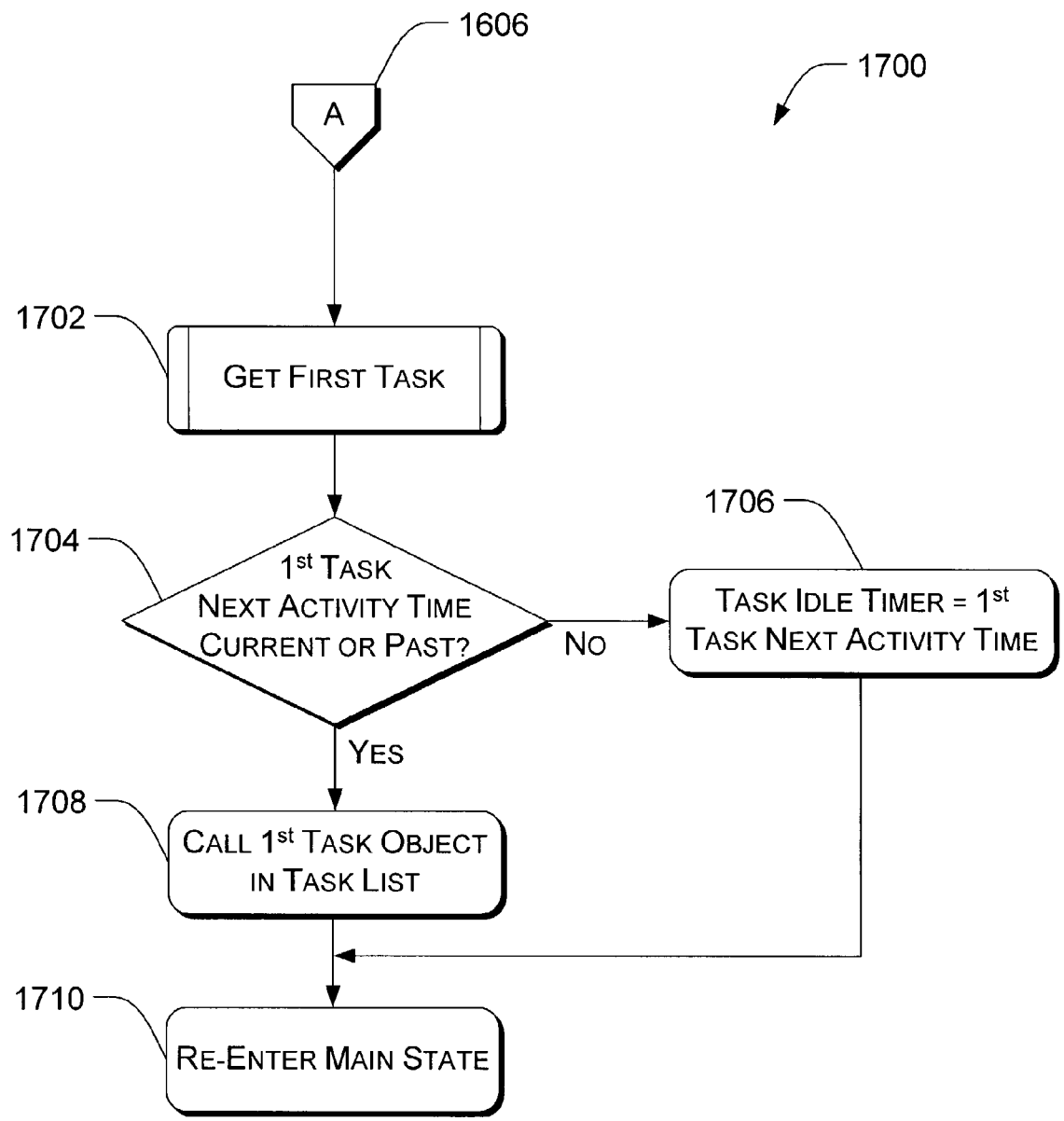
FIG. 17 is an exemplary process flow diagram illustrating operations performed by the client object of FIG. 10 in response to a task idle timer signal while in a main state.

FIG. 17 illustrates an exemplary method 1700 performed by client object 824 while in main state 1206, in response to a signal from task idle timer 1010.

At block 1702, client object 824 executes get first task operation 1018 to determine the next task object 826 to call. An exemplary get first task operation 1018 is described in more detail below with reference to FIG. 22.

At block 1704, client object 824 examines the next activity time property of the first task object 826 in task list 1004. If the next activity time is equal to or before the current time (the "No" branch from block 1704), then at block 1706, client device 824 sets task idle timer 1010 to signal at a time equal to the next activity time property of the first task object in task list 1004. Main state processing then continues at block 1710.

At block 1708, client object 824 calls the first task object 826 in task list 1004, causing the task object to execute.

At block 1710, client object 824 re-enters main state 1206.

Figure 18:
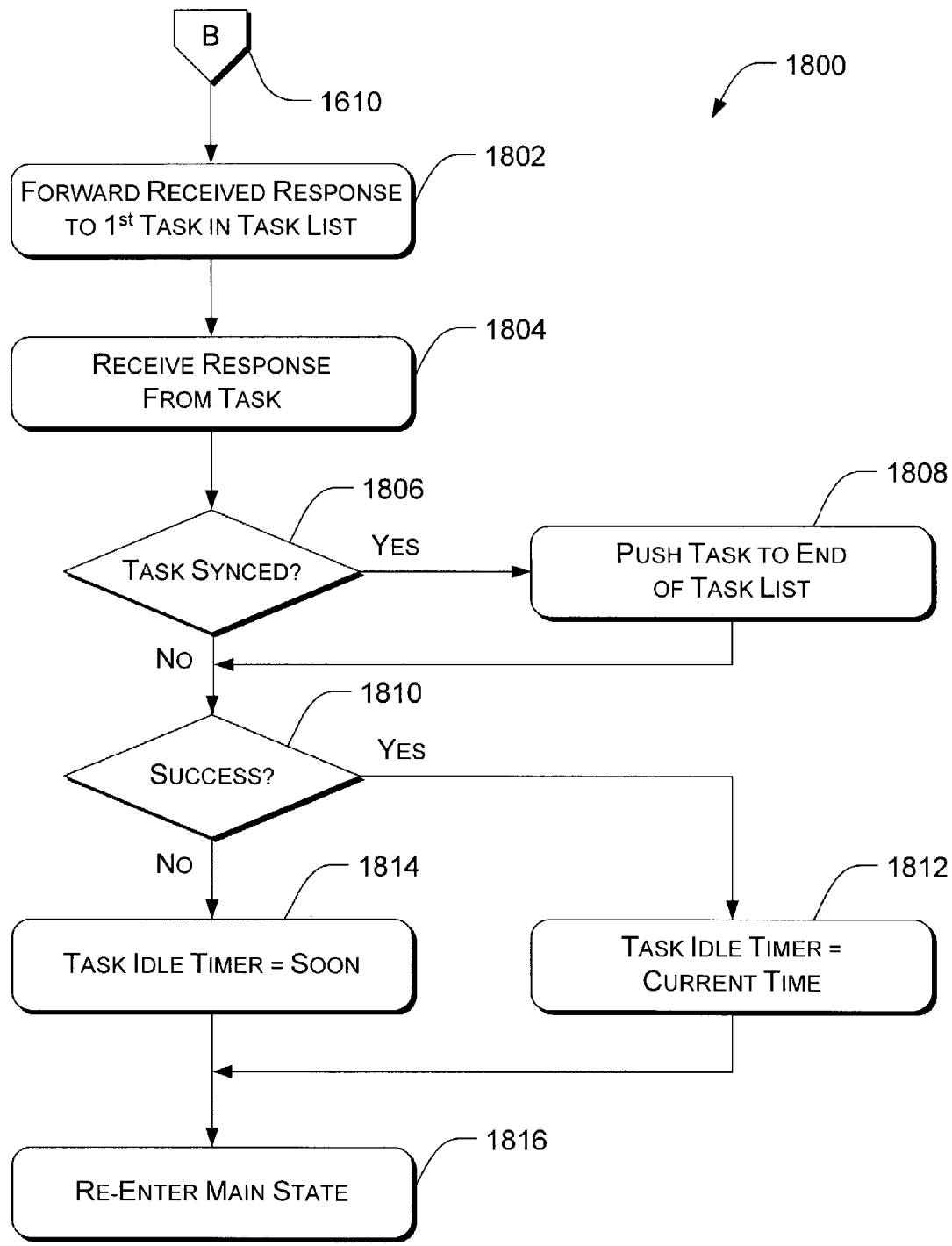
FIG. 18 is an exemplary process flow diagram illustrating operations performed by the client object of FIG. 10 when a response is received from a one-way broadcast carousel file system while in a main state.

FIG. 18 illustrates an exemplary method 1800 performed by client object 824 while in main state 1206, when a response is received from BCFS 815.

At block 1802, client object 824 forwards the received BCFS response to the first task object in task list 1004.

At block 1804, client object 824 receives a response from the task object.

At block 1806, client object 824 determines whether the response from the task object indicates that the task is synced. If the task is synced (the "Yes" branch from block 1806), then at block 1808, the task object 826 is pushed to the end of task list 1004.

At block 1810, client object 824 determines whether the response from the task object indicates that the task operation executed successfully. If the response indicates success (the "Yes" branch from block 1810), then at block 1812, client object 824 sets task idle timer 1010 to the current time.

Otherwise, if the response indicates failure (the "No" branch from block 1810), then at block 1814, client object 824 sets task idle timer 1010 to an upcoming future time (e.g., five seconds from the current time).

At block 1816, client object 824 re-enters main state 1206.

Figure 19:
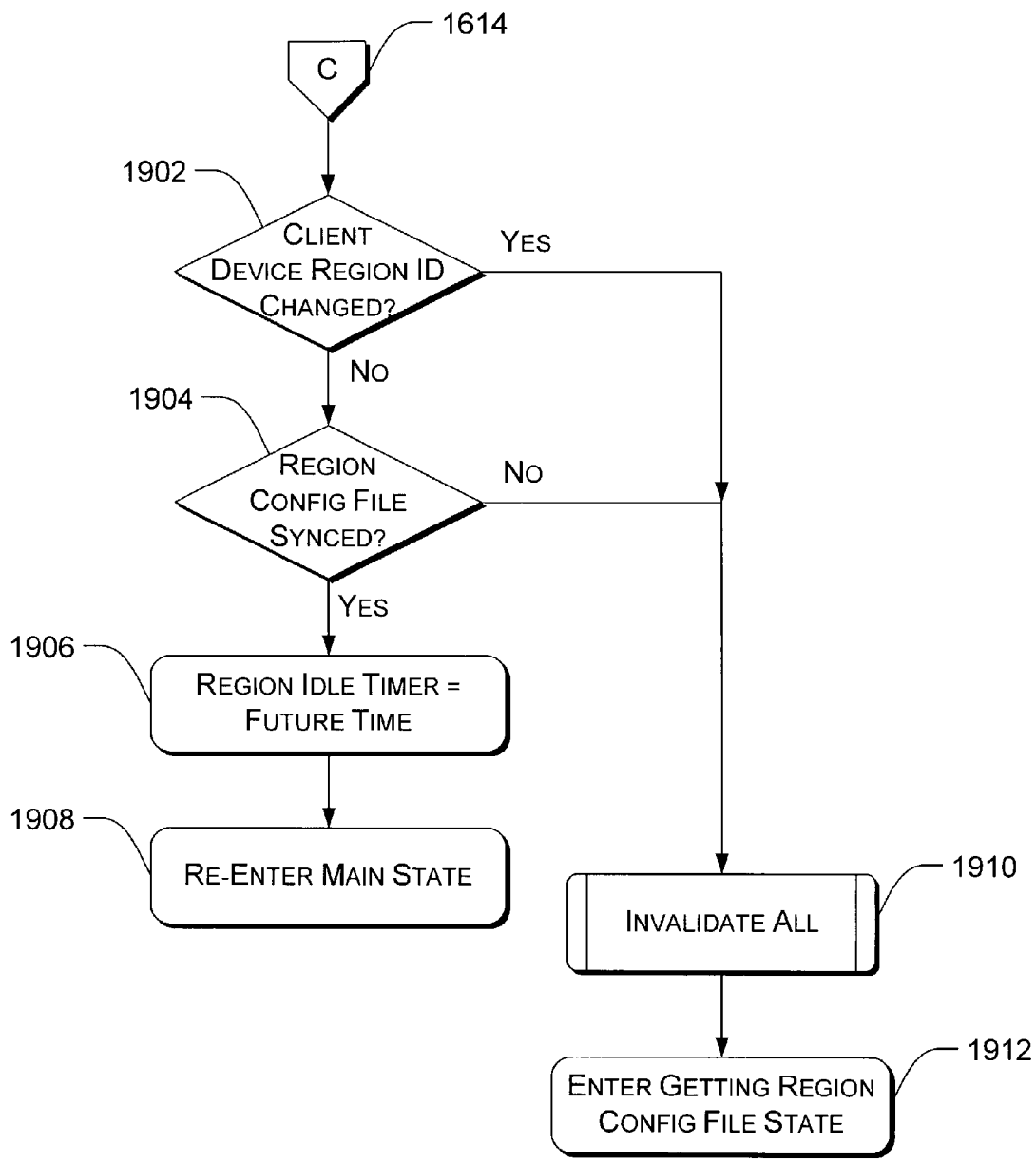
FIG. 19 is an exemplary process flow diagram illustrating operations performed by the client object of FIG. 10 in response to a region idle timer signal while in a main state.

FIG. 19 illustrates an exemplary method 1900 performed by client object 824 while in main state 1206, in response to a signal from region idle timer 1012.

At block 1902, client object 824 determines whether or not the client device region identifier has changed since the current configuration was selected. In one implementation, client object 824 compares the current client device region identifier to a region identifier portion of a stored configuration value associated with the currently selected configuration. If the client device region identifier has changed (the "Yes" branch from block 1902), main state processing continues at block 1910.

At block 1904, client object 824 determines whether or not the current region configuration file is synchronized with the region configuration file of the same name that is currently being broadcast. If the region configuration file is not synchronized (the "No" branch from block 1904), main state processing continues at block 1910.

At block 1906, client object 824 sets region idle timer 1012 equal to a future time (e.g., 10 minutes from the current time).

At block 1908, client object 824 re-enters main state 1206.

If a discrepancy is found with either the client device region identifier (the "Yes" branch from block 1902) or the region configuration file (the "No" branch from block 1904), then at block 1910, client object 824 executes an invalidate all operation 1020 to prevent the task objects currently in task list 1004 from executing. An exemplary invalidate all operation 1020 is described in more detail below with reference to FIG. 23.

At block 1912, client object 824 enters getting region config file state 1204.

Exemplary Client Object Prepare Task List Operation

Figure 20:
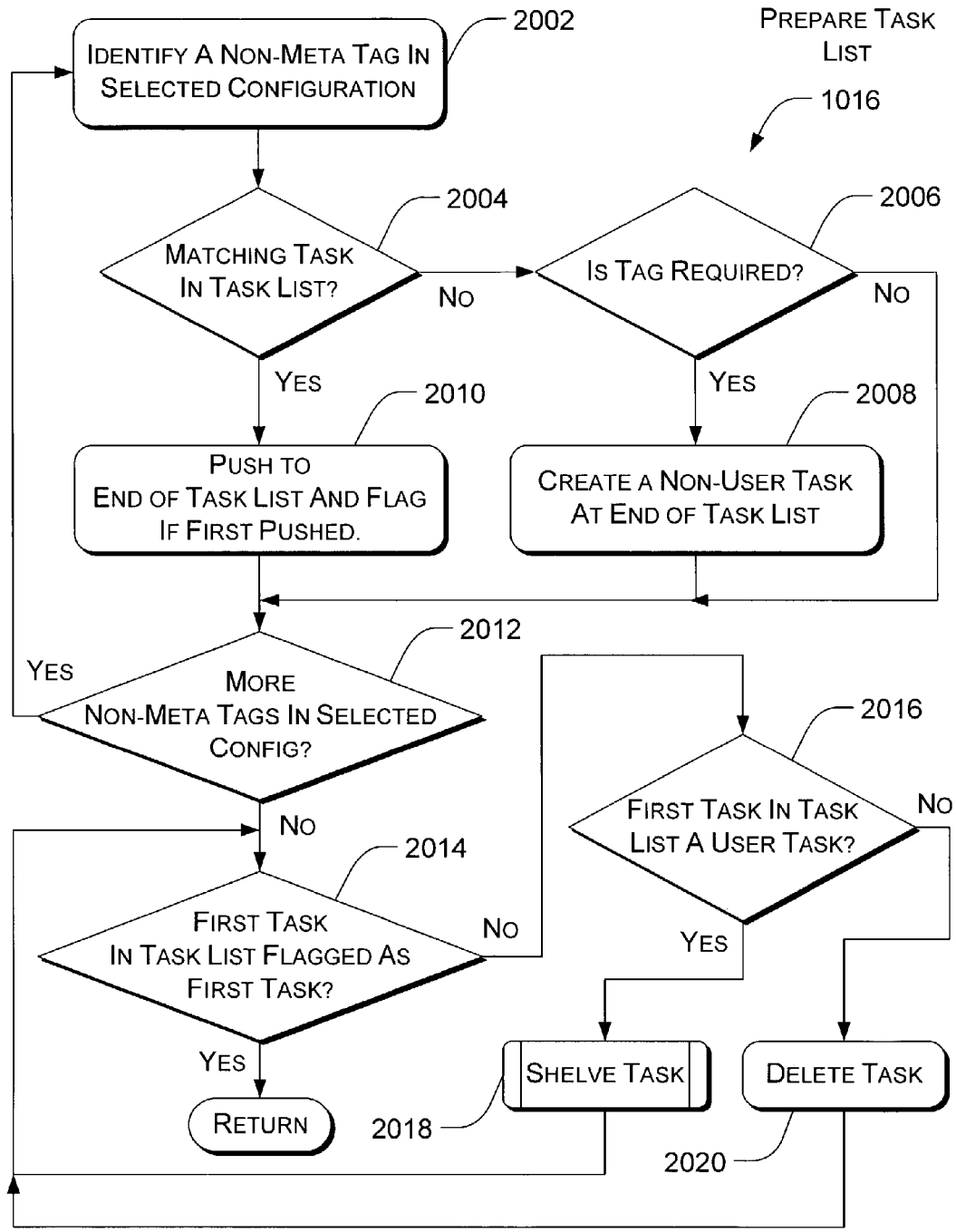
FIG. 20 illustrates an exemplary method that may be performed by the client object of FIG. 10 to prepare a task list.

FIG. 20 illustrates an exemplary prepare task list operation 1016 that may be performed by client object 824. Prepare task list 1016 is performed by client object 824 while in the getting region config file state 1204 to initialize task list 1004 based on the currently selected configuration.

At block 2002, client object 824 identifies the first non-meta tag associated with the currently selected configuration in the region configuration file.

At block 2004, client object 824 examines task list 1004 to determine whether or not there exists a task object 826 associated with the data type indicated by the non-meta tag identified at block 2002. If there is not a matching task in task list 1004 (the "No" branch from block 2004), prepare task list 1016 continues at block 2006. Otherwise, if there is a matching task in task list 1004 (the "Yes" branch from block 2006), prepare task list 1016 continues at block 2010, described below.

At block 2006, client object 824 determines whether or not the tag identified in block 2002 is a required tag. As described above with reference to the example region configuration file, the first entry in a data tag indicates whether the tag specifies metadata (meta), required data (req), or optional data (opt). If it is determined that the identified tag is not required (the "No" branch from block 2006), then client object 824 takes no action, and prepare task list 1016 continues at block 2012, described below.

At block 2008, when it is determined that the identified tag is required (the "Yes" branch from block 2006), client object 824 creates a non-user task object 826 and adds the task to the end of task list 1004. A non-user task object may be created by calling the add task API function 1022 with a default set of parameters. In an alternate implementation, input parameters for add task 1022 may be included in the region configuration file, for example, as additional entries in a tag associated with task object 826. Prepare task list 1016 then continues at block 2012, described below.

At block 2010, when it is determined that a task matching the identified tag already exists in task list 1004, client object 824 pushes the existing task object to the end of task list 1004. Furthermore, if it is the first task object to be pushed to the end of the task list, client object 824 also flags the task as the first one pushed to the end of task list 1004.

At block 2012, client object 824 examines the region configuration file to determine whether or not there are additional non-meta tags associated with the definition of the selected configuration. If there are additional non-meta tags (the "Yes" branch from block 2012), then prepare task list 1016 loops through blocks 2002-2012 until there are no remaining non-meta tags associated with the selected configuration. Prepare task list 1016 then continues at block 2014.

At block 2014, client object 824 examines task list 1004 to determine whether or not the first task in the list is flagged as the first task pushed to the end of the task list (as described above with reference to block 2010). If it is determined that the first task in task list 1004 is flagged as the first task pushed (the "Yes" branch from block 2014), then client object 824 takes no further action, and prepare task list 1016 terminates. On the other hand, if the first task in task list 1004 is not flagged as the first task pushed (the "No" branch from block 2014), then prepare task list 1016 continues at block 2016.

At block 2016, client object 824 examines the first task in task list 1004 to determine whether or not the task is a user task. (User tasks are those task objects created while client object 824 is in adding tasks state 1202, as described above with reference to FIG. 12.) If the first task in task list 1004 is a user task (the "Yes" branch from block 2016), prepare task list 1016 continues at block 2018. Otherwise (the "No" branch from block 2016), prepare task list 1016 continues at block 2020.

At block 2018, client object 824 shelves the first task in task list 1004. When a task is shelved, the task remains in the task list, but has a next activity time property set to the most future representable date and time to ensure that the task will not execute. An exemplary method for shelving a task is described in more detail below with reference to FIG. 35.

At block 2020, client object 824 deletes the first task in task list 1004.

Prepare task list 1016 then loops back to block 2014, repeating blocks 2014-2020 until the first task in task list 1004 is the task that was flagged in block 2010 as the first task pushed to the end of task list 1004.

Exemplary Client Object Choose Configuration API Function

Figure 21:
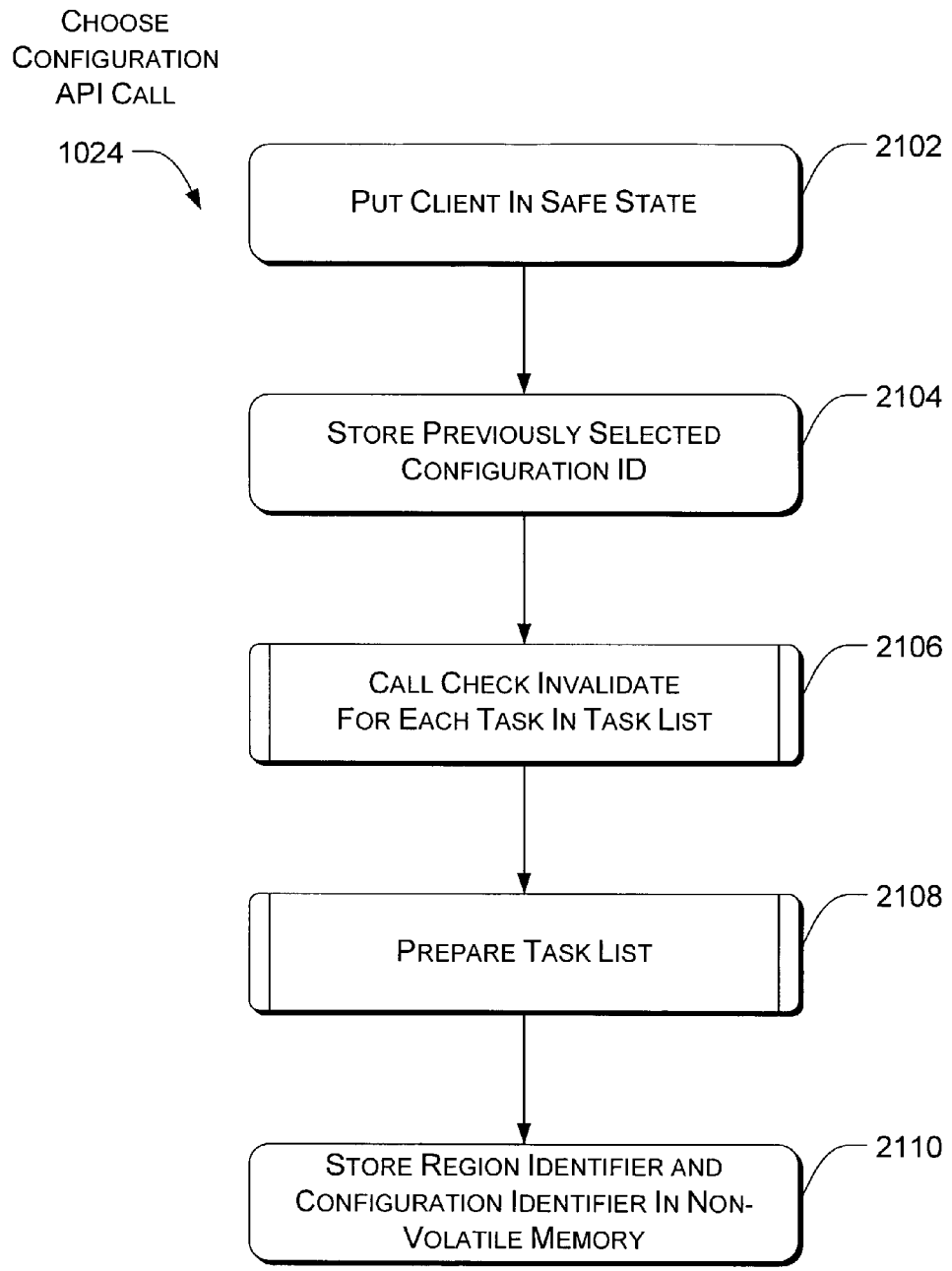
FIG. 21 illustrates an exemplary method that may be performed by the client object of FIG. 10 to choose a configuration in response to an API call.

FIG. 21 illustrates an exemplary choose configuration method 1024 that may be performed by client object 824 in response to an API call. Choose configuration 1024 is callable by a viewer through a user interface component, such as user interface 820. User interface 820 makes available to the viewer a list of available configurations, with the currently selected configuration highlighted (or otherwise indicated). When a viewer selects a configuration (other than the currently selected configuration), choose configuration 1024 is called.

At block 2102, client object 824 performs any application-specific shutdown procedures that may be required to put the client device into a safe mode that does not rely on any data files. For example, the client device may enter a special state that allows a viewer to continue viewing broadcast programs, but does not allow access to any of the additional broadcast data, such as the data needed to perform operations such as pay per view purchasing, channel locking, configuration selection, etc.

At block 2104, client object 824 stores a configuration identifier associated with the previously selected configuration within the client object. For example, client object 824 sets a local variable that holds the current configuration identifier. This value will be used to compare the new configuration with the previous configuration to clear out any unnecessary task objects.

At block 2106, client object 824 calls check invalidate task operation 1112 for each task in task list 1004. Check invalidate 1112 is used to free data that is not associated with the newly selected configuration. An exemplary check invalidate task operation 1112 is described in more detail below with reference to FIG. 36.

At block 2108, client object 824 executes prepare task list 1016 (as describe above with reference to FIG. 20) to initialize task list 1004 to correspond with the newly selected configuration.

At block 2110, client object 824 stores the current client device region identifier and the currently selected configuration identifier as a configuration value in non-volatile memory 812. As described above, storing the current region identifier and the currently selected configuration identifier allows client device 110 to reload the last selected configuration on startup, and prevents client device 110 from attempting to reload a previously selected configuration in an event that the client device region identifier has changed or the previously selected configuration is no longer available.

Exemplary Client Object Get First Task Operation

Figure 22:
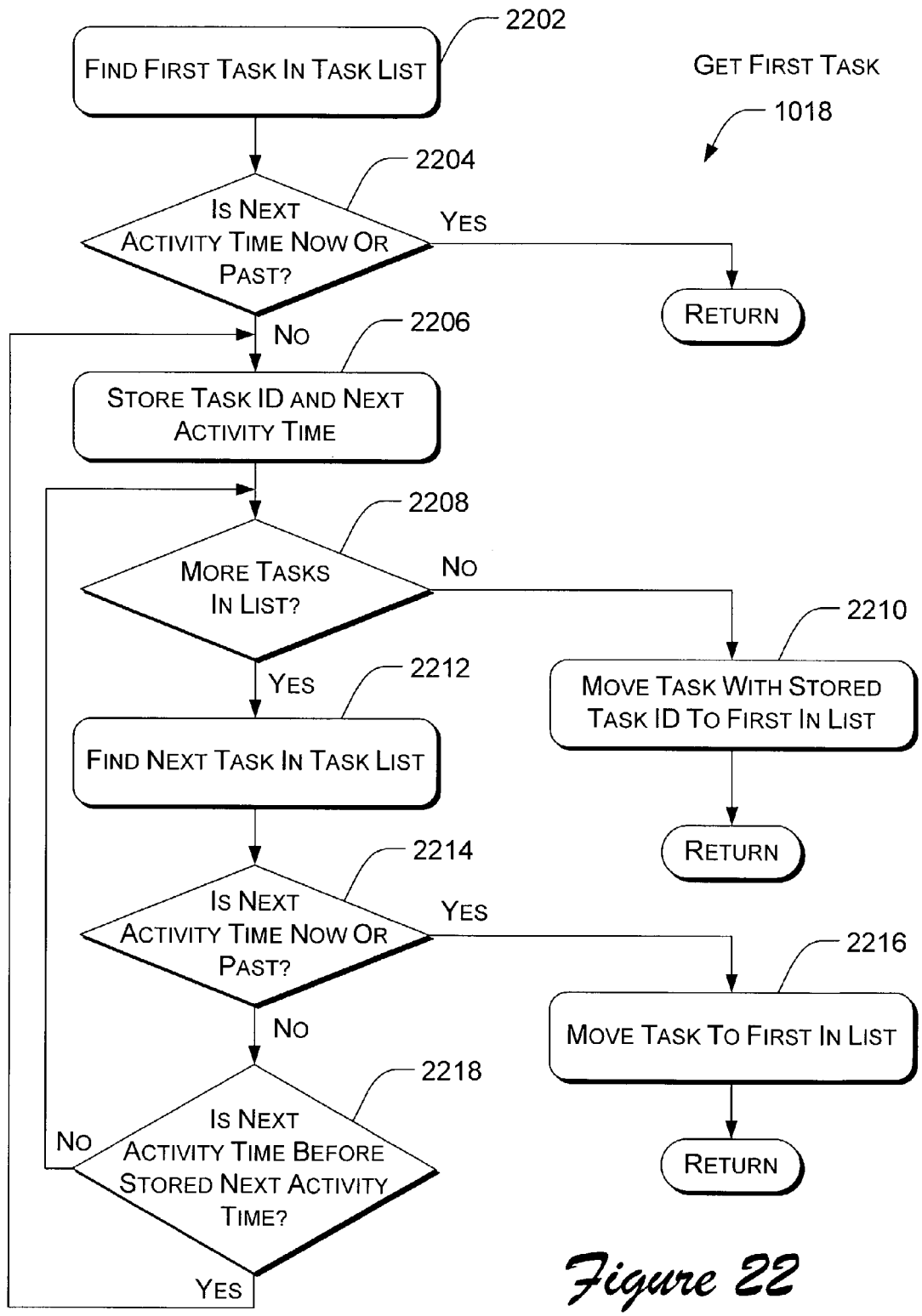
FIG. 22 illustrates an exemplary method that may be performed by the client object of FIG. 10 to identify a first task object to be processed.

FIG. 22 illustrates an exemplary get first task operation 1018 that may be performed by client object 824. Get first task 1018 is performed by client object 824 to determine which task to perform when task idle timer 1010 signals that it is time to perform the next task.

At block 2202, client object 824 identifies the first task in task list 1004.

At block 2204, client object 824 compares the next activity time property of the first task in task list 1004 with the current time. If the next activity time property is equal to or before the current time (the "Yes" branch from block 2204) then get first task 1018 terminates. Otherwise (the "No" branch from block 2204), get first task 1018 continues at block 2206.

At block 2206, client object 824 stores a task identifier and the next activity time associated with the current task object, identifying it as the task with the earliest next activity time.

At block 2208, client object 824 determines whether or not there are more tasks in task list 1004. If there are more tasks in task list 1004 (the "Yes" branch from block 2208), then get first task 1018 continues at block 2212. Otherwise (the "No" branch from block 2208), at block 2210, get first task 1018 moves the task object 826 associated with the stored task identifier to the first position in task list 1004, and terminates.

At block 2212, client object 824 identifies the next task in task list 1004.

At block 2214, client object 824 compares the next activity time property of the task with the current time. If the next activity time property is equal to or before the current time (the "Yes" branch from block 2214) then get first task 1018 continues at block 2216. Otherwise (the "No" branch from block 2214, get first task 1018 continues at block 2218.

At block 2216, client object 824 moves the current task object 826 to the first position in task list 1004, and get first task 1018 terminates.

At block 2218, client object 824 compares the next activity time property of the currently selected task with the next activity time property that was stored as described with reference to block 2206. If the next activity time of the current task is before the stored next activity time (the "Yes" branch from block 2218), then get first task 1018 loops back to block 2206. Otherwise (the "No" branch from block 2218), get first task 1018 loops back to block 2208, as described above.

Exemplary Client Object Invalidate All Operation

Figure 23:
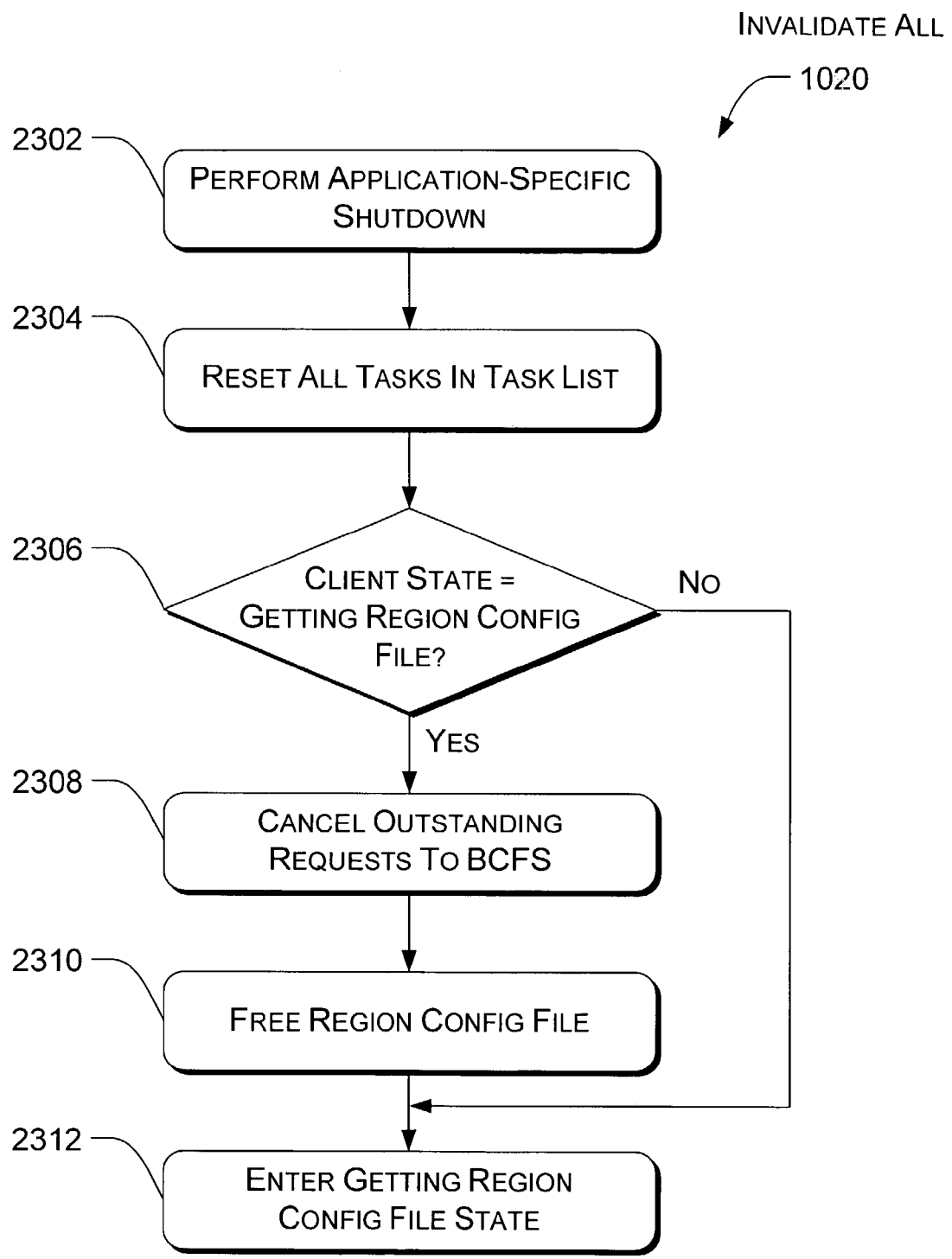
FIG. 23 illustrates an exemplary method that may be performed by the client object of FIG. 10 to invalidate all task objects in a task list.

FIG. 23 illustrates an exemplary invalidate all operation 1020 that may be performed by client object 824. Invalidate all 1020 is executed when client object 824 exits main state 1206 either because it detects that its region identifier has changed (e.g., a new region identifier has been received from the headend) or because it detects that the current region configuration file has changed. Invalidate all 1020 invalidates each task in task list 1004 and puts client object 824 into getting region config file state 1204.

At block 2302, client object 824 performs any application-specific shutdown procedures that may be required to put the client device into a safe mode. For example, the client device may enter a special state that allows a viewer to continue viewing broadcast programs, but not access any of the additional broadcast data, such as the data needed to perform operations such as pay per view purchasing, channel locking, configuration selection, etc.

At block 2304, client object 824 calls a reset function associated with each task in task list 1004. For example, client object 824 loops through task list 1004 and calls task object reset operation 1108 for each task object in task list 1004. An exemplary task object reset operation 1108 is described in further detail below with reference to FIG. 34.

At block 2306, client object 824 determines whether its current state is getting region config file 1204. If the current state is getting region config file (the "Yes" branch from block 2306), then invalidate all 1020 continues at block 2308. Otherwise (the "No" branch from block 2306), invalidate all 1020 continues at block 2312.

At block 2308, client object 824 cancels any outstanding BCFS requests.

At block 2310, client object 824 frees the current region configuration file. In the described implementation, the broadcast data that is received is maintained in RAM by the task objects 826. In an alternate implementation, the received broadcast data may be stored on a hard drive or other memory device. Depending on the implementation, client object 824 frees the current region configuration file by freeing the RAM in which the region configuration file is maintained, by deleting the region configuration file stored on a hard drive, or by any other method for making storage space available.

At block 2312, client object 824 enters getting region config file state 1204.

Exemplary Task Object State Transition

In the described implementation, depending on how it is created, a task object 826 may be responsible for monitoring the contents of a single directory, or the task object 826 may be responsible for monitoring the contents of all subdirectories under a particular directory. A task object 826 that is created with the files flag property set is responsible for monitoring the contents of a single directory, while a task object 826 that is created with the subdirs flag property set responsible for monitoring the contents of all subdirectories under a particular directory. In the described implementation, only one level of subdirectories is supported, but it is recognized that support for additional subdirectory levels may also be similarly implemented.

A task object 826 can receive two types of messages from client object 824. The first indicates that task idle timer 1010 has signaled, which causes the task object 826 to determine the next appropriate BCFS command to execute based on the task object's current state. The second type of message that can be received is a response from BCFS 815.

State Transition in Task Object Responsible for Files

Figure 24:
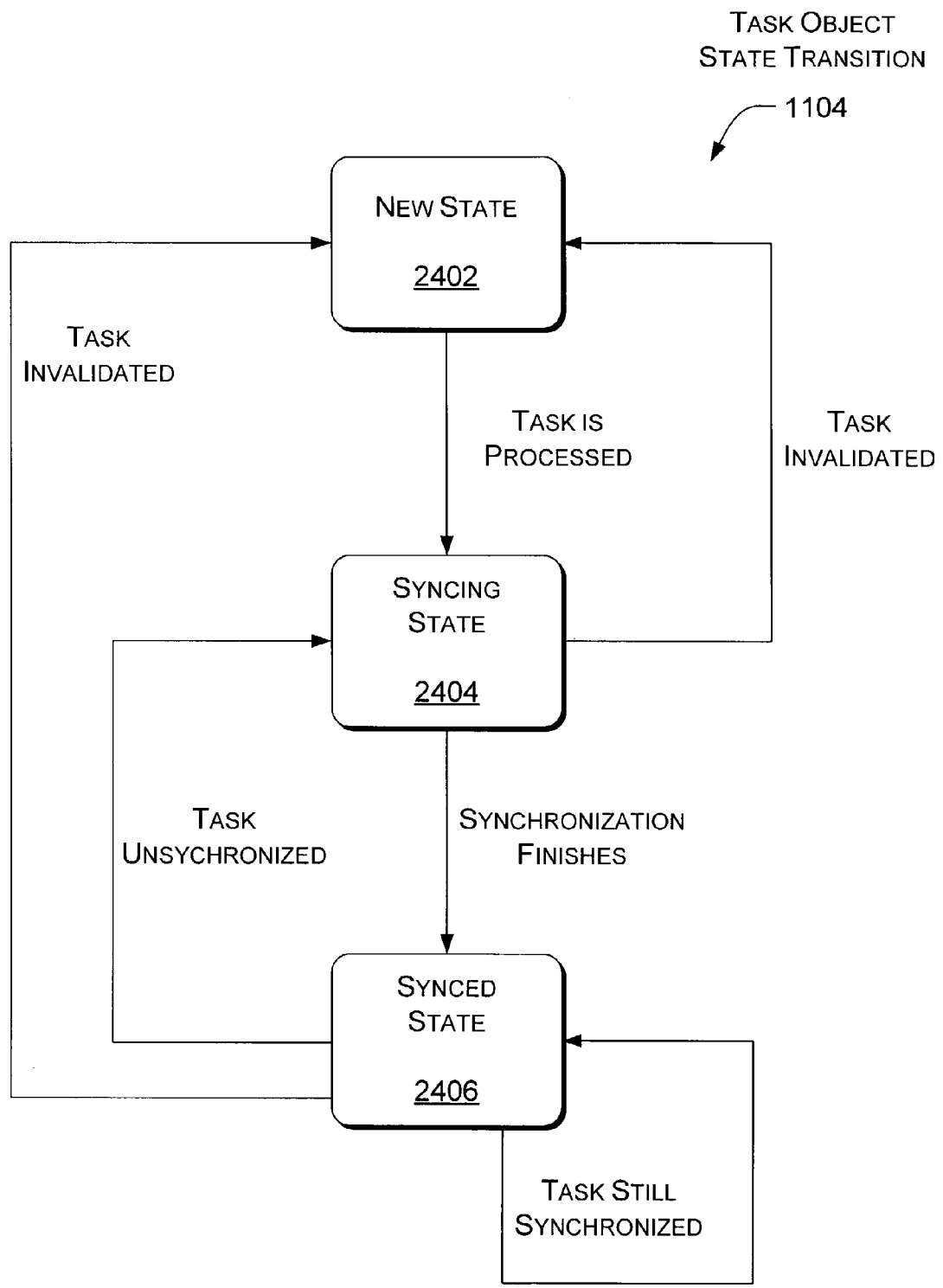
FIG. 24 is an exemplary block diagram illustrating state transition in the task object of FIG. 11.

FIG. 24 illustrates transitions between states 1104 of task object 826 created to monitor the contents of a single directory (indicated by the files flag property). When a task object 826 is created (e.g., through an API call to add task 1022) or has just been reset (an exemplary task reset operation 1108 is described below, with reference to FIG. 34), the task object 826 enters new state 2402. When task object 826 receives a signal that it is to be processed (or executed) while in new state 2402, task object 826 enters syncing state 2404. Task object 826 new state processing is described in more detail below with reference to FIG. 25.

While in syncing state 2404, task object 826 attempts to synchronize locally maintained data associated with task object 826 with data of the same data type that is being broadcast. Task object 826 remains in syncing state 2404 until the data is successfully synchronized (at which point task object 826 enters synced state 2406) or until the task object is invalidated, for example, when a viewer selects a new configuration (at which point task object 826 re-enters new state 2402). Task object 826 syncing state processing is described in more detail below with reference to FIG. 26.

While in synced state 2406, task object 826 verifies that the synchronized data remains synchronized. If task object 826 determines that the data is no longer synchronized, then task object 826 re-enters syncing state 2404. If task object 826 is invalidated, for example, when a viewer selects a new configuration, then task object 826 re-enters new state 2402. Task object 826 synced state processing is described in more detail below with reference to FIG. 27.

Figure 25:
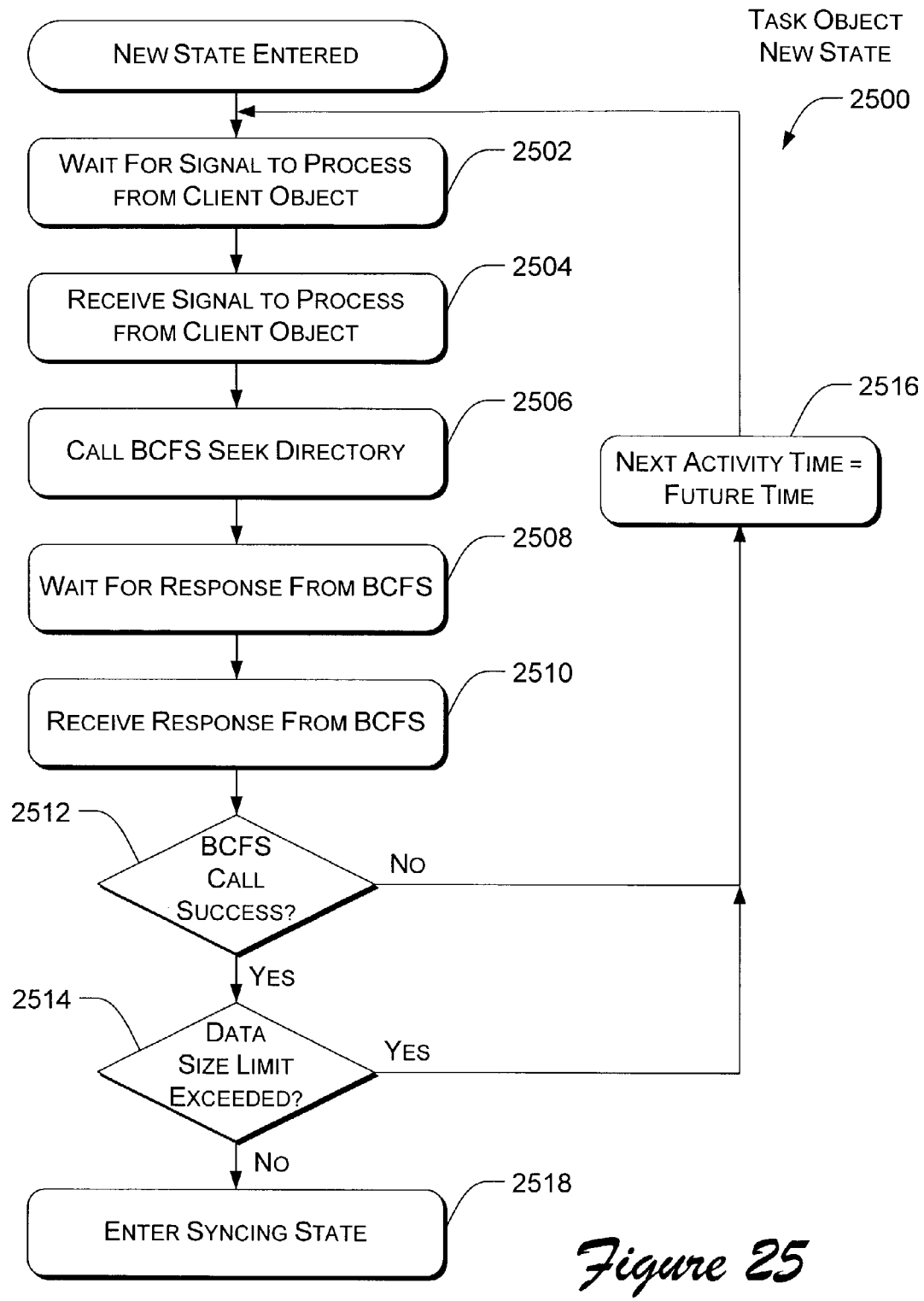
FIG. 25 is an exemplary process flow diagram illustrating operations performed by the task object of FIG. 11 while in a new state.

FIG. 25 illustrates an exemplary method 2500 performed by task object 826 while in new state 2402.

At block 2502, task object 826 waits to receive a signal to process from client object 824.

At block 2504, task object 826 receives a signal to process from client object 824.

At block 2506, task object 826 issues a seek directory call to BCFS 815, specifying the directory associated with the data type of the task (as indicated by the tag value of the tag in the configuration definition that is associated with current task object 826).

At block 2508, task object 826 waits for a response from BCFS 815 to be received.

At block 2510, task object 826 waits for a response from BCFS 815 to be received.

At block 2512, task object 826 determines (based on the received response) whether the BCFS seek directory call was successful.

If the BCFS seek directory call was successful (the "Yes" branch from block 2512), then task object new state processing continues at block 2514. On the other hand, if the BCFS seek directory call failed (the "No" branch from block 2512), then task object new state processing continues at block 2516.

At block 2514, task object 826 examines the received BCFS response to determine whether a data size limit property value associated with task object 826 is exceeded by the broadcast data of the specified type.

If the data size limit is exceeded (the "Yes" branch from block 2514), then task object new state processing continues at block 2516. On the other hand, if the data size limit is not exceeded, or a data size limit is not specified (the "No" branch from block 2514), then at block 2518, task object 826 enters syncing state 2404.

At block 2516, task object 826 sets the next activity time property to a future time (e.g., five minutes from the current time), and task object 826 remains in new state 2402, continuing processing at block 2502.

Figure 26:
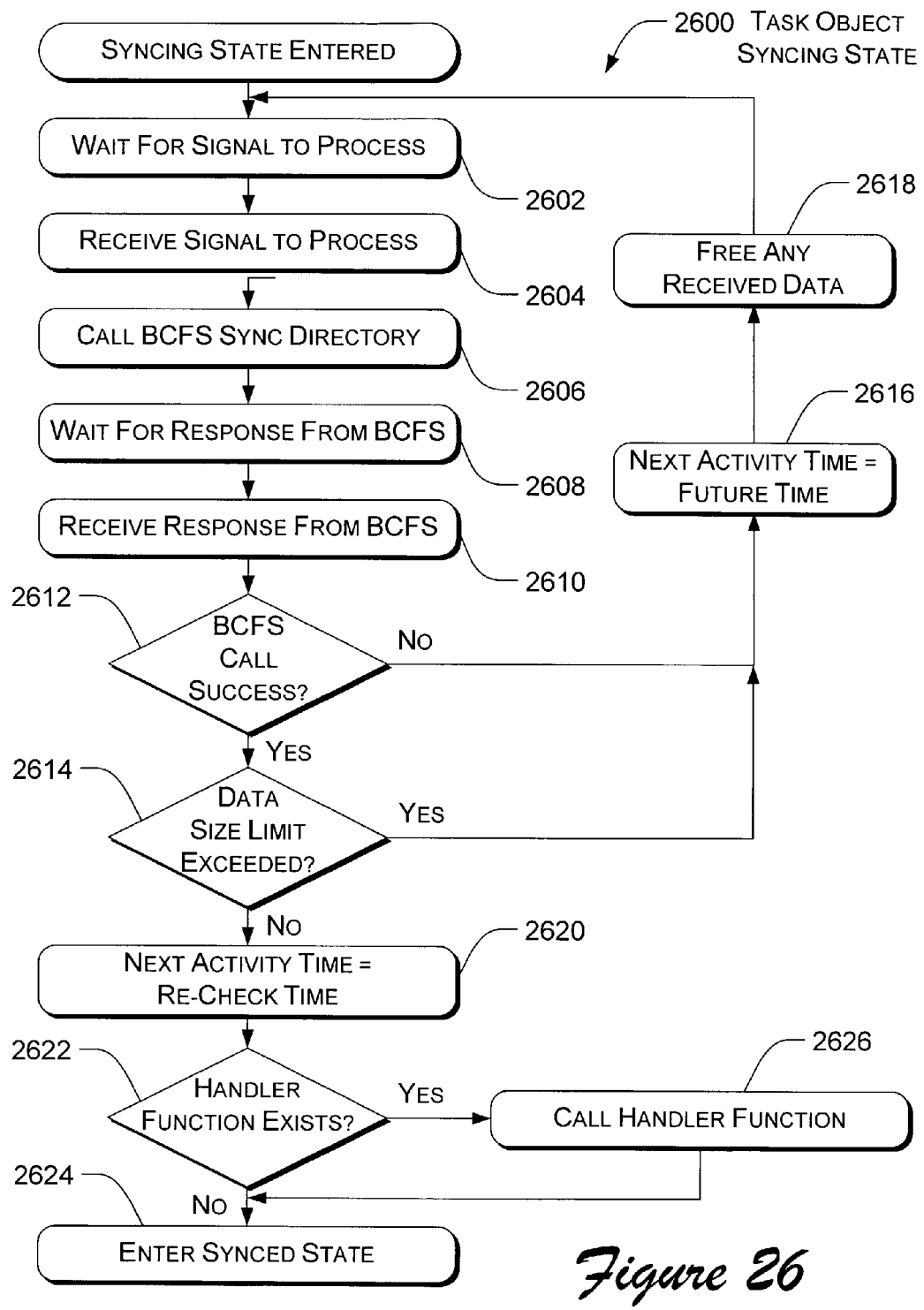
FIG. 26 is an exemplary process flow diagram illustrating operations performed by the task object of FIG. 11 while in a syncing state.

FIG. 26 illustrates an exemplary method 2600 performed by task object 826 while in syncing state 2404.

At block 2602, task object 826 waits to receive a signal to process from client object 824.

At block 2604, task object 826 receives a signal to process from client is object 824.

At block 2606, task object 826 issues a sync directory call to BCFS 815, specifying the directory associated with the data type of the task (as indicated by the tag value of the tag in the configuration definition that is associated with the current task object 826).

At block 2608, task object 826 waits for a response from BCFS 815 to be received.

At block 2610, task object 826 waits for a response from BCFS 815 to be received.

At block 2612, task object 826 determines (based on the received response) whether the BCFS sync directory call was successful.

If the BCFS sync directory call was successful (the "Yes" branch from block 2612), then task object syncing state processing continues at block 2614. On the other hand, if the BCFS sync directory call failed (the "No" branch from block 2612), then task object syncing state processing continues at block 2618.

At block 2614, task object 826 examines the received BCFS response to determine whether a data size limit property value associated with task object 826 is exceeded by the broadcast data of the specified type.

If the data size limit is exceeded (the "Yes" branch from block 2614), then task object syncing state processing continues at block 2616. On the other hand, if the data size limit is not exceeded, or a data size limit is not specified (the "No" branch from block 2614), then task object syncing state operation continues at block 2620, described below.

At block 2616, task object 826, sets the next activity time property to a future time (e.g., five minutes from the current time).

At block 2618, task object 826 frees (by deleting or freeing memory) any data received in association with the current task object, and remains in syncing state 2404, looping back to block 2602.

At block 2620, task object 826 sets the next activity time property to the current time plus the value of the re-check interval property.

At block 2622, task object 826 determines whether a handler function is associated with the task object (as indicated by the task handler function property of task object 826). If a handler function is specified, then, at block 2626, the handler function is called.

At block 2624, task object 826 enters synced state 2406.

Figure 27A:
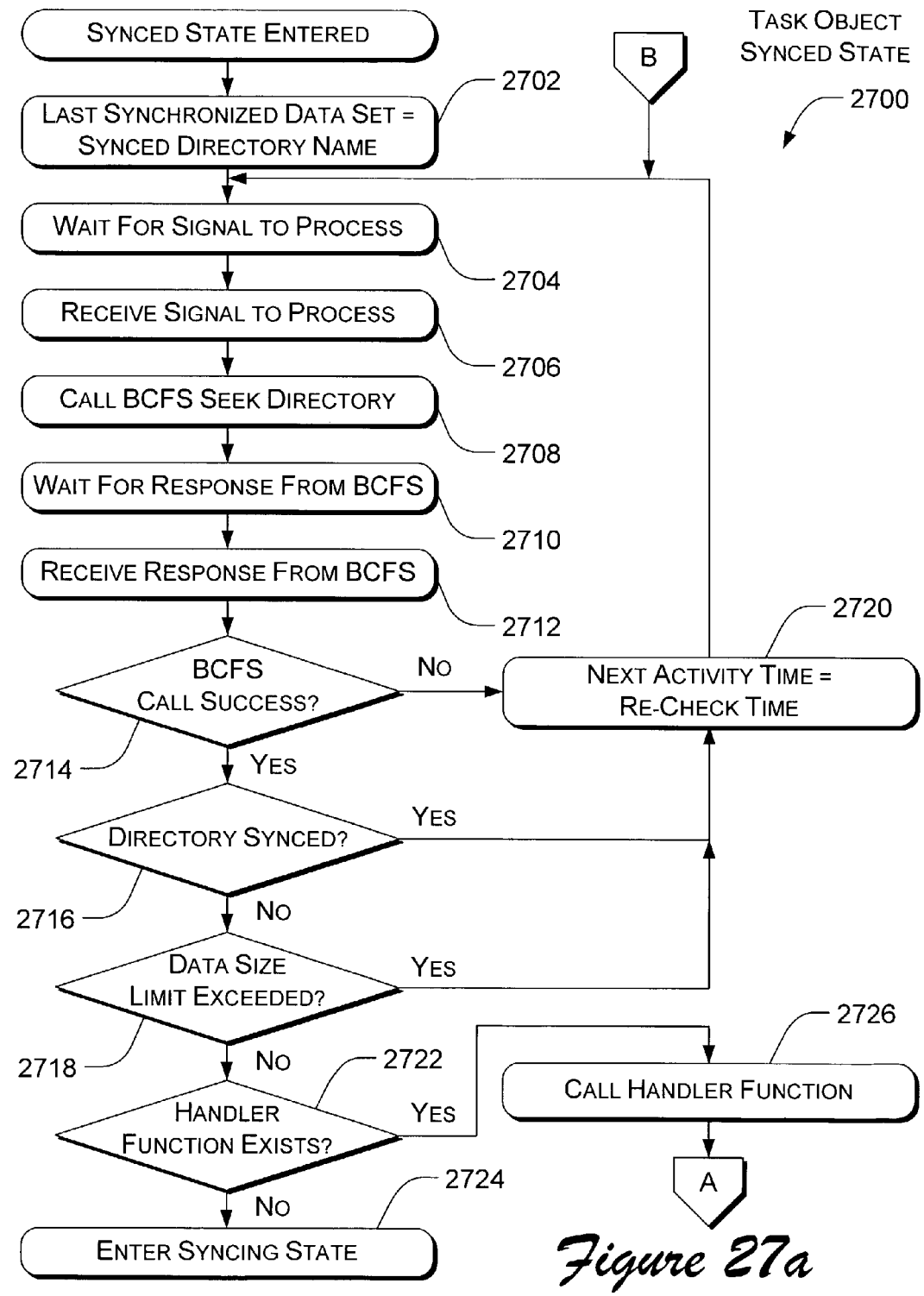
FIG. 27a is an exemplary process flow diagram illustrating operations performed by the task object of FIG. 11 while in a synced state.
Figure 27B:
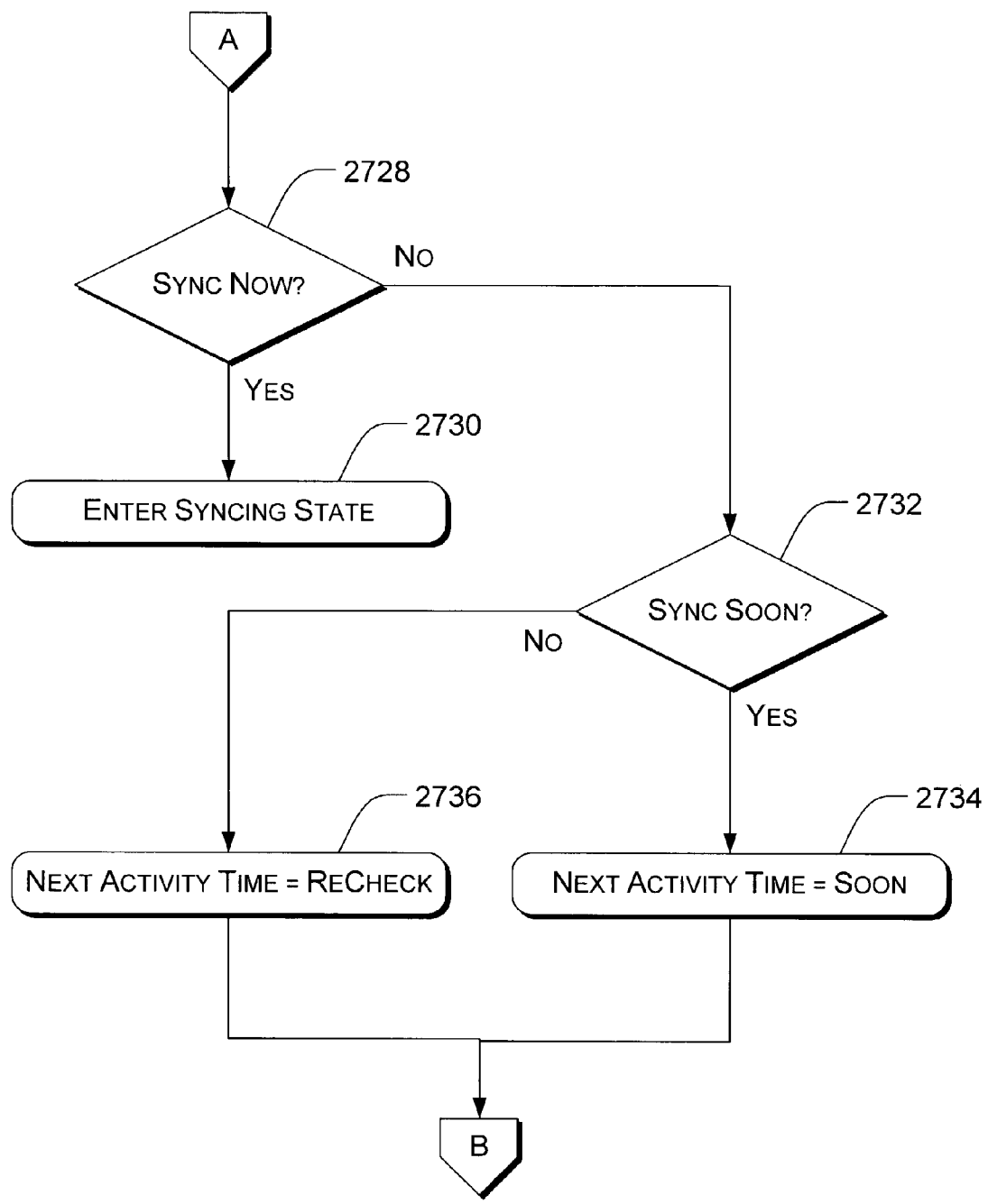
FIG. 27b is an exemplary process flow diagram illustrating operations performed by the task object of FIG. 11 while in a synced state after a handler function is called.

FIGS. 27a and 27b illustrate an exemplary method 2700 performed by task object 826 while in synced state 2406

At block 2702, task object 826 sets the last synchronized data set property of the task object to the name of the tag value from the tag in the configuration definition that is associated with the task object. The tag value indicates the location from which the received data was broadcast. This value is stored when the task object is synchronized to enable client object 824 to determine which task objects need to be re-synchronized when a new configuration is selected.

At block 2704, task object 826 waits to receive a signal to process from client object 824.

At block 2706, task object 826 receives a signal to process from client object 824.

At block 2708, task object 826 issues a seek directory call to BCFS 815 to determine whether or not the locally maintained data associated with task object 826 is still synchronized with the data that is being broadcast.

At block 2710, task object 826 waits for a response from BCFS 815 to be received.

At block 2712, task object 826 waits for a response from BCFS 815 to be received.

At block 2714, task object 826 determines (based on the received response) whether the BCFS seek directory call was successful.

If the BCFS seek directory call was successful (the "Yes" branch from block 2714), then task object synced state processing continues at block 2716. On the other hand, if the BCFS seek directory call failed (the "No" branch from block 2714), then task object synced state processing continues at block 2720.

At block 2716, task object 826 examines the received BCFS response to determine whether specified directory is still synchronized. If the data is synchronized (the "Yes" branch from block 2716), then task object synced state processing continues at block 2720. Otherwise (the "No" branch from block 2716), task object synced state processing continues at block 2718.

At block 2718, task object 826 examines the received BCFS response to determine whether a data size limit property value associated with task object 826 is exceeded by the broadcast data of the specified type.

If the data size limit is exceeded (the "Yes" branch from block 2718), then task object synced state processing continues at block 2720. On the other hand, if the data size limit is not exceeded, or a data size limit is not specified (the "No" branch from block 2718), then task object synced state processing continues at block 2722, described below.

At block 2720, task object 826, sets the next activity time property to the current time plus the value of the re-check interval property, and task object 826 remains in synced state 2406, looping back to block 2704.

At block 2722, task object 826 determines whether a handler function is associated with the task object (as indicated by the task handler function property of task object 826). If a handler function is not specified, then at block 2724, task object 826 enters syncing state 2404. On the other hand, if a handler function is specified, then, at block 2726, the handler function is called to determine when synchronization is to occur, and processing continues at block 2728, illustrated in FIG. 27*b*.

At block 2728, task object 826 determines, based on a response from the handler function whether synchronization is to be performed immediately. If so, then at block 2730, task object 826 enters syncing state 2404.

Otherwise, at block 2732, task object 826 determines, based on the response from the handler function, whether synchronization is to be performed in a short time. If so, then at block 2734, task object 826 sets the next activity time property to a short time in the future (e.g., the current time plus five seconds), and task object synced state processing continues at block 2702 (as illustrated in FIG. 27*a*).

If the response from the handler function indicates that synchronization is to be performed later (the "No" branch from block 2732), then at block 2736, task object 826 sets the next activity time property to the current time plus the value of the re-check interval property. Task object synced state processing then continues at block 2702 (as illustrated in FIG. 27*a*).

State Transition in Task Object Responsible for Subdirectories

Figure 28:
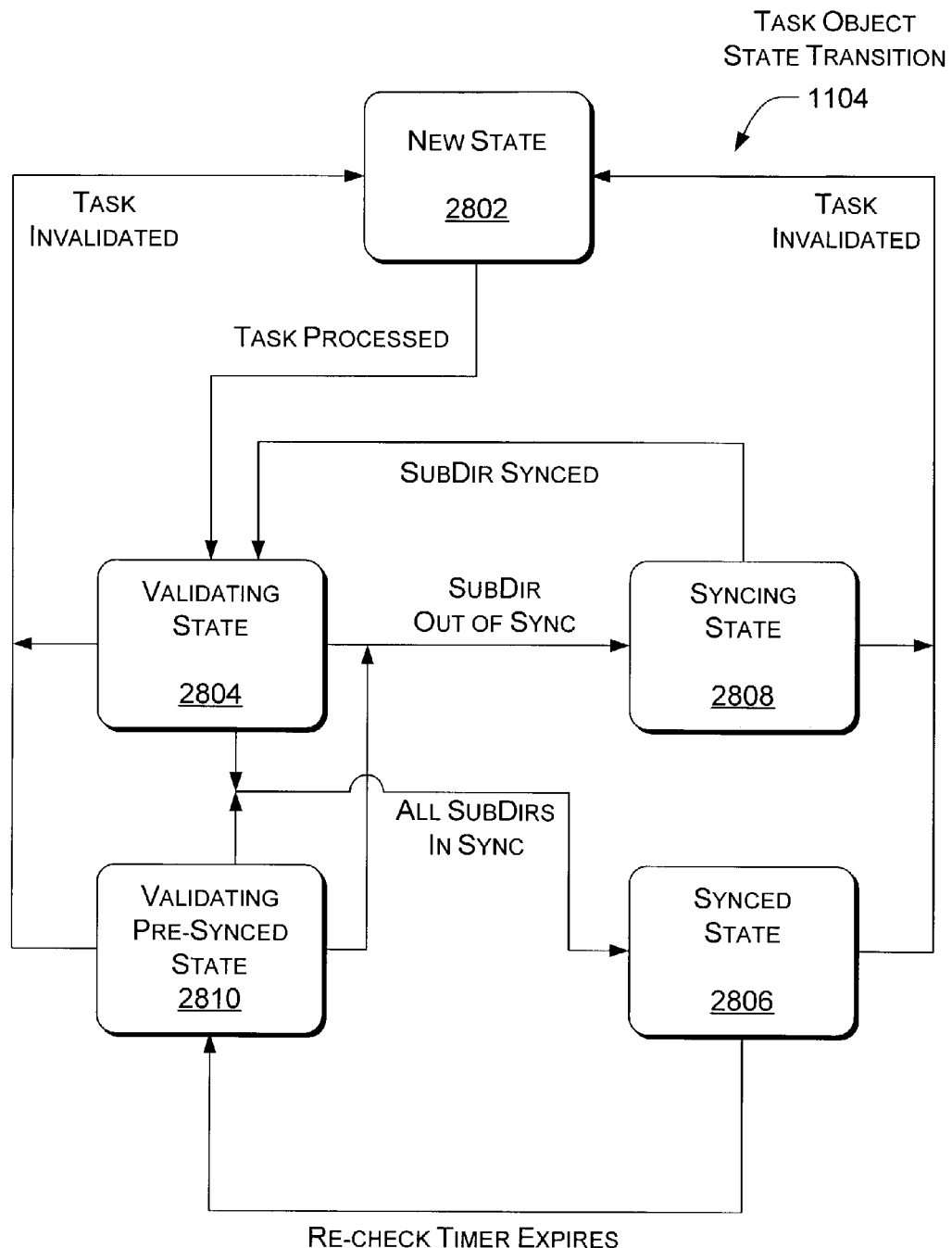
FIG. 28 is an exemplary block diagram illustrating state transition in the task object of FIG. 11.

FIG. 28 illustrates transitions between states 1104 of task object 826 created to monitor the contents of all subdirectories under a particular directory (as indicated by the value of the subdirs flag property). The state transitions illustrated in FIG. 28 are more complicated than the state transitions illustrated in FIG. 24 because task object 826 is responsible for synchronizing data in multiple subdirectories. In this case, task object 826 utilizes the directory index property and the directory count property. As described above, the directory index property stores an integer that indicates which subdirectory is currently being operated on. The directory count property stores an integer that indicates the number of directories that have currently been synchronized by task object 826.

When a task object 826 is created (e.g., through an API call to add task 1022) or has just been reset (an exemplary task reset operation 1108 is described below, with reference to FIG. 34), the task object 826 enters new state 2802. When task object 826 receives a signal that it is to be processed (or executed) while in new state 2802, task object 826 enters validating state 2804. Task object 826 new state processing in this context is described in more detail below with reference to FIG. 29. Task object 826 re-enters new state 2802 from any other state if the task object is invalidated (such as when a viewer selects a new configuration with which task object 826 is not associated).

Validating state 2804 is used by task object 826 to control the synchronization of each subdirectory associated with task object 826. Task object 826 validating state processing is described in more detail below with reference to FIG. 30. When task object 826, while in validating state 2804, determines that a particular subdirectory is not synchronized, task object 826 enters syncing state 2808. When task object 826, while in validating state 2804, determines that all of the subdirectories associated with the task are synchronized, then task object enters synced state 2806.

While in syncing state 2808, task object 826 attempts to synchronize locally maintained data from a particular subdirectory associated with task object 826 with data that is being broadcast. Task object 826 syncing state processing in this context is described in more detail below with reference to FIG. 31. When the subdirectory is successfully synchronized, task object returns to validating state 2804.

After all of the subdirectories associated with task object 826 are synchronized, task object 826 remains in synched state 2806 until a signal to process is received from client object 824. When processed while in synced state 2806, task object 826 determines the subdirectories that are being broadcast that are associated with task object 826, and then moves to validating pre-synced state 2810. Task object 826 synced state processing in this context is described in more detail below with reference to FIG. 32.

While in validating pre-synced state 2810, task object 826 verifies that previously synchronized data in each subdirectory associated with task object 826 is still synchronized. If task object 826 determines that the data is no longer synchronized, then task object 826 re-enters syncing state 2808. Task object 826 validating pre-synced state processing is described in more detail below with reference to FIG. 33.

Figure 29:
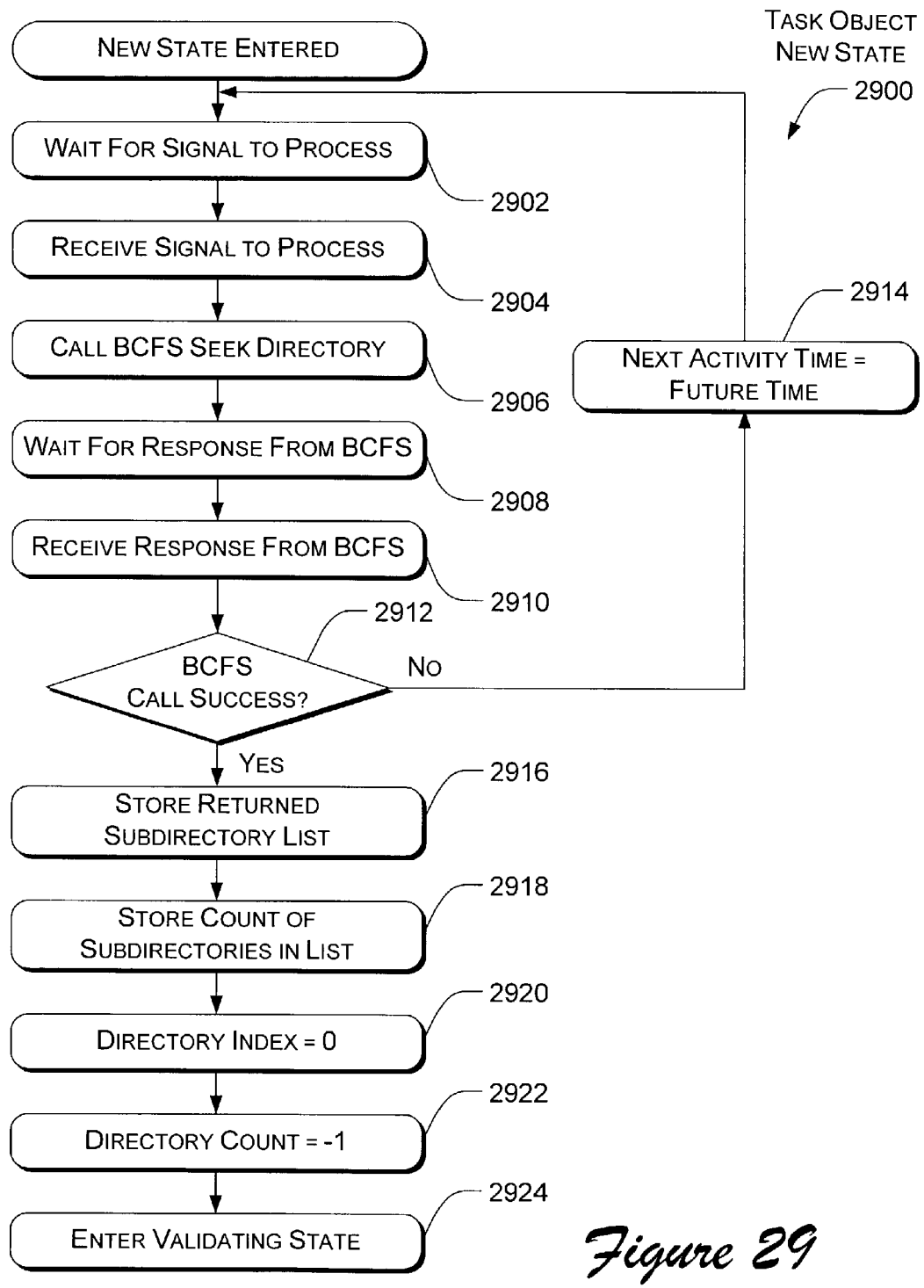
FIG. 29 is an exemplary process flow diagram illustrating operations performed by the task object of FIG. 11 while in a new state.

FIG. 29 illustrates an exemplary method 2900 performed by task object 826 while in new state 2802.

At block 2902, task object 826 waits to receive a signal to process from client object 824.

At block 2904, task object 826 receives a signal to process from client object 824.

At block 2906, task object 826 issues a seek directory call to BCFS 815 specifying the top-level directory associated with the task (which is given by the tag value of the tag in the currently selected configuration definition that is associated with data type of task object 826).

At block 2908, task object 826 waits for a response from BCFS 815 to be received.

At block 2910, task object 826 waits for a response from BCFS 815 to be received.

At block 2912, task object 826 determines (based on the received response) whether the BCFS seek directory call was successful.

If the BCFS seek directory call was successful (the "Yes" branch from block 2912), then task object new state processing continues at block 2916. On the other hand, if the BCFS seek directory call failed (the "No" branch from block 2912), then task object new state processing continues at block 2914.

At block 2914, task object 826 sets the next activity time property to a future time (e.g., five minutes from the current time), and task object 826 remains in new state 2802, continuing processing at block 2902.

If the BCFS seek directory call was successful (the "Yes" branch from block 2912), then BCFS 815 returns a list of subdirectories associated with the specified top-level directory and a count of the subdirectories.

At block 2916, task object 826 stores the returned list of subdirectories. In one implementation, the list is stored (and later processed) in alphabetical order.

At block 2918, task object 826 stores the count of subdirectories returned by the BCFS 815.

At block 2920, task object 826 sets the value of the directory index property to zero.

At block 2922, task object 826 sets the value of the directory count property to −1.

At block 2924, task object 826 enters validating state 2804.

Figure 30:
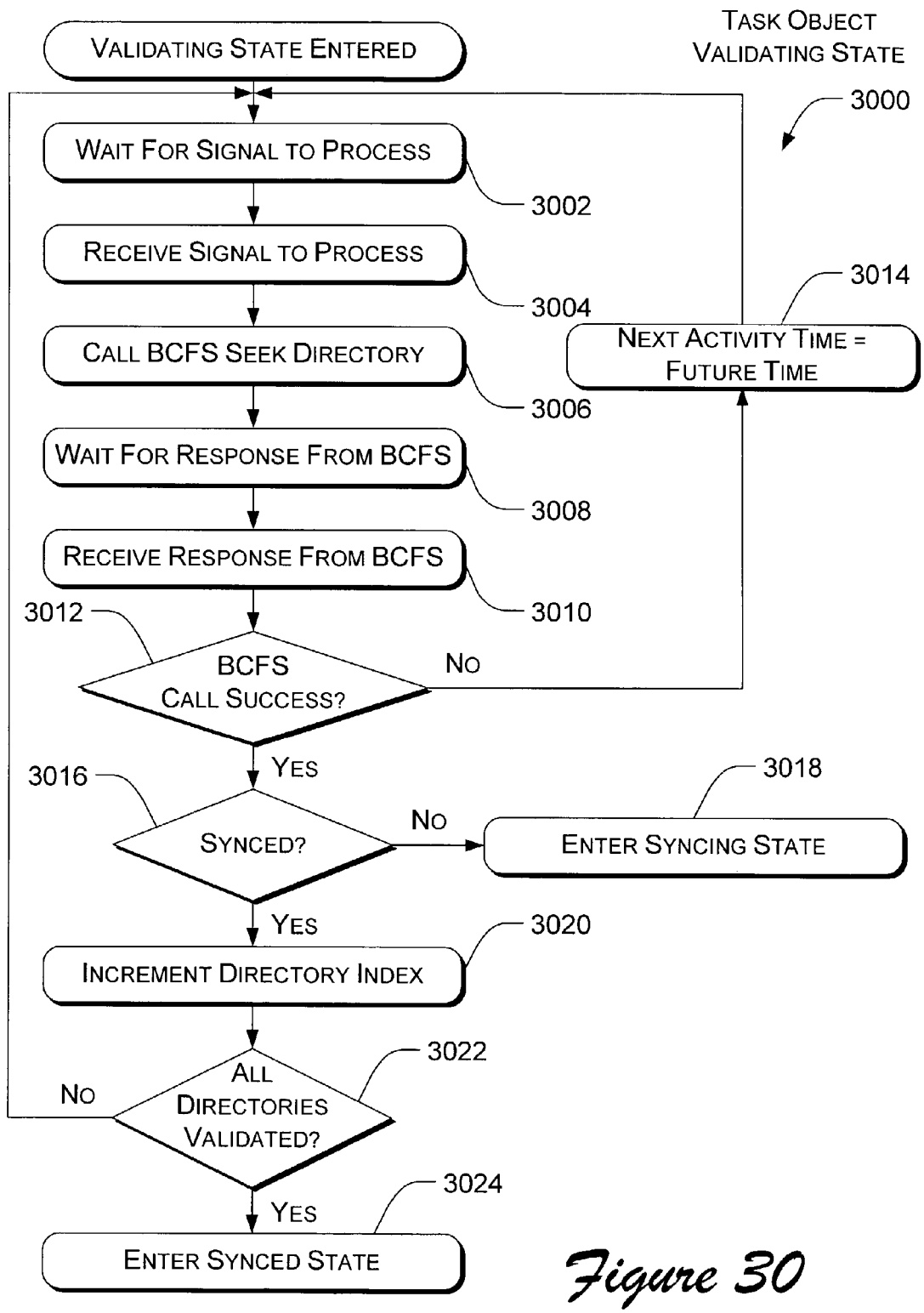
FIG. 30 is an exemplary process flow diagram illustrating operations performed by the task object of FIG. 11 while in a validating state.

FIG. 30 illustrates an exemplary method 3000 performed by task object 826 while in validating state 2804.

At block 3002, task object 826 waits to receive a signal to process from client object 824.

At block 3004, task object 826 receives a signal to process from client object 824.

At block 3006, task object 826 issues a seek directory call to BCFS 815 for a subdirectory that was found while task object 826 was in new state 2802. The directory index property is used to select a subdirectory from the stored list of subdirectories.

At block 3008, task object 826 waits for a response from BCFS 815 to be received.

At block 3010, task object 826 waits for a response from BCFS 815 to be received.

At block 3012, task object 826 determines (based on the received response) whether the BCFS seek directory call was successful.

If the BCFS seek directory call was successful (the "Yes" branch from block 3012), then task object new state processing continues at block 3014. On the other hand, if the BCFS seek directory call failed (the "No" branch from block 3012), then task object new state processing continues at block 3016.

At block 3014, task object 826 sets the next activity time property to a future time (e.g., five minutes from the current time), and task object 826 remains in validating state 2804, continuing processing at block 3002.

At block 3016, task object 826 examines the received BCFS response to determine whether the specified subdirectory is synchronized. If the response from BCFS 815 indicates that the current subdirectory is not synchronized (the "No" branch from block 3016), then at block 3018, task object 826 enters syncing state 2808. Otherwise (the "Yes" branch from block 3016), task object validate state processing continues at block 3020.

At block 3020, task object 826 increments the directory index property by one.

At block 3022, task object 826 compares the value of the directory index property with the count of subdirectories that was previously returned by BCFS 815. If the values are equal (indicating that all of the subdirectories are synchronized), then at block 3024, task object 826 is set to synched state 2806. On the other hand, if the values are not equal (indicating that there is at least one subdirectory that is not synchronized), then task object validating state processing continues at block 3002.

Figure 31:
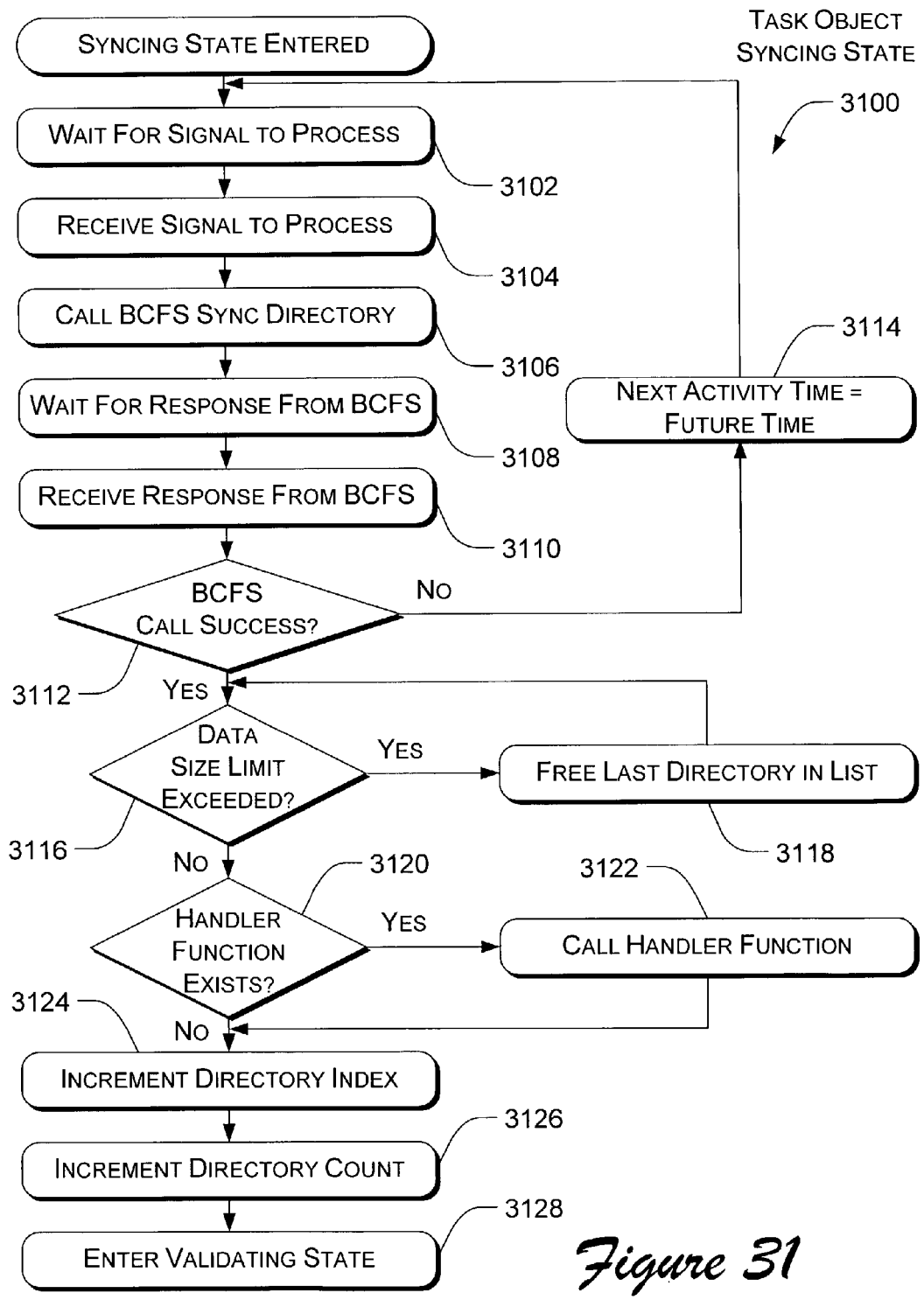
FIG. 31 is an exemplary process flow diagram illustrating operations performed by the task object of FIG. 11 while in a syncing state.

FIG. 31 illustrates an exemplary method 3100 performed by task object 826 while in syncing state 2808.

At block 3102, task object 826 waits to receive a signal to process from client object 824.

At block 3104, task object 826 receives a signal to process from client object 824.

At block 3106, task object 826 issues a sync directory call to BCFS 815 specifying the current subdirectory (as determined by the directory index property). In one implementation, because some data (e.g., pages that display EPG search results) may require pointers to other data in other directories, task object 826 may call a handler function that controls when the sync directory call is made.

At block 3108, task object 826 waits for a response from BCFS 815 to be received.

At block 3110, task object 826 waits for a response from BCFS 815 to be received.

At block 3112, task object 826 determines (based on the received response) whether the BCFS sync directory call was successful.

If the BCFS sync directory call was successful (the "Yes" branch from block 3112), then task object new state processing continues at block 3116. On the other hand, if the BCFS seek directory call failed (the "No" branch from block 3112), then task object new state processing continues at block 3114.

At block 3114, task object 826 sets the next activity time property to a future time (e.g., five minutes from the current time), and task object 826 remains in syncing state 2808, continuing processing at block 3102.

At block 3116, task object 826 examines the received BCFS response to determine whether a data size limit associated with task object 826 is exceeded by the data in the subdirectories that have been synchronized.

If the data size limit is exceeded (the "Yes" branch from block 3116), then at block 3118, task object 826 frees the data associated with the last subdirectory in the list of subdirectories, and continues at block 3116.

At block 3120, task object 826 determines whether or not a handler function is associated with task object 826 (as indicated by the handler function property). If there task object 826 has an associated handler function (the "Yes" branch from block 3120), then at block 3122, task object 826 calls the handler function.

At block 3124, task object 826 increments the directory index property by one.

At block 3126, task object 826 increments the directory count property by one.

At block 3128, task object 826 re-enters validating state 2804.

Figure 32:
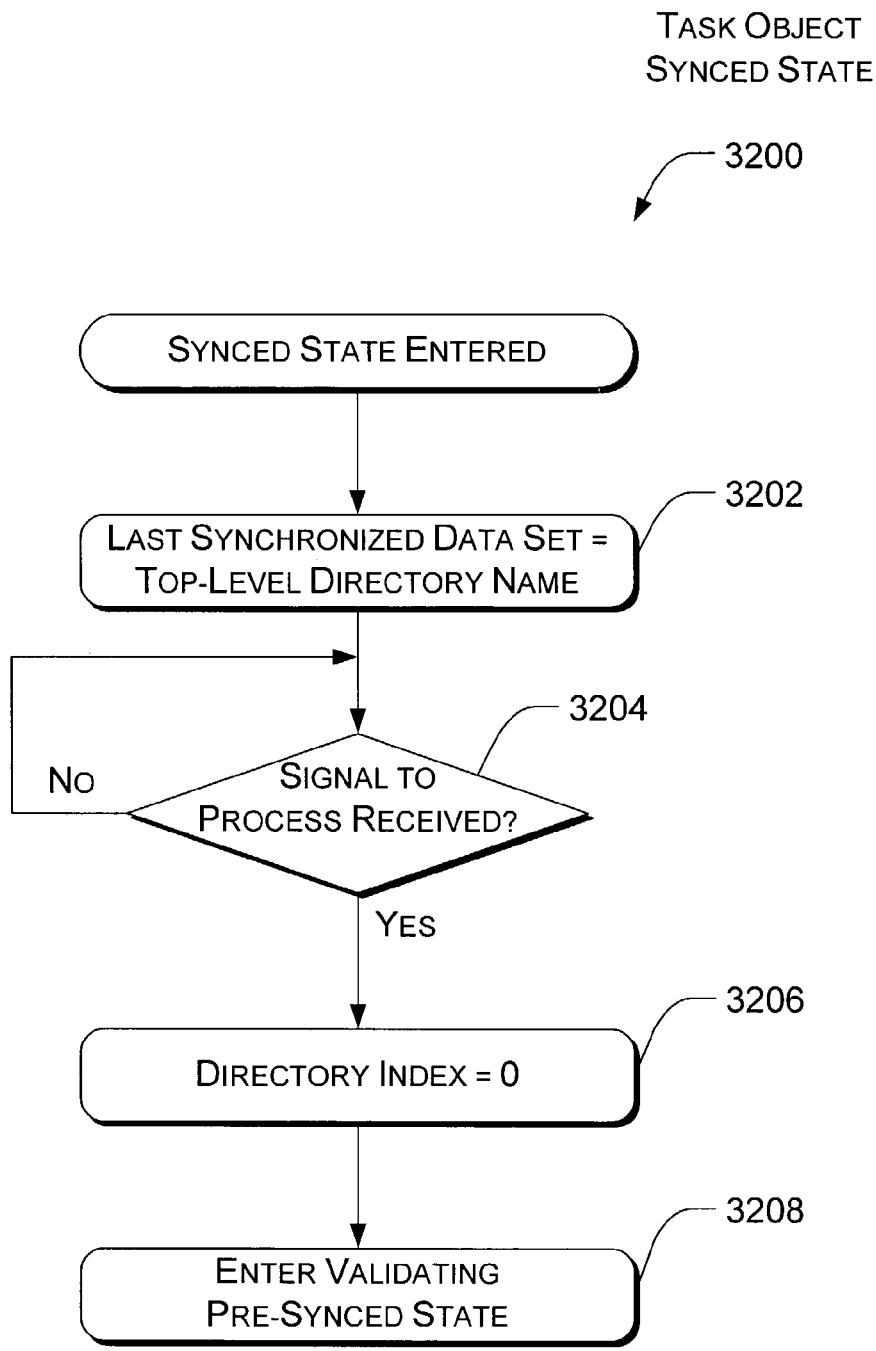
FIG. 32 is an exemplary process flow diagram illustrating operations performed by the task object of FIG. 11 while in a synced state.

FIG. 32 illustrates an exemplary method 3200 performed by task object 826 while in synced state 2806

At block 3202, task object 826 sets the last synchronized data set property of the task object to the name of the tag value from the tag in the configuration definition that is associated with the task object. The tag value indicates the top-level directory from which the received data was broadcast. This value is stored when the task object is synchronized to enable client object 824 to determine which task objects need to be re-synchronized when a new configuration is selected.

At block 3204, task object 826 determines whether a signal from client object 824 to process is received. Task object 826 continues looping back at block 3204 until a signal to process is received.

At block 3208, task object 826 sets the directory index property to 0.

At block 3210, task object 826 enters validating pre-synced state 2810.

Figure 33A:
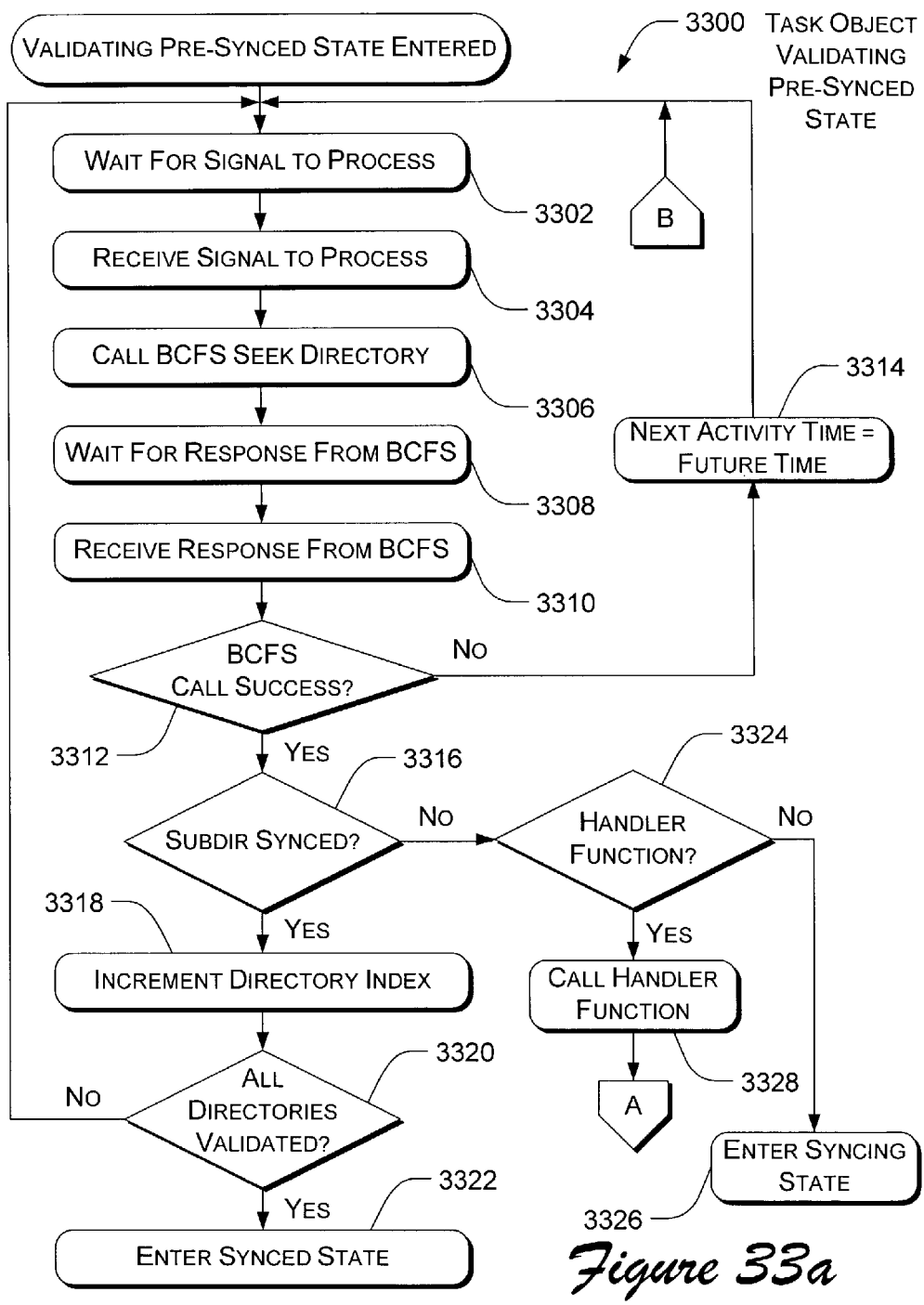
FIG. 33a is an exemplary process flow diagram illustrating operations performed by the task object of FIG. 11 while in a validating pre-synced state.
Figure 33B:
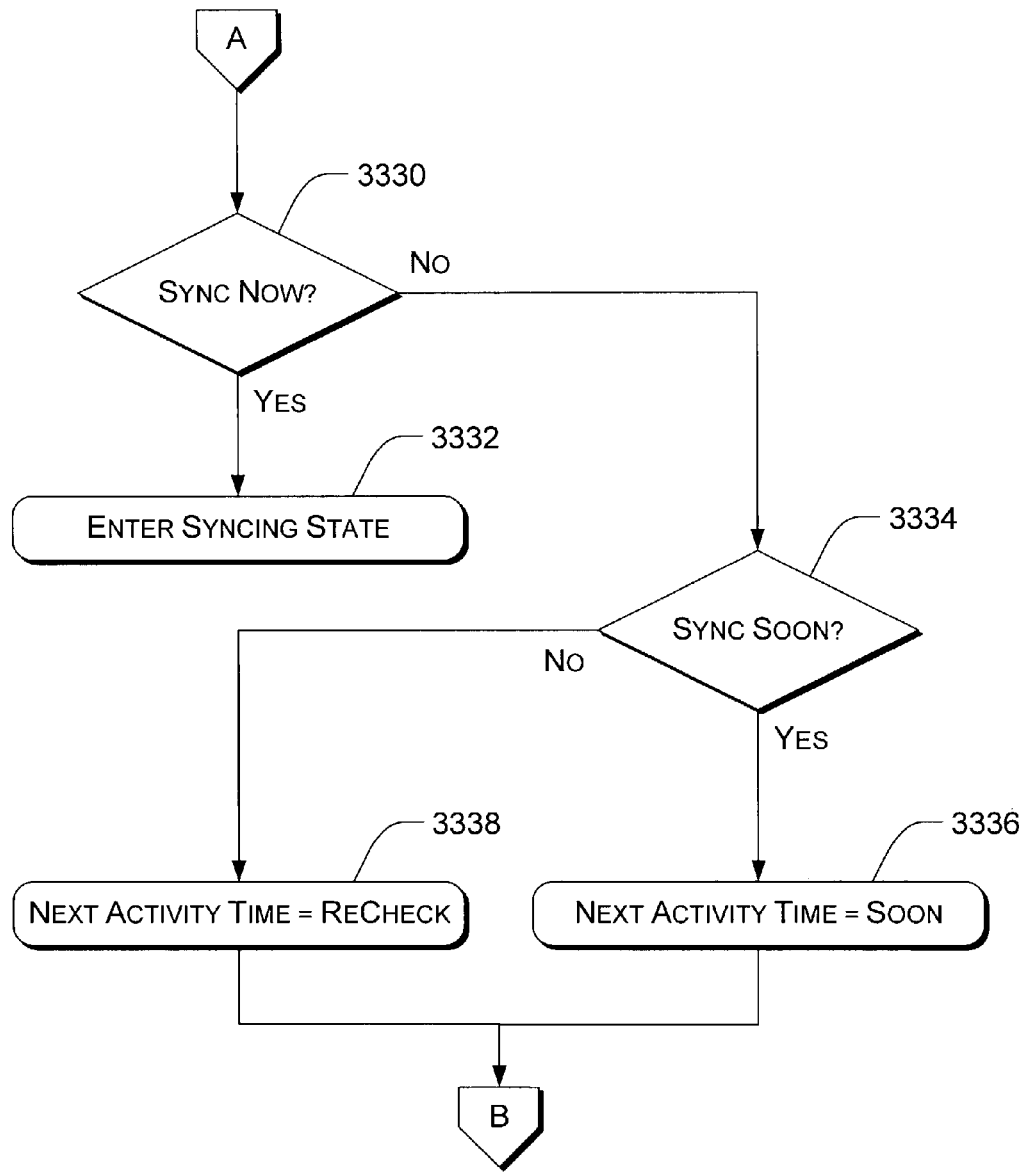
FIG. 33b is an exemplary process flow diagram illustrating operations performed by the task object of FIG. 11 while in a validating pre-synced state after a handler function is called.

FIGS. 33a and 33b illustrate an exemplary method 3300 performed by task object 826 while in validating pre-synced state 2810.

At block 3302, task object 826 waits to receive a signal to process from client object 824.

At block 3304, task object 826 receives a signal to process from client object 824.

At block 3306, task object 826 issues a seek directory call to BCFS 815 for a subdirectory that was found while task object 826 was in new state 2802. The directory index property is used to select a subdirectory from the stored list of subdirectories.

At block 3308, task object 826 waits for a response from BCFS 815 to be received.

At block 3310, task object 826 waits for a response from BCFS 815 to be received.

At block 3312, task object 826 determines (based on the received response) whether the BCFS seek directory call was successful.

If the BCFS seek directory call was successful (the "Yes" branch from block 3312), then task object new state processing continues at block 3316. On the other hand, if the BCFS seek directory call failed (the "No" branch from block 3312), then task object new state processing continues at block 3314.

At block 3314, task object 826 sets the next activity time property to a future time (e.g., five minutes from the current time), and task object 826 remains in validating pre-synced state 2810, continuing processing at block 3302.

At block 3316, task object 826 examines the received BCFS response to determine whether the specified subdirectory is synchronized. If the response from BCFS 815 indicates that the current subdirectory is not synchronized (the "No" branch from block 3316), then task object validate state processing continues at block 3324. Otherwise (the "Yes" branch from block 3316), task object validate state processing continues at block 3318.

At block 3318, task object 826 increments the directory index property by one.

At block 3320, task object 826 compares the value of the directory index property with the count of subdirectories that was previously returned by BCFS 815. If the values are equal (indicating that all of the subdirectories are synchronized), then at block 3322, task object 826 is enters synched state 2806. On the other hand, if the values are not equal (indicating that there is at least one subdirectory that is not synchronized), then task object validating state processing continues at block 3302.

If at block 3316, it is determined that the specified subdirectory is not synchronized, then at block 3324, task object 826 determines whether or not a handler function is associated with task object 826 (based on the handler function property). If it is determined that there is not an associated handler function, then at block 3326, task object 826 enters syncing state 2808. Otherwise, task object validate pre-synched state processing continues at block 3328.

At block 3328, task object 826 calls the associated handler function to determine when the subdirectory is to be synchronized, and processing continues at block 3330, as illustrated in FIG. 33b.

At block 3330, task object 826 determines, based on a response from the handler function whether the subdirectory is to be synchronized immediately. If so, then at block 3332, task object 826 enters syncing state 2808.

Otherwise, at block 3334, task object 826 determines, based on the response from the handler function, whether the subdirectory is to be synchronized in a short time. If so, then at block 3336, task object 826 sets the next activity time property to a short time in the future (e.g., the current time plus five seconds), and task object validating pre-synced state processing continues at block 3302, as illustrated in FIG. 33a.

If the response from the handler function indicates that the subdirectory is to be synchronized later (the "No" branch from block 3334), then at block 3338, task object 826 sets the next activity time property to the current time plus the value of the re-check interval property. Task object validating pre-synched state processing then continues at block 3302, as illustrated in FIG. 33a.

Exemplary Task Object Reset Operation

Figure 34:
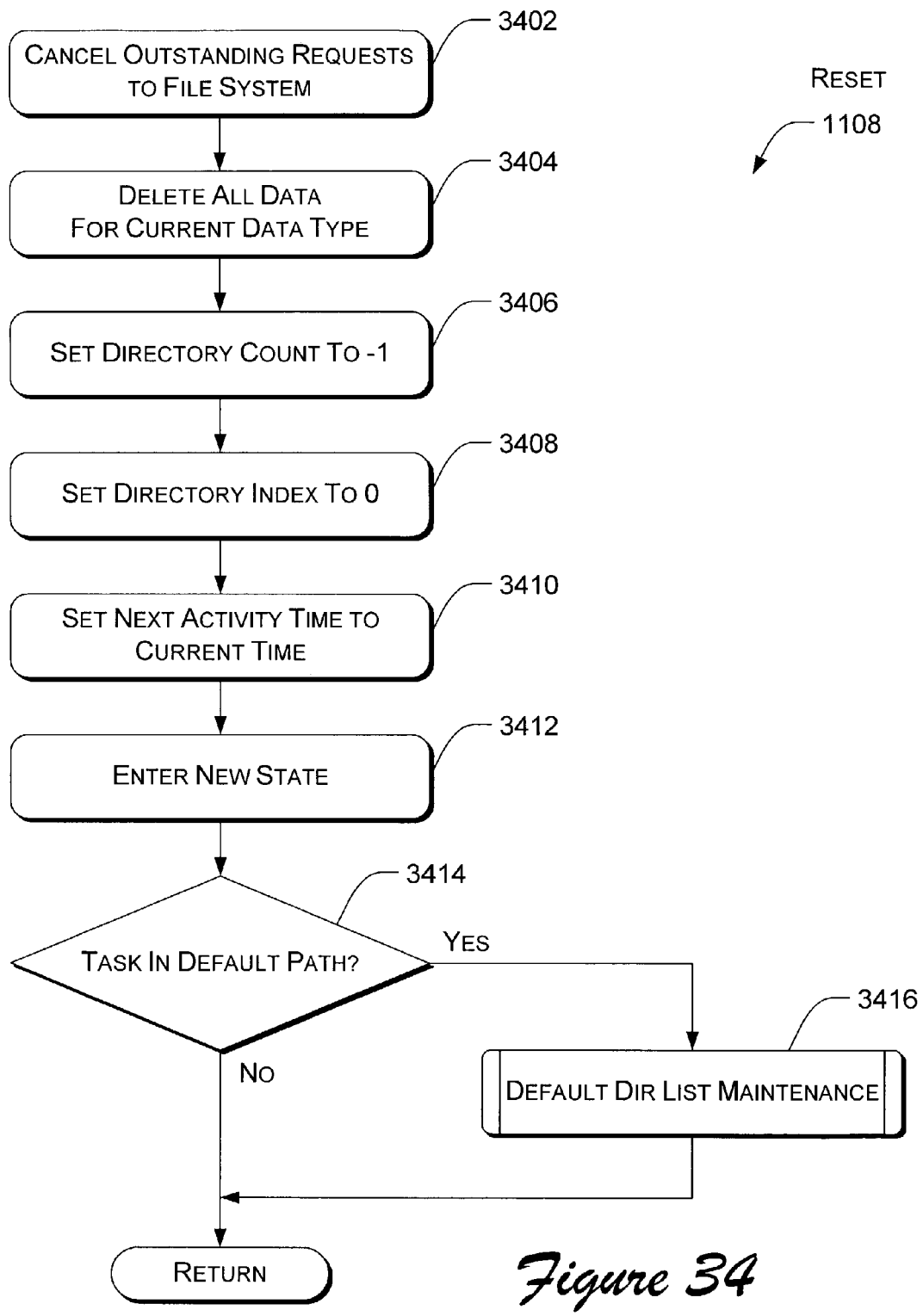
FIG. 34 illustrates an exemplary reset method of the task object of FIG. 11.

FIG. 34 illustrates an exemplary reset operation 1108 associated with task object 826. Reset operation 1108 is performed when the state of task object 826 changes and data acquisition for the task is to be restarted from the beginning.

At block 3402, task object 826 cancels any outstanding requests to BCFS 815.

At block 3404, task object 826 deletes all data files that are stored on client device 110 and associated with the data type of task object 826.

At block 3406, task object 826 sets the directory count property to −1, indicating that no directory synchronizations have been attempted.

At block 3408, task object 826 sets the directory index property to 0.

At block 3410, task object 826 sets the next activity time property to the current time to ensure that the task will be executed in the near future.

At block 3412, task object 826 enters new state 2402 (or new state 2802).

At block 3414, task object 826 determines whether or not data associated with the task is in the default path (based on the in default path flag). If the data associated with the task is not in the default path (the "No" branch from block 3414), then reset operation 1108 terminates. Otherwise (the "Yes" branch from block 3414), reset operation 1108 continues at block 3416.

At block 3416, task operation 826 performs default dir list maintenance operation 1114 to update the list of available directories.

Exemplary Task Object Shelve Operation

Figure 35:
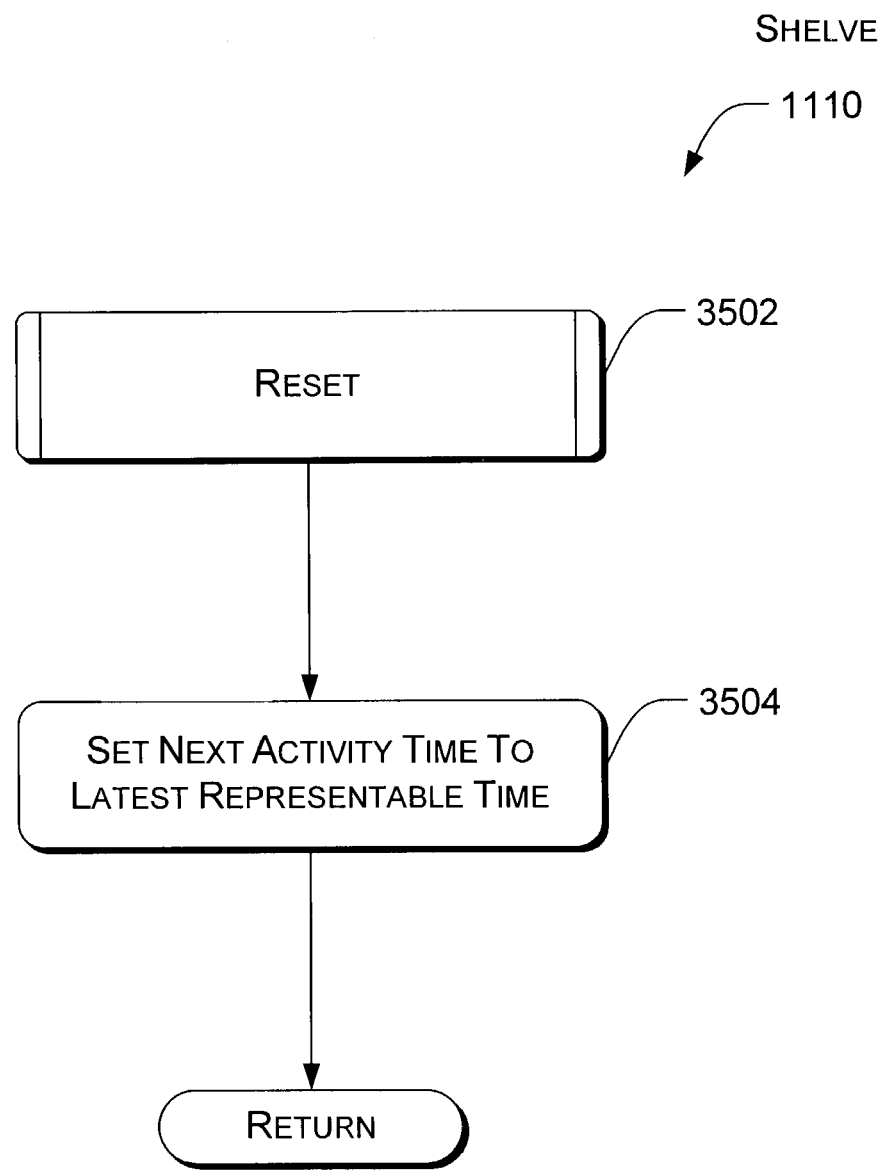
FIG. 35 illustrates an exemplary shelve method of the task object of FIG. 11.

FIG. 35 illustrates an exemplary shelve operation 1110 associated with task object 826. Shelve operation 1110 is performed when task object 826 has been created by a user, but is not used by the currently selected configuration.

At block 3502, task object 826 performs the reset operation 1110 (as described above with reference to FIG. 34).

At block 3504, task object 826 sets the next activity time property to the latest representable date/time. This enables the task to remain on task list 1004, but ensures that it will not be called because the next activity time property will never be sooner than another task's next activity time property.

Exemplary Task Object Check Invalidate Operation

Figure 36:
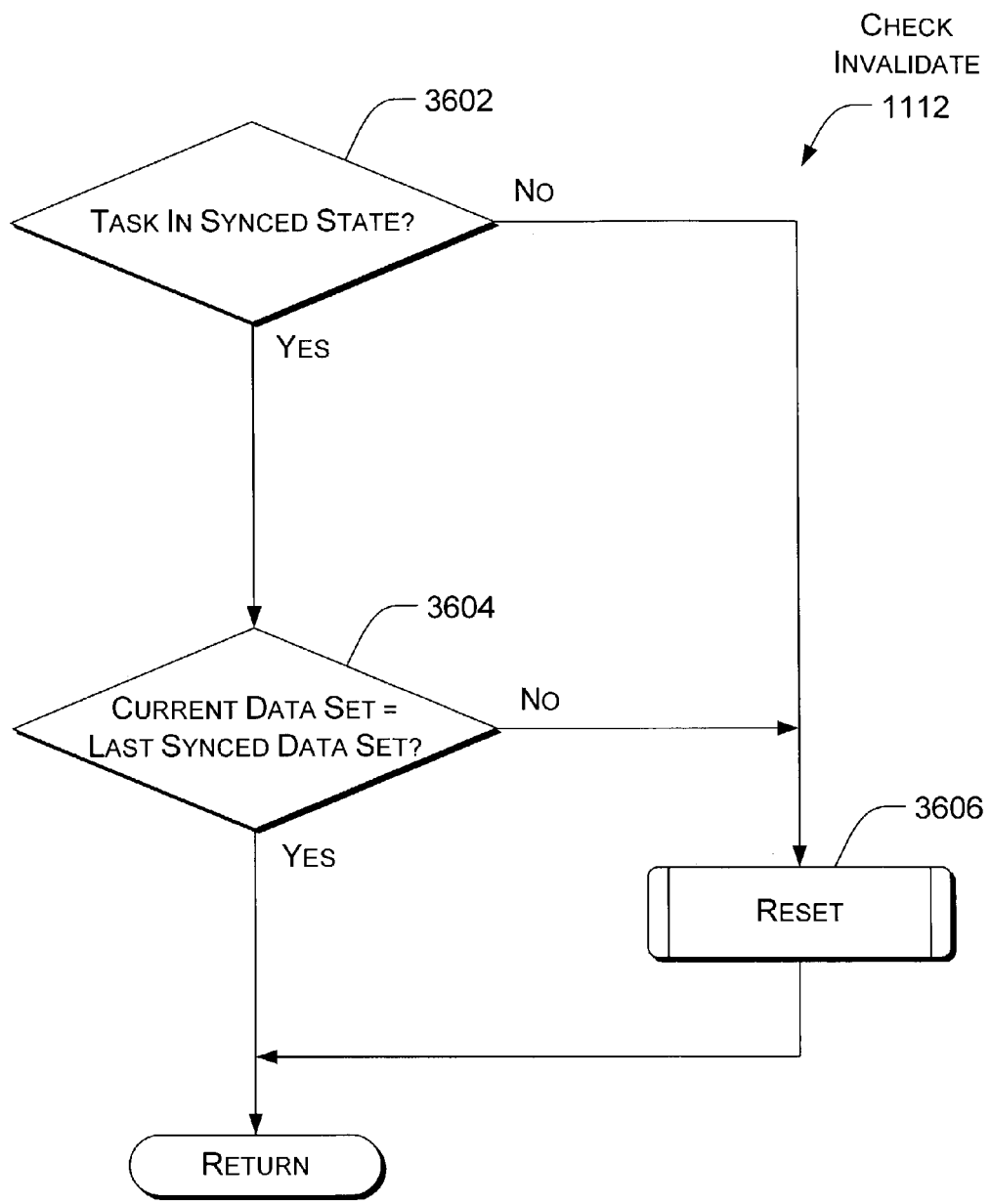
FIG. 36 illustrates an exemplary check invalidate method for of the task object of FIG. 11.

FIG. 36 illustrates an exemplary check invalidate operation 1112 associated with task object 826. Check invalidate operation 1112 is performed to clear a task object not associated with a newly selected configuration.

At block 3602, task object 826 determines its current state. If task object 826 is in synced state 2406 (or synced state 2806) (the "Yes" branch from block 3602), then check invalidate 1112 continues at block 3604. Otherwise (the "No" branch from block 3602), check invalidate 1112 continues at block 3606.

At block 3604, task object 826 examines the last synced data set property. If the source location of the data type currently associated with task object 826 (as indicated by the tag value in the configuration definition in the region configuration file) matches the last synced data set property (the "Yes" branch from block 3604), then no action is taken and check invalidate 1112 terminates. (This situation indicates that the data of the data type associated with task object 826 for the previously selected configuration is the same for the newly selected configuration.)

At block 3606, task object 826 performs the reset operation 1108 (described above with reference to FIG. 34) to clear out any data associated with the task.

Exemplary Client Object Find Specific File API Function

Figure 37:
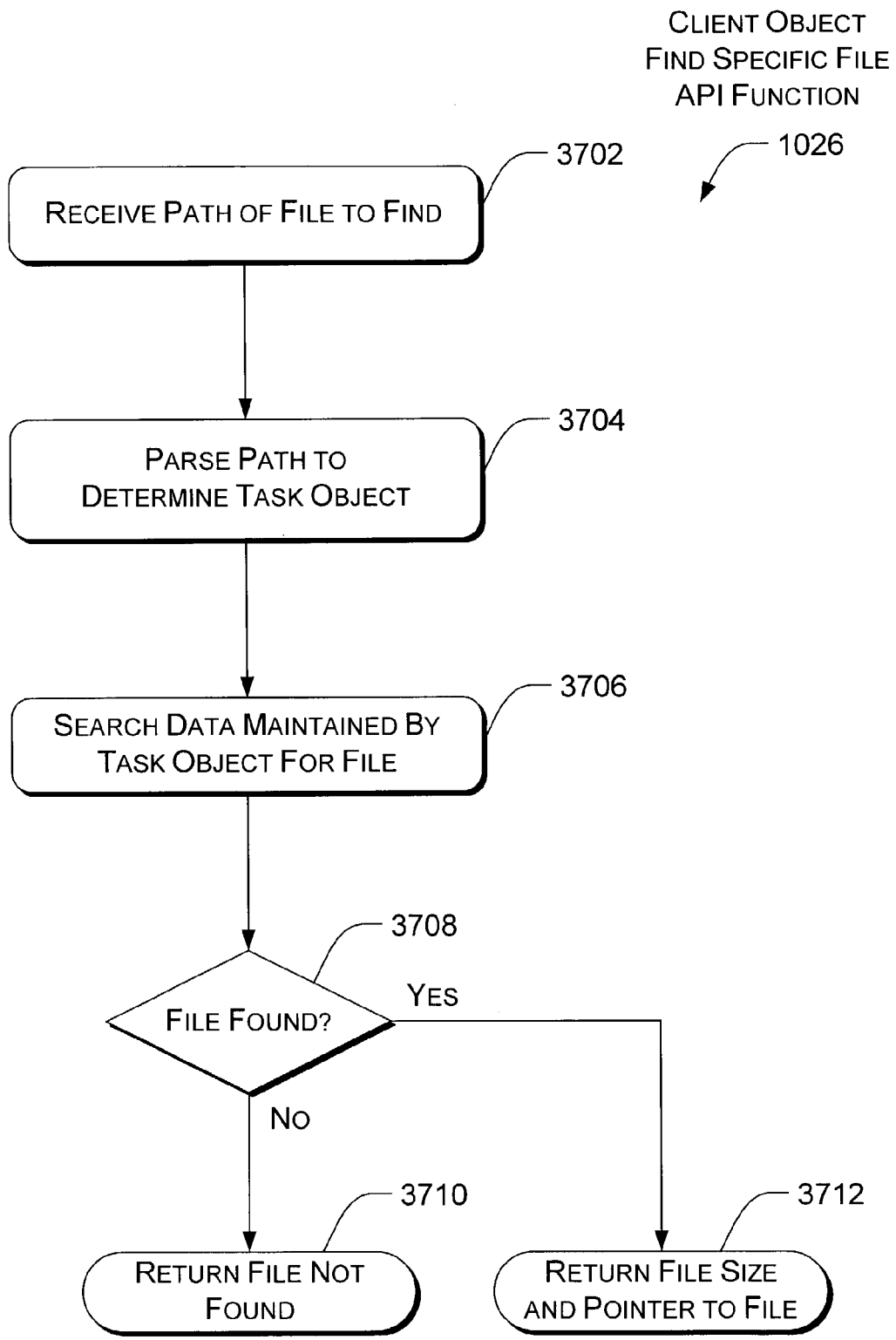
FIG. 37 illustrates an exemplary method that may be performed by the client object of FIG. 10 to find a specified file in a given path in response to an API call.

FIG. 37 illustrates an exemplary find specific file function 1026 that may be performed by client object 824 in response to an API call. Typically, find specific file 1026 is called by an application (such as a user interface or EPG application) to retrieve data to be presented to a viewer. Find specific file 1026 receives a full path file name as a parameter.

At block 3702, client object 824 receives a full path file name.

At block 3704, client object 824 parses the received path to determine the task object 826 responsible for maintaining a local copy of the requested file. In the described implementation, a first portion of the path identifies the data type associated with the file; a second portion of the path identifies a source location of the file that is broadcast; and a third portion of the path identifies the file name.

At block 3706, client object 824 searches a task object identified by the first and second portion of the received path for the requested file.

At block 3708, client object 824 determines whether or not the file was found.

If the file is not found (the "No" branch from block 3708), then at block 3710, client object 824 returns a file not found error to the requesting application.

If the file is found (the "Yes" branch from block 3708), then at block 3712, client object 824 returns the size of the file and a pointer to the file.

Exemplary Client Object Find File in Default Path API Function

Figure 38:
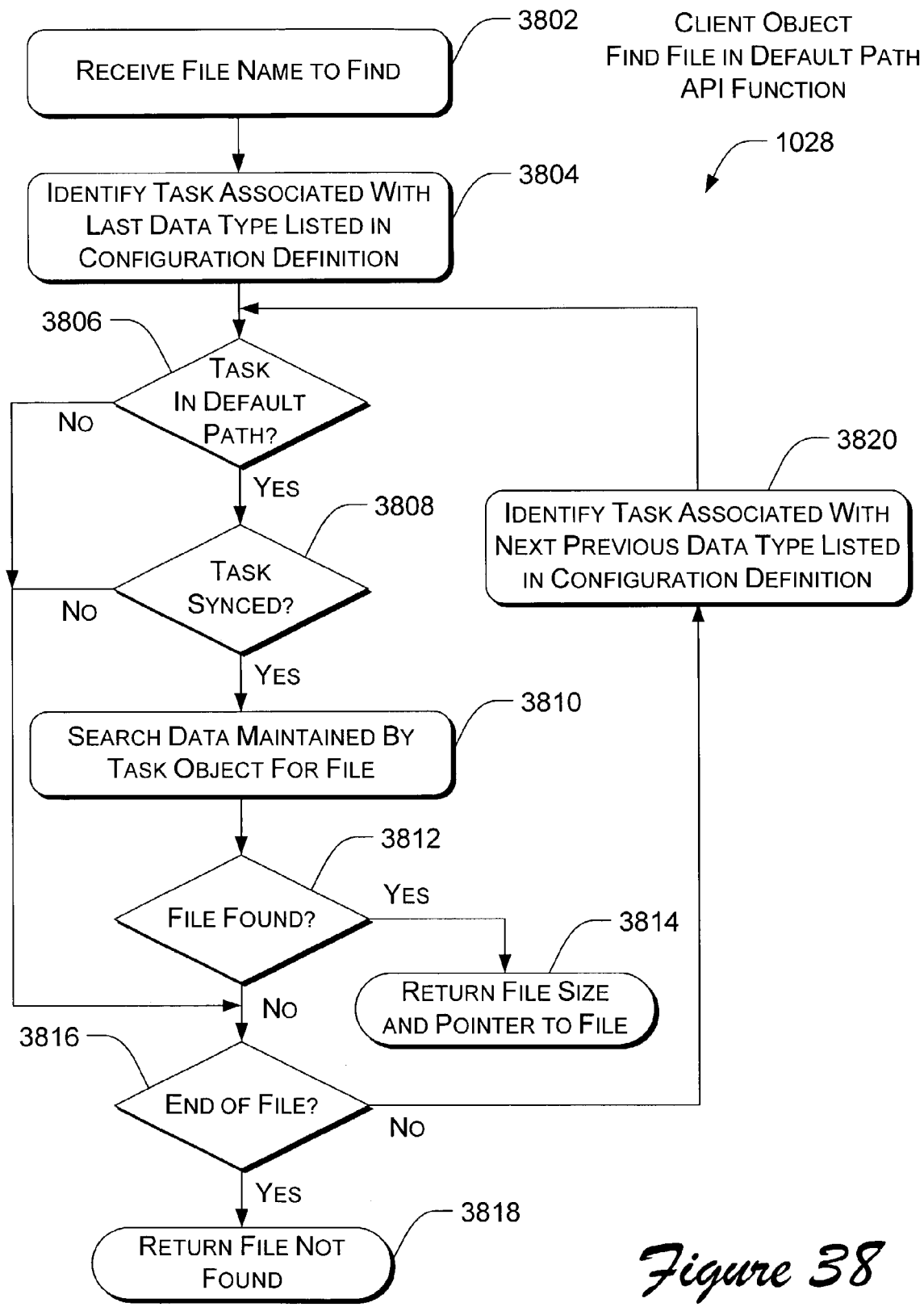
FIG. 38 illustrates an exemplary method that may be performed by the client object of FIG. 10 to find a specified file in a default path in response to an API call.

FIG. 38 illustrates an exemplary find file in default path function 1028 that may be performed by client object 824 in response to an API call. Typically, find file in default path 1028 is called by an application (such as a user interface or EPG application) to retrieve data to be presented to a viewer. Find file in default path 1028 receives a file name as a parameter.

At block 3802, client object 824 receives a file name.

At block 3804, client object 824 identifies a task object 826 that is associated with the last tag listed in the currently selected configuration definition.

At block 3806, client object 824 determines whether the identified task object 826 is in the default path (as indicated by the in default path flag associated with the task object). If the identified task object 826 is not in the default path, then find file in default path 1028 continues at block 3816.

At block 3808, client object 824 determines whether or not the data associated with the identified task object is synchronized. In one implementation, in which task objects are grouped, for example according to a data type group identifier that may be specified as part of the configuration definition, determining whether or not the data associated with the identified task object is synchronized also includes determining whether or not all of the data associated with the task objects of the same group are also synchronized. If any of the task objects associated with the group are not synchronized, then the current task object is determined to not be synchronized. In this way, other applications (such as a user interface) are not give access to any of the received data associated with a particular data type group until all of the data associated with data types in the group are is successfully received. If the identified task object 826 is not synchronized, then find file in default path 1028 continues at block 3816.

At block 3810, client object 824 searches the data maintained by the identified task object 826 for the requested file.

At block 3812, client object 824 determines whether or not the file has been found.

If the file is found (the "Yes" branch from block 3812), then at block 3814, client object 824 returns the size of the file and a pointer to the file.

If the file is not found (the "No" branch from block 3812), then at block 3816, client object 824 determines whether or not all of the task objects associated with the currently selected configuration have been checked. If there are more task objects to search (the "No" branch from block 3816), then find file in default path 1028 continues at block 3820.

If there are no more task objects to search (the "Yes" branch from block 3816), then at block 3818, client object 824 returns a file not found message.

At block 3804, client object 824 identifies a task object 826 that is associated with the next previous tag listed in the currently selected configuration definition. The task objects are searched in reverse order to insure that any override data (which is downloaded after the default data that it overrides) will be found before the default data that it overrides is found.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
receiving, at a broadcast server, data to be broadcast from one or more data providers, wherein the data to be broadcast comprises multiple region definitions and multiple configuration definitions;

maintaining, at the broadcast server, a configuration repository storing the multiple region definitions and mappings between the multiple region definitions and the multiple configuration definitions, the multiple configuration definitions defining parameters for rendering the data, wherein each of the multiple configuration definitions comprises:
  a layout format defining how the data is presented to a viewer via a user interface;
  a unique configuration identification identifying the configuration definition;
  a configuration name associated with the configuration definition; and
  a culture name indicating a language associated with the configuration definition; and
generating, at the broadcast server, a region configuration file for each of the multiple region definitions, wherein each region configuration file comprises a plurality of configuration definitions associated with a given region definition;
transmitting, from the broadcast server to an appropriate client device via an out of band network connection, at least one region configuration file;
automatically selecting, at the appropriate client device, an initial configuration definition;
selectively transmitting, from the broadcast server to the appropriate client device via at least one out of band network connection, the initial configuration definition automatically selected;
displaying, via a user interface at the appropriate client device, a list of configuration definitions included in the at least one region configuration file;
receiving, via the user interface at the appropriate client device, a user selected configuration definition;
selectively transmitting, from the broadcast server to an appropriate client device via at least one out of band network connection, the user selected configuration definition; and
switching, at the appropriate client device, the initial configuration definition to the user selected configuration definition.

2. The method as recited in claim 1 wherein at least one of the multiple configuration definitions is associated with a language in which the data is displayed.

3. The method as recited in claim 1 wherein at least one of the multiple configuration definitions is further associated with a viewer interest for representation in a presentation layout in which the data is to be displayed, the presentation layout providing a theme-based user-interface based on the viewer interest.

4. The method as recited in claim 1 wherein at least one of the multiple configuration definitions is further associated with a viewer interest used to target advertisements when the data is displayed.

5. The method as recited in claim 1 wherein the region definitions correspond to region identifiers associated with client devices supported by the broadcast server.

6. The method as recited in claim 1 wherein the region definitions correspond to geographic regions in which client devices supported by the broadcast server are implemented.

7. A system comprising:
a memory;
one or more processors, coupled to the memory, the one or more processors configured to execute one or more instructions stored on the memory;
a broadcast server comprising:
  one or more data collectors configured to gather data from one or more data providers; and
  a configuration management system configured to perform acts comprising:
    communicating with one or more client devices via one or more out of band network connections;
    receiving, at the broadcast server, multiple configuration definitions;
    receiving, at the broadcast server, multiple region definitions;
    maintaining, at the broadcast server, a configuration repository storing the multiple region definitions and mappings between the multiple region definitions and the multiple configuration definitions, the multiple configuration definitions defining parameters for rendering the data, wherein each of the multiple configuration definitions comprise:
      a layout format defining how the data is presented to a viewer via a user interface;
      a unique configuration identification indentifying the configuration definition;
      a configuration name, associated with the configuration definition; and
      a culture name indicating a language associated with the configuration definition; and
    generating, at the broadcast server, a region configuration file for each of the multiple region definitions, wherein each region configuration file comprises a plurality of configuration definitions associated with a given region definition;
    transmitting, from the broadcast server to an appropriate client device via an out of band network connection, at least one region configuration file;
    automatically selecting, at the appropriate client device, an initial configuration definition;
    selectively transmitting, from the broadcast server to the appropriate client device via at least one out of band network connection, the initial configuration definition automatically selected;
    displaying, via a user interface at the appropriate client device, a list of configuration definitions included in the at least one region configuration file;
    receiving, via the user interface at the appropriate client device, a user selected configuration definition;
    selectively transmitting, from the broadcast server to an appropriate client device via at least one out of band network connection, the user selected configuration definition; and
    switching, at the appropriate client device, the initial configuration definition to the user selected configuration definition.

8. The system as recited in claim 7, wherein the data collectors comprise at least one of an advertisement data collector for gathering advertisement data, a video-on-demand data collector for gathering listings of available video-on-demand, and an electronic program guide data collector for gathering data that identifies scheduled broadcast programs.

9. The system as recited in claim 7, wherein the configuration management system further comprises:
  a configuration interface that provides access to the configuration repository.

10. The system as recited in claim 7 wherein at least one of the multiple configuration definitions is associated with a language in which the data displayed.

11. The system as recited in claim 7 wherein at least one of the multiple configuration definitions is further associated with a viewer for representation in a presentation layout in which the data is to be displayed, the presentation layout providing a theme-based user-interface based on the viewer interest.

12. The system as recited in claim 7 wherein at least one of the multiple configuration definitions is further associated with a viewer interest used to target advertisements when the data is displayed.

13. The system as recited in claim 7 wherein the region definitions correspond to region identifiers associated with client devices supported by the broadcast server.

14. The system as recited in claim 7 wherein the region definitions correspond to geographic regions in which client devices supported by the broadcast server are implemented.

15. One or more computer-readable storage media storing computer executable instructions that, when executed, configure a computing system to perform acts comprising:

receiving, at a broadcast server, data to be broadcast from one or more data providers, wherein the data to be broadcast comprises multiple region definitions and multiple configuration definitions;

maintaining, at the broadcast server, a configuration repository storing the multiple region definitions and mappings between the multiple region definitions and the multiple configuration definitions, the multiple configuration definitions defining parameters for rendering the data, wherein each of the multiple configuration definitions comprises:

a layout format defining how the data is presented to a viewer via a user interface;

a unique configuration identification identifying the configuration definition;

a configuration name associated with the configuration definition; and a culture name indicating a language associated with the configuration definition; and generating, at the broadcast server, a region configuration file for each of the multiple region definitions, wherein each region configuration file comprises a plurality of configuration definitions associated with a given region definition;

transmitting, from the broadcast server to an appropriate client device via an out of band network connection, at least one region configuration file;

automatically selecting, at the appropriate client device, an initial configuration definition;

selectively transmitting, from the broadcast server to the appropriate client device via at least one out of band network connection, the initial configuration definition automatically selected;

displaying, via a user interface at the appropriate client device, a list of configuration definitions included in the at least one region configuration file;

receiving, via the user interface at the appropriate client device, a user selected configuration definition;

selectively transmitting, from the broadcast server to an appropriate client device via at least one out of band network connection, the user selected configuration definition; and switching, at the appropriate client device, the initial configuration definition to the user selected configuration definition.

16. The one or more computer-readable storage media as recited in claim 15 wherein at least one of the multiple configuration definitions is associated with a language in which the data is displayed.

17. The one or more computer-readable storage media as recited in claim 15 wherein at least one of the multiple configuration definitions is further associated with a viewer interest for representation in a presentation layout in which the data is to be displayed, the presentation layout providing a theme-based user-interface based on the viewer interest.

18. The one or more computer-readable storage media as recited in claim 15 wherein at least one of the multiple configuration definitions is further associated with a viewer interest used to target advertisements when the data is displayed.

19. The one or more computer-readable storage media as recited in claim 15 wherein the region definitions correspond to region identifiers associated with client devices supported by the broadcast server.

20. The one or more computer-readable storage media as recited in claim 15 wherein the region definitions correspond to geographic regions in which client devices supported by the broadcast server are implemented.

\* \* \* \* \*